US012659049B2

(12) United States Patent
Sandor et al.

(10) Patent No.: US 12,659,049 B2
(45) Date of Patent: Jun. 16, 2026

(54) ELECTROMAGNETIC MATERIAL IDENTIFICATION TOOL (EMIT)

(71) Applicant: Q-Net LLC, Hana, HI (US)

(72) Inventors: Marianne Veronika Sandor, Rocklin, CA (US); Edward Michael Porrazzo, Rocklin, CA (US)

(73) Assignee: Q-NET LLC, Hana, HI (US)

( * ) Notice: Subject to any disclaimer, the term of this patent is extended or adjusted under 35 U.S.C. 154(b) by 0 days.

(21) Appl. No.: 19/294,898

(22) Filed: Aug. 8, 2025

(65) Prior Publication Data

US 2025/0373341 A1 Dec. 4, 2025

Related U.S. Application Data

(63) Continuation of application No. 19/188,550, filed on Apr. 24, 2025.

(Continued)

(51) Int. Cl.
*H04B 10/00* (2013.01)
*H01Q 19/06* (2006.01)
(Continued)

(52) U.S. Cl.
CPC ........... *H04B 10/70* (2013.01); *H01Q 19/067* (2013.01); *H01Q 21/061* (2013.01); *H04B 10/40* (2013.01)

(58) Field of Classification Search
CPC .... H04B 10/70; H04B 10/40; H04B 10/2575; H04B 10/1123; H04B 10/1143;
(Continued)

(56) References Cited

U.S. PATENT DOCUMENTS 8,654,980 B2 * 2/2014 Harrison ................... H04L 9/12
380/278
10,224,979 B1 3/2019 Hunter
(Continued)

*Primary Examiner* — Hanh Phan
(74) *Attorney, Agent, or Firm* — Carter, DeLuca & Farrell LLP; George Likourezos

(57) ABSTRACT

The Electromagnetic Materials Identification Tool (EMIT) is a handheld-tool for laboratory, industrial, or field use, via portable devices or integrated systems. EMIT establishes a new EM wave-state category in the Periodic Table of Elements, identifying materials as structured spatial wave-state expressions that preserve particle spin, position, super-position, and spatial relationships. Signatures are viewed/stored as Electromagnetic Holograms (EmH) on Resonant Encoded Memory (REM). EMIT comprises a Quantum Transceiver Antenna (QTA) and coupled Transceiver Discriminator (TD). The QTA detects and synthesizes multidimensional EmH-signatures of elements, gemstones, minerals, synthetics and organics, by volume, concentration, and/or purity, for real-time identification and material transformation. AI enhances signature analysis, anomaly detection, and enhanced resolution. EMIT integrates with NMR, MRI, X-ray, Ultra-sound, microscope and telescope systems. A superconductive-doped Q-Tricity capacitor harvests ambient energy for power and connectivity. QTA non-line-of-sight penetration enables sub-ground, and internal body signature acquisition at ambient-temperatures.

8 Claims, 20 Drawing Sheets

Related U.S. Application Data

(60) Provisional application No. 63/639,681, filed on Apr. 28, 2024.

(51) Int. Cl.
  *H01Q 21/06* (2006.01)
  *H04B 10/40* (2013.01)
  *H04B 10/70* (2013.01)

(58) Field of Classification Search
  CPC . H04B 10/1149; H04B 10/116; H04B 10/118; H04L 9/0852; H04L 9/0855; H01Q 19/067; H01Q 19/062; G06N 10/40
  USPC ....... 398/135, 136, 137, 138, 139, 140, 158, 398/159, 33, 38, 25, 26, 27, 118, 119, 398/127, 128, 129, 130, 131, 141, 115; 380/256, 278, 279, 263
  See application file for complete search history.

(56) References Cited

U.S. PATENT DOCUMENTS

| | | | | |
|---|---|---|---|---|
| 11,621,495 | B2 * | 4/2023 | Park | H01Q 15/0086 343/753 |
| 12,040,840 | B2 * | 7/2024 | Qi | H04B 10/40 |
| 2004/0227667 | A1 | 11/2004 | Sievenpiper | |
| 2006/0145694 | A1 | 7/2006 | Oppenlander | |
| 2008/0132272 | A1 | 6/2008 | Kisselev | |
| 2012/0212375 | A1 | 8/2012 | Depree | |
| 2017/0194699 | A1 | 7/2017 | Ouedraogo | |
| 2021/0250101 | A1 | 8/2021 | Gordon | |
| 2023/0093461 | A1 | 3/2023 | Hammersberg | |
| 2023/0137266 | A1 | 5/2023 | McBride | |
| 2024/0275312 | A1 | 8/2024 | Mahamat | |

* cited by examiner

Antenna Pixel

222

95

222

95

95

95

150

125

222

95

150

125

Radio Tower Plasma:
RF Signal is Not Comprised of
Simple Waves;

Time            Frequency            Space

Done "IN" or "OUT" Of Phase $L_1, L_2, L_3, \ldots L_n$ May be Equal or Unequal Lengths Allowing for Desired Variations and Control i.e. $\cdot/4$, $3 \cdot /4$, etc 888,535,777

GroupN(3) Frequencies 1-7
GroupN(2) Frequencies 1-7
GroupN(1) Frequencies 1-7
Group1 Frequencies 1-7

150

535

150

ELECTROMAGNETIC MATERIAL IDENTIFICATION TOOL (EMIT)

CROSS REFERENCE TO RELATED APPLICATIONS

The present application is a continuation application of U.S. patent application Ser. No. 19/188,550, filed on Apr. 24, 2025, which claims the benefit of and priority to U.S. Provisional Patent Application No. 63/639,681, filed on Apr. 28, 2024, the entire content of which is hereby incorporated by reference.

TECHNICAL FIELD OF THE INVENTION

The present invention relates to an Electromagnetic Materials Identification Tool (EMIT) utilizing a Quantum Transceiver Antenna (QTA) and Transceiver Discriminator (TD) for detection, synthesis, and identification of material electromagnetic signatures across broad frequency spectra, including new wave-state categories.

BACKGROUND OF THE INVENTION

There are a multitude of technical problems using prior art antennas. The state-of-the-art antennas used today follow the principles of classical physics. Prior art antennas follow classical physics laws that constrain the antenna to operate only in one fixed frequency. They are also constrained by a fixed wavelength, by means of a fixed ratio, established usually by the length of the wire. Antennas that operate on the "Wave Nature" ("WN") exhibit properties of classical physics. That one frequency or a ratio of that frequency is all the antenna is tuned to send or receive, (i.e., a Bluetooth antenna cannot be used for anything else except for Bluetooth frequency, because it is a fixed wavelength antenna, only able to send or receive Bluetooth frequency.)

For example, in a very common Yagi-Style, traditional WN Antenna, the longitudinal metal guide has sets of wires, or metal conductors that are spaced and arranged to force gain into the null and create better signal reception, in the Line-of-Sight, to the transmitter, the direction the Yagi-Style Antenna must be pointed for optimum operation. These are not small antennas but often are one or more meters in size. Yagi-Style Antennas are often used for receiving television, AM/FM broadcasts and other types of Radio Waves, even WiMax. Like other kinds of antennas, the entire Yagi Structure is no different and is organized as a monolithic, optimized single purpose, serial structure. Often one Yagi Antenna is used only for receiving; and a separate paired structure is usually used for transmission. It is not unusual to see Yagi-Style antennas on metal cellular and broadcast towers, (FIG. 15-720), next to various micro-wave dish antennas pointed directional line-of sight.

Micro-wave dish style antennas and Satellite Dish Antennas (FIG. 15A-730) are again typical Antennas whereby the dish structure, whether large or small, is pointed line-of-sight and the dish is used to gather and focus the satellite/microwave signal to a "Feed-Horn" called a Low Noise Amplifier (LNA"). Next to these kinds of dishes on metal cell tower structures you often see cell antennas, that look like metal florescent light tube boxes. These monolithic metal antennas are pointed in the direction of the line-of-sight directionally in the pattern of transmission broadcast to receive. Or a separate WN Cell antenna is pointed toward the line-of-sight direction to transmit. All these kinds of antenna are subject to "rain-fade" inclement weather occlusions, obstacles and various kinds of interferences.

Another very common WN Antenna is the whip-style vertical antenna that is very commonly used in today's modems and routers, including 3G, 4G and LTE WiFi and "Edge" Computing networks. Again, often multiple pairs of these kinds of antennas are used separately: one used for transmission and the other used for reception. Another very common conventional Antenna is the MiMo powered monolithic array whose performance illustrates how problematic these kinds of systems really are. None of these antennas can fit into a mobile electronic device or cell phone. Furthermore, all utilize methods of fixed length, fixed ratio to match the desired frequency.

Conventional wave-nature antennas face a range of unresolved challenges that limit their effectiveness and adaptability. These systems often rely on physical, hard-wired cables to deliver so-called "wireless" services into buildings-highlighting a fundamental disconnect in true wireless infrastructure. Such antennas are generally too large or impractical to integrate into compact devices like smartphones, mobile electronics, vehicles, or aircraft. They must remain stationary, require precise line-of-sight alignment, and are typically elevated well above ground level to function properly. These antennas are unable to operate directly on ground planes and are highly susceptible to a wide range of environmental and electromagnetic interferences. These limitations reflect systemic issues in conventional wave-only antenna technologies that remain largely unresolved.

Under the commonly used antennas, per classical physics, there is a requirement for a separate antenna to transmit and/or receive for each frequency, specifically: 3G, 4G, LTE®, 5G cell phone, Bluetooth®, WiFi®, WiMAX®, and satellite etc. Having so many disparate antennas broadcasting, requires high power to overcome multipath interferences. Also integrating so many disparate antennas in one device, such as a cell phone, requires discrete circuitry for every antenna, increased cost, resistance, and multi-path interference, resulting in low gain, and excessive power draw. A single resonance increases resistance, creates heat (feedback) and causes increase signal loss. Additionally, each portion of the RF spectrum is managed individually: serially, passed through separate and dedicated digital signal processors, and analog to digital and digital to analog converters.

Current telecommunication and media devices require separate antennas for UHF, VHF, AM, FM, CB Radios, Marine Communications, Radar, satellite radio, CCTV cameras, drones, and security systems. Even for First Responders, there are different antennas required for: Coast Guard, Police, Fire Department, Emergency Response, and Military Communications etc., These different groups cannot transmit to one another without having multiple antennas, and/or multiple devices, tuned to transmit and receive in that one fixed frequency band.

Additionally, current antennas can either send or receive. The few antennas that exist that can both send and receive, cannot do so simultaneously, but must perform each function of either sending, or receiving, serially. This is time consuming and bogs down the device and draws excess power to perform these functions. The classical antennas require high power (100 W+) for both transmission and reception and operate only line-of-sight, so they require towers to transmit distances. Classical satellite reception requires a dish on the outside of a building, with a cable connecting the signal into the inside of the building. Satellite phones require the phone to be outside to gain connection, and operate using high-power, direct line-of-sight to the satellite; and the classical satellite antennas lose signal the moment the user goes into an urban area of high-rise buildings, or into a building, or a parking garage. Specifically, the classical satellite antennas cannot operate to receive signals, indoors, nor anywhere that is non-line-of-sight, (not in direct sight of the satellite sending or receiving the signal).

When using the classical antennas for terrestrial networks, transmission and reception cannot be achieved for sending or receiving at any frequency without using towers and high-power to propagate the signal. Additionally, these antennas only operate line-of-sight to the signal source (for example losing a call on an elevator, or in a parking garage because the user is non-line-of-sight "NLOS" to the signal source). Furthermore, current antennas, specifically patch antennas, require waveguides. The alignment between waveguides and between individual microwave and cell phone towers are required for connectivity. Misalignment is one of the primary causes of dropped or disconnected calls and disrupted telecommunication services. Classical antennas do not work on a ground plane, nor through concrete or metal structures, such as parking garages, elevators, or hulls of vessels. Such antennas cannot operate under water, nor can they operate with immunity on an engine block, without picking up interference static or engine noise in the transmission. For safety protocols; data monitoring AI telemetry data must be sent from inside transport vehicles or marine vessels, or from an electrical machine, engine or battery. These circumstances are fraught with multipath interference, and non-line-of-sight transmissions which cannot be overcome with prior art antennas. A standard antenna, following classical physics, operates Line-of-Sight (LOS) and uses amplification to send a signal beam, or receive a beam, point-to-point. If there is a wall in the way, the beam reflects back or is absorbed, and the communication is broken, as the beam cannot pass through the concrete material Connectivity is paramount, interoperability is crucial, and frequency dynamics are a requirement. Yet, our most modern and advanced antennas fail technically to be able to share spectrum or operate in multiple frequencies. Even for sending and receiving at one fixed frequency, height is required to line up and see point-to-point to the target receivers. Such antennas cannot operate in our modern urban landscapes, even 5G Antennas cannot go through windows, let alone buildings. There is no conventional antenna that is frequency agile nor dynamic. For example, satellite dish antennas are all installed outside of our homes and buildings and have separate cables that run from the outside to the inside. There is no wireless connectivity. This "connectivity gap" between the inside and the outside or connecting one or more devices, even devices that are right next to each other; is often called the "Last-Inch-of-the-Last-Mile." So even when wireless antennas are proximate to each other, wave nature limitations create gaps that make connecting between antennas, spectrum, and devices impossible. This might be NLOS, or interferences, or obstacles, or any number of issues. There is a technological limitation by the wave nature antennas, operating using classical physics laws, to get connected; therefore, the solution for the Last-Inch-of-the-Last-Mile remains elusive, complex, and problematic. Connectivity is most vital. Surprisingly, because of the technological limitations of current antennas, the only way to solve the problem is to provide a physical cable or fiber connectivity between the inside and the outside of buildings, to overcome the Last-Inch-of the-Last-Mile. All modern communications rely on the "wave" nature of Radio Signals and Electromagnetic "EM" Spectrum, to establish a "resonance" that is required for connectivity. And the wave nature requires Line-of-Site, no obstructions, no interreferences. Hence the term fixed wavelength, fixed ratio, line of sight antennas is synonymous with prior art WN Antennas.

Another textbook example that highlights this Line-of-Sight requirement is with our modern satellite communications. This is due to four important technological factors. First, in order to collect enough RF signal from space, large size antenna dishes are needed. Even in planar phased array satellite antennas, size is nearly 2 to 3 feet. Without enough signal, there is not enough Radio Frequency "RF" Signal to make a connection. Second, the satellite antenna must be pointed at the location in the sky, Line-of-Site, "LOS" without any obstacles or obstructions precisely aligned to the satellite. Clouds, rain (called rain-fade), snow or inclement weather can block the antenna to receive via the satellite. The third factor is mounting. The antenna that is going to connect to a satellite must be fixed in position. The satellite antenna must be stable and unmoved in its orientation. If it moves, there must be some means, like a gyroscope, or a gimble that either keeps it fixed to the satellite or returns it back to its LOS position. Without a precise direct LOS there is no connectivity between the antenna and the satellite. The fourth technological problem is getting wireless signals either inside or outside of the building. This fourth problem is related to the Last-inch-of-the-last-mile problem discussed. The antenna must be mounted fixed and outdoors to get a clear LOS to the satellite. However, the RF Signals collected from the satellite outside cannot be wirelessly transceived from either the outside to the inside or vice versa. Therefore, physical cables or wires must be used.

Related to satellite antenna, location services, known collectively as Global Positioning Satellite (GPS), are one of the most prioritized needs in our wireless world. "Needing to know where we are and how to get to where we want to go." For most commercial applications, consumers failing to get connectivity for GPS is a frustration or inconvenience. For Military, Emergency and First Responders, knowing your location, relative to another location and how to navigate is often the difference between life and death.

The four big technological problems all make GPS in cell phones, mobile devices, or vehicles near impossible. There isn't enough signal, the antennas are too big to fit in a phone. The mobile devices or vehicles move around and are not fixed, so there is no clear path to the satellite. To somewhat work-around these issues, (not overcome the technological problems), Cell phones or automotive map software programs use "synthesized" GPS based upon algorithms from antenna triangulations between mobile towers and signals to the electronic device. The RF signal triangulations give an approximation of where you are for GPS. However, these approximations have their own related technological problems. First, they have problematic latency. This means it takes time for the GPS approximations to be made and checked, and by that time you may have moved so the approximations are no longer correct. Secondly, cellular or mobile, RF Signals for wireless are all susceptible to a myriad of interferences. They require Line-Of-Sight. The antennas must collect enough "accurate" RF signal to maintain a connection. If you are moving, you may become out of range from the cell tower you previously were directly LOS to. So, like any other wireless RF signal, synthesized GPS Antennas fail in urban canyons or non-flat rural environments.

A still worse problem is that these synthesized GPS can provide no reference for height or altitude—the "Z" axis metric. The "Z" axis is a special reference of height or altitude; in the X, Y and Z, 3D space we live in. Without the Z axis metric, there is no way for Aircraft to navigate safely. The only work-around so far for aircraft is to have pressure barometric readings taken and transmitted to pilots from control towers or automated systems, to act as a frame of reference, to the ground being flown across. This is a serious technological limitation. Without the Z, the Emergency Response has no way of knowing which floor a fire is on, in a modern high-rise, nor upon which floor someone may be waiting to be rescued. Without the Z, there is no way to know how deep a canyon is or from the top of a mountain rim to a river valley below. These are big glitches, and we have all been frustrated by these problems.

Accordingly, since telecommunications, emergency response, internet access, media content, telemetry data, and remote mechanical monitoring are needed to be received in all types of locations, in various structures and terrains, as well as in space, there is a need for an improved antenna.

SUMMARY

An Electromagnetic Materials Identification Tool (EMIT) includes a Quantum Transceiver Antenna (QTA) including a layered matrix of antenna pixels generating toroidal geometries configured to detect and synthesize electromagnetic (EM) signatures of materials, including naturally occurring elements, gemstones, minerals, synthetics, and organic matter, across multiple frequency bands from below 20 Hz to beyond 1 THz. A Transceiver Discriminator (TD) is operatively coupled to the QTA for real-time identification by volume, concentration, or purity. The EMIT establishes a new EM wave-state category within the periodic table of elements, preserves particle properties as Electromagnetic Holograms (EmH) on Resonant Encoded Memory (REM), and supports non-line-of-sight penetration with spherical chamber isolation. It pairs with imaging systems, uses flexible fabrication, replicates signatures for transformation, and harvests Q-Tricity.

In accordance with aspects of the present disclosure, a quantum transceiver antenna (QTA) includes: a plurality of antenna pixel elements arranged in one or more antenna pixel matrix arrays disposed on at least one dielectric substrate. The antenna pixel elements are configured to generate an electromagnetic Torus Field using electromagnetic (EM) and radio frequency (RF) signals. The Torus Field produces field effects comprising one or more independent, overlapping electromagnetic lensing structures, formed by interference and resonance patterns within one or more antenna pixel matrix arrays. The resonance of the antenna pixel elements organizes the EM and RF signals into coherent patterns for both transmission and reception, thereby enabling operation as a transceiving antenna.

In an aspect, the quantum transceiver antenna may further include: the plurality of antenna pixel elements configured to generate multiple electromagnetic Torus Fields comprising one to a plurality of near limitless, independent overlapping electromagnetic lenses, that through resonance are configured to order, or organize either by dual nature, particle or wave EM and RF Signals as the transceiving antenna.

In an aspect, the one or more antenna pixel matrix arrays may be configured to generate multiple electromagnetic Torus Fields using electromagnetic and radio frequency signals. The multiple Torus Fields produce field effects which may include one or more independent, overlapping electromagnetic lensing structures, and, through resonance, the electromagnetic lensing structures may order or organize the electromagnetic and radio frequency signals for transception. The one or more antenna pixel matrix arrays may be further configured to simultaneously perform one or more functions including at least one of: acting as a transceiving rectenna, telemeter, sensor, hearing aid, thermocouple, touch-screen, display, or wireless power transceiver.

In an aspect, the one or more antenna pixel matrix arrays may be configured to generate multiple electromagnetic Torus Fields using electromagnetic and radio frequency signals. The multiple Torus Fields produce field effects which may include one or more independent, overlapping electromagnetic lensing structures. The electromagnetic lensing structures may order or organize the electromagnetic and radio frequency signals both as particles and as waves, independently and simultaneously.

In an aspect, the quantum transceiver antenna may further include: a transceiver configured to simultaneously resolve electromagnetic and radio frequency signals across a frequency range extending from below 20 Hz to beyond 1 THz. The transceiver may be operable in line-of-sight and non-line-of-sight conditions, through solid materials including rock, soil, walls, bricks, and metals, in the presence of ground planes and harsh electromagnetic environments, within water, Faraday cages, engines, motors, transformers, or generators, and may be further configured to overcome multipath and other signal interferences. The transceiver may be frequency agile, frequency dynamic, multifunctional, and operable in asynchronous, bisynchronous, serial, parallel, analog, digital, or combinations thereof.

In an aspect, the quantum transceiver antenna may be collocated, to create wireless connectivity, with at least one of: cell phones, routers, modems, edge networks, wireless systems, AI systems, sensors, Internet of Things (IoT) devices, batteries, radios, TVs, motors, transmitters, receivers, game-controllers, computer interface(s), displays, generators, photovoltaics, or any other kind of electronic devices or equipment.

In an aspect, the quantum transceiver antenna may order the interference patterns so that existing signals can gain resonance in unified coherence, with a reduction in resistance and the multiple signals co-exist without disruption to any of the individual frequencies.

In an aspect, the antenna pixel elements may include one or more materials including: cobalt, graphene, diamond, silicon, copper, silver, gold, and neodymium. Said materials may be selected to optimize performance characteristics including signal gain, electromagnetic and radio frequency signal resolution, quality factor, power efficiency, operating range, component integration, device size, and weight.

In an aspect, the one or more antenna pixel matrix arrays may be configured to generate one or more electromagnetic Torus Fields such that field effects are produced comprising one or more independent, overlapping electromagnetic lensing structures arranged as a Hopf fibration. The quantum transceiver antenna maintains quantum entanglement and may be configured to order or organize electromagnetic and radio frequency signals and electromagnetic hybrid (EmH) signals for near-instantaneous connectivity with reduced latency in both near-field and far-field conditions, functioning as a quantum entanglement transceiver.

In an aspect, one of the antenna pixel matrix arrays may include a first antenna pixel element and a plurality of additional antenna pixel elements configured to generate electromagnetic Torus Fields. A second component may be configured to generate field effects that may comprise one or more, overlapping electromagnetic lensing structures. The resonance of the antenna pixel elements may be configured to order or organize electromagnetic and radio frequency signals as a transceiver antenna.

In an aspect, a plurality of quantum transceiver antennas may include a quantum entanglement component configured to maintain an intermediary state of quantum entanglement in equilibrium. The plurality of antennas, regardless of near-field or far-field separation, may achieve sympathetic resonance and may be configured to wirelessly transceive or exchange information, intelligence, energy, or Electromagnetic Holographic Signals. The antennas may function as repeaters propagating radio frequency and electromagnetic signals within a wireless mesh network. The addition of each antenna in the network may increase the coherence and resolution of the transmitted signals.

In an aspect, the quantum transceiver antenna may further include: an artificial intelligence engine, discernment engine, or search engine configured to resonate with electromagnetic holographic signals and wirelessly interface via quantum correlations with any cloud service, database, or data set, whether stored or live. The system may be capable of interfacing with data sources including at least one of: the internet, weather data, stock market data, financial transactions, blockchain activity, economic projections, commodities, elections, supply chains, travel and reservation systems, historical records, maps, medical records, or sports data. Inquiries to the system may produce outcomes related to predictions, associations, relationships, hidden or non-obvious patterns, entertainment, security alerts, fraud detection, or other related insights.

In an aspect, the antenna pixel matrix array may be configured similarly to a charge-coupled device and may be capable of transceiving multiple frequencies of non-ionizing radiation emitted by organic or inorganic materials. The received signals may be encoded and mapped by software into visual data, enabling real-time imaging of subsurface environments, the interior of the human body, and outer space, thereby functioning as a non-line-of-sight imaging system.

In an aspect, RF and EM signals may be wireless transmitted and received simultaneously.

In accordance with aspects of the present disclosure, a quantum transceiver antenna includes: a scalable, thin-film, bi-synchronous, frequency-dynamic antenna structure composed of a layered matrix of uniformly sized and shaped antenna pixels disposed with patterned voids and nulls. The antenna pixels are configured to generate electromagnetic signals that form coherent toroidal geometries functioning as tunable electromagnetic lenses. The antenna is operable to transceive both particle and wave components of electromagnetic and radio frequency signals using quantum principles, including quantum tunneling. The antenna supports non-line-of-sight communication, imaging, detection, power transfer, and electromagnetic holography with immunity to multipath interference and ground plane effects. The quantum transceiver antenna is configured to replace multiple conventional antennas within electronic devices and is operable with both terrestrial and space-based communication platforms. The quantum transceiver antenna is configured to operate at including at least one of: low impedance and low power while providing magnified signal gain, wireless plug-and-play integration, and interoperability with mesh networks, edge computing systems, Internet of Things (IoT), artificial intelligence, or emergency response networks.

In accordance with aspects of the present disclosure, a quantum transceiver antenna includes: a scalable, thin-film antenna structure configured for bi-synchronous, multifrequency resonance; and a layered matrix of antenna pixels forming the antenna structure. The antenna pixels are of uniform size and shape. The layered matrix includes voids and nulls arranged in a predetermined pattern. The QTA is configured to enhance coherence of electromagnetic signals using toroidal geometries integrated within the antenna structure, the toroidal geometries functioning as tunable electromagnetic lenses to simultaneously resolve and concentrate gain across a full spectrum of radio frequency signals. The QTA operates using quantum principles, exhibiting both particle and wave characteristics, to enable non-line-of-sight communication.

In an aspect, the thin-film antenna structure may be fabricated using a deposition process, and the layered matrix of antenna pixels is scalable to adapt to a plurality of device form factors.

In an aspect, the voids and nulls in the predetermined pattern may be configured to optimize electromagnetic signal propagation and reduce interference within the layered matrix.

In an aspect, the toroidal geometries may be dynamically tunable to adjust signal gain and frequency response based on operational requirements of a device incorporating the quantum transceiver antenna.

In an aspect, the quantum transceiver antenna may be configured to render solid materials effectively invisible to electromagnetic signals, enabling penetration through physical obstacles for non-line-of-sight communication.

Further details and aspects of exemplary embodiments of the present disclosure are described in more detail below with reference to the appended figures.

BRIEF DESCRIPTION OF THE DRAWINGS

A better understanding of the features and advantages of the present disclosure will be obtained by reference to the following detailed description that sets forth illustrative embodiments, in which the principles of the present disclosure are utilized, and the accompanying drawings of which.

DETAILED DESCRIPTION OF THE PREFERRED EMBODIMENTS

The present disclosure relates to a Quantum Transceiver Antenna (QTA) which operates using quantum principles. Conventional antennas operate using the principles of classical physics. All electromagnetic (EM) energy, whether observed and measured from our perspective as light (photonics), or radio frequency (RF), makes up a continuous spectrum. QTA operates as a prismatic "electromagnetic lens" (EM LENS). Just as a prism separates white light into each respective color in the rainbow, so the QTA separates electromagnetic signals, into each of their pure and distinct, respective wavelengths. The prismatic EM lensing effect concentrates each EM signal, causing the signal to gain natural coherence, while using less power. QTA, in accordance with the present disclosure, is an ordering technology, that enables the QTA to operate as a Multi-Frequency Antenna.

Figure 1:
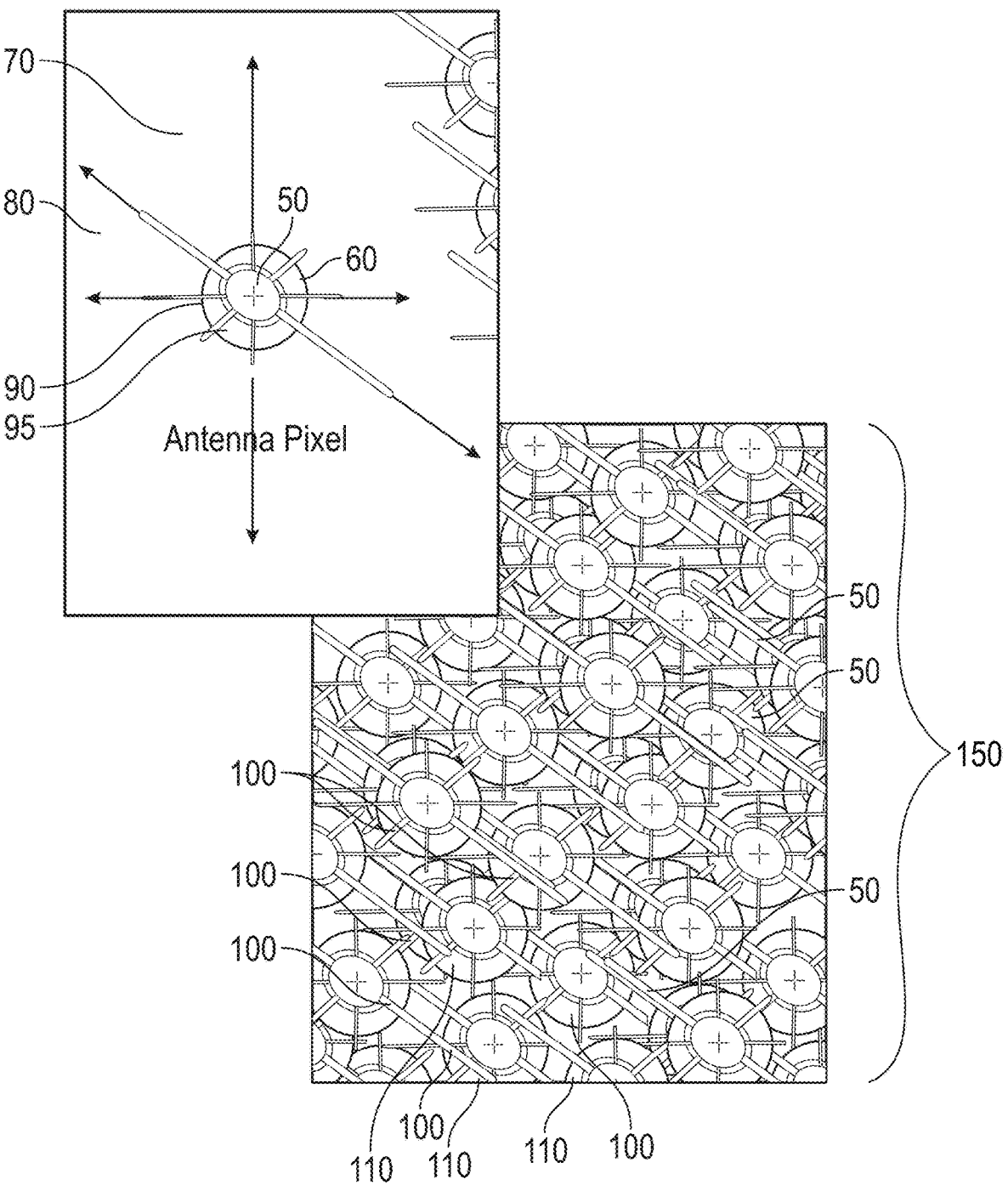
FIG. 1 is an illustration of the Quantum Transceiver Antenna (QTA) pixel and pixel matrix illustrating electromagnetic interactions and field effects, in accordance with aspects of the present disclosure.
Figures 3A, 3B:
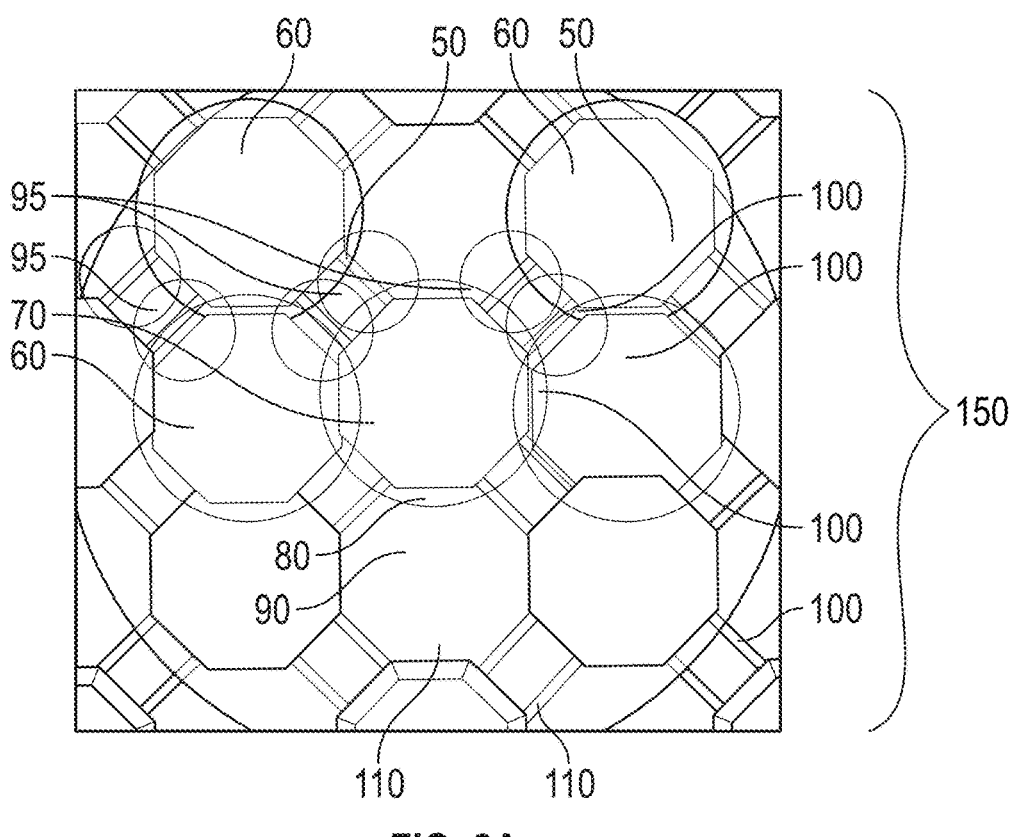
FIGS. 3A-3E are detailed views of antenna pixel matrix structures, field effects, toroidal geometries, and Hopf Fibrations enabling electromagnetic lensing, in accordance with aspects of the present disclosure.

As illustrated by FIG. 1, QTA can send and receive a broad spectrum of frequencies with high efficiency and gain, from the same thin surface or membrane, embodying a singular quantum structure. The plurality of pixels, illustrated in FIGS. 4A-D effectively orders and concentrates, any EM signals present, upon receiving an electrical signal through the structure. The offset second layer, (FIGS. 4A-C and 4D) causes orthogonal rotation, spinning the quanta, creating inertia which gains natural coherence in a Torus (FIGS. 3A-D). The toroid structure acts as a tunable lens with the voids in the structure creating the boundary layer. When a discriminator is attached to the QTA, seeking a particular frequency, or frequencies, the EM lens tunes to the instructed signal(s) (FIG. 3A).

Figures 4A, 4B:
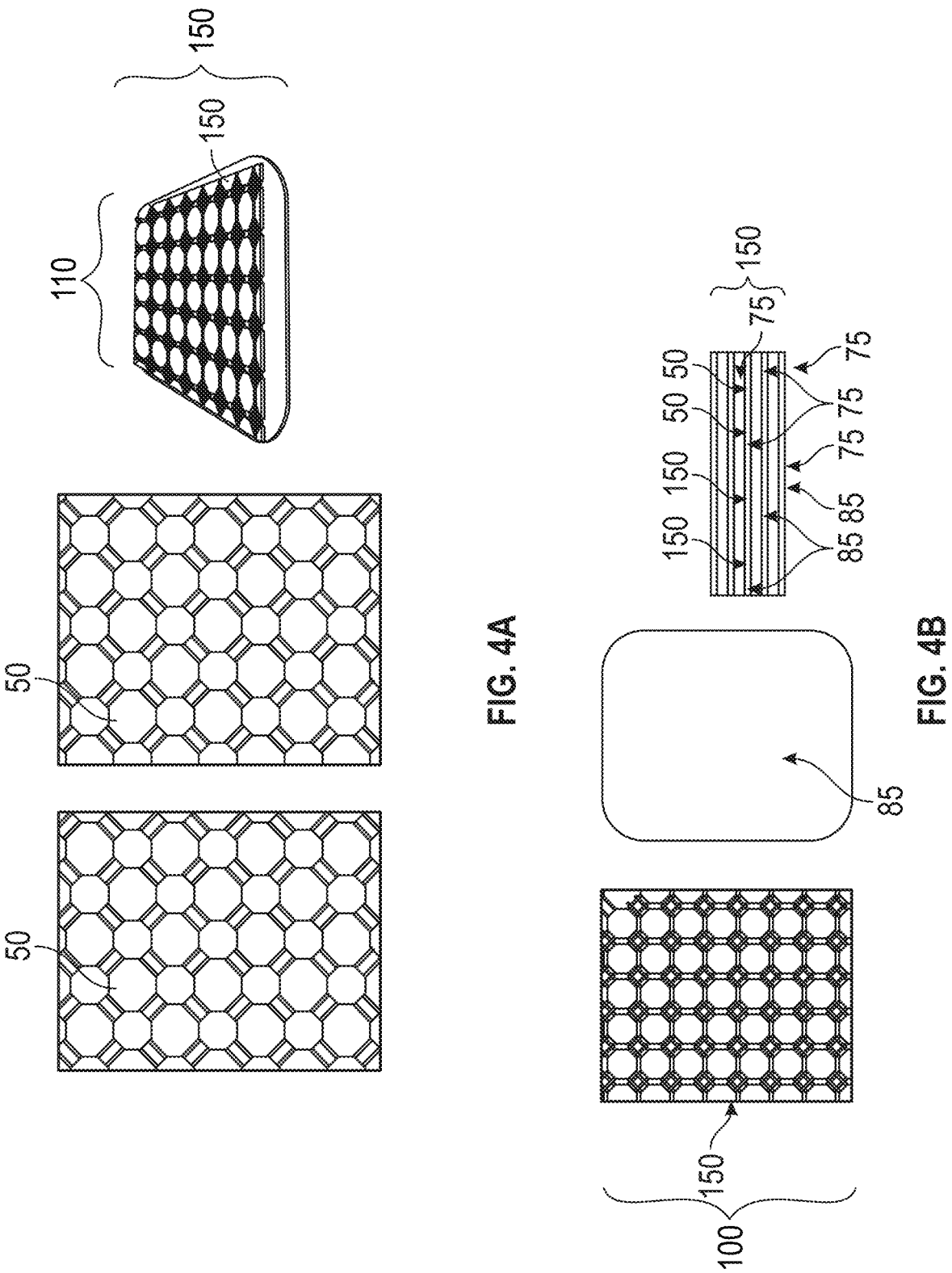
FIGS. 4A-4E illustrate step-by-step layered construction and activation of the antenna pixel matrix array and associated field effects, in accordance with aspects of the present disclosure.
Figures 4C, 4D:

QTA resolves multiple frequencies, simultaneously, without any distortion. The QTA of the present disclosure may comprise, any means capable of generating an electromagnetic torus field, using EM and RF Signals such that field effects are generated, comprising one to a near limitless independent overlapping electromagnetic ("EM") lens means (FIG. 4D). The EM lens generates as a result of the torus field, that gains resonance and orders, or organizes EM and RF Signals as a Quantum Transceiver Antenna, by dual nature, particle and/or wave. A single QTA (FIG. 4A-4C) can effectively replace all antennas in a cell phone, and provides increased gain and performance, for all the frequencies: Bluetooth, Cell, Wi-Fi, IoT etc. The QTA uses Non-Line-of-Sight transception, which effectively orders, magnifies and spreads the signal frequencies, so that its signals can travel through a concrete wall, and complete the signal transmission (instead of being reflected back to its source). The QTA Non-Line-of-Sight effect, passing through sealed chambers, and concrete walls, or metal hulls of vessels, or working on ground planes, is most easily described as analogous to light that passes through a stained-glass window. All materials appear as "transparent" to the QTA.

The QTA prismatic EM lensing effect, is analogous to having a variable focal length, allowing the QTA to be frequency dynamic and agile. Therefore, unlike other antennas, the QTA is not frequency constrained. The QTA sends and receives multiple disparate signals simultaneously. By placing multiple QTA's in any given region, QTA's can be used as repeaters to form a terrestrial, or space based, network.

Electromagnetic Signals (EM) or Radio Frequency Signals (RF) are multi-dimensional. All electromagnetic waves and even the carrier waves that are superimposed and entangled onto other frequencies, by nature, are not only two dimensional, they have at least an electrical component in one vector, with a magnetic component that is a perpendicular vector as well, not to mention phase (time) and spatial location.

Radio Frequency Signals are not static, as they are dynamic in a constant state of flux. EM is a multidimensional, topography and tomography where patterns and relationships between the dual particle and wave nature of EM convey information and impart intelligence to systems. When embodiments of the present disclosure are used in radio systems and wireless devices, the Last-Inch-of-the-Last-Mile is achievable. Specifically achieving connectivity that is seamless between devices nearly anywhere. The QTA provides clear communication with reduced latency while consuming significantly less energy. It operates with lower resistance and heat, resulting in greater efficiency. Its design enables lower-cost manufacturing, using fewer parts, less material, and reduced complexity. Performance and operational capability are improved by orders of magnitude. This includes but is not limited to higher data transfer capacity, expanded wireless service availability, more efficient use of physical space, lower resource requirements, and access to broader bandwidths across the radio frequency spectrum compared to traditional wave-only antennas. The gateway to Quantum Transceiver Antennas has been opened.

QTA has an entirely different principle of operation than traditional antennas, as QTA operates under quantum principles instead of classical physics. Understanding the dual particle and wave nature of EM allowed creating of Antenna Pixel(s), which are singular transceivers of small, but indeterminate size, which may take many different forms and be comprised of many different types of materials (or combinations of materials) as further described in the present disclosure. Antenna Pixels generate field effects when Electromagnetic and Radio Frequency signals encounter the Antenna Pixels and the Antenna Pixel Matrix. These field effects gain coherence as a torus (FIG. 3D). As the signals are attracted into the torus, a Hopf structure forms around the nested torus (FIG. 4D). All the signals in the space, are ordered. Each torus creates myriads of independent, overlapping, electromagnetic lenses 65 (FIG. 3D) as a result of the Antenna Pixel Torus, resulting from each vesica piscis (FIG. 3B) formed between an individual Antenna Pixel and plurality of Antenna Pixels and their associated voids and nulls 110 (FIG. 3A). Nearly any EM and RF Signal can come into resonance with these Antenna Pixel Torus Field Effects, which are nearly limitless. This makes the QTA an ideal broadband Transceiver Antenna. Antenna Pixels may be arranged, either individually, or in plurality, layers, systems, matrix, and they are unique and an unobvious solution to be able to resolve and become resonant with both the wave and the particle nature, photonic "wave-state" of EM and RF Signals.

The QTA structure has many benefits, specifically, it is very lightweight, thin-film, and is comprised of flexible geometries. Furthermore, it is consistently transceiving "high-resolution" EM and RF signals at nearly any frequency of the spectrum, in nearly any orientation, while using less energy. Additionally, the QTA structure operates both Line-of-Sight (LOS) and Non-Line-of-Sight (NLOS), operates off of ground planes, and operates in harsh electromagnetic interference environments. The QTA structure enables transmitting and receiving in both analog and digital formats, often simultaneously. It also enables bisynchronous, asynchronous, serially and/or parallel transmission, across broad RF Spectrums. Finally, the QTA structure includes a full spectrum GPS: X, Y, and Z (Height, altitude).

The QTA is comprised of individual Antenna Pixel 50 as shown in FIG. 1. The antenna pixel 50 reduces mass by as much as 90% or more and introduces voids/nulls 110. The voids/nulls 110 are located where the Antenna Pixels 50 are purposed to create overlapping Antenna Pixel Interactions 100 and electromagnetic field effects 65 as electromagnetic lenses 65. In doing so the Quantum Transceiver Antenna has the following benefits over existing solutions: 1) the electrical impedance of the QTA is less, 2) the dispersion of signal loss, for the QTA, of either the input and/or the output is less; 3) the QTA enables simultaneous reception and/or transmission; 4) the signal loss by resistance and heat due to this loss, for the QTA, is reduced because there is less mass, 5) through empirical measurements and tests, the increase of electrical efficiencies and correspondingly the "noise" is significantly reduced, and 6) the QTA provides increased signal sensitivities.

It is beneficial in the present disclosure not to consider "monolithically" the entire antenna structure as a whole for purposes of resonance, but rather purposely induce as many "field-effects" as possible, to create as many possible combinations of Antenna Pixel to increase potential resonances. The QTA's Antenna Pixels 50 are designed to create near countless myriad of "field-effects" between Antenna Pixels 50 in the Antenna Pixel Matrix that can take advantage of the inherent dual particle and wave nature of RF.

The QTA teaches a plurality of Antenna Pixels elements that by their inherent nature and proximity creates overlapping "field-effects" from macro to quantum levels. Additionally, as a pixel matrix the pathways to achieve "resonances" on the structure are orders of magnitude greater than a monolithic structure.

In the present disclosure, the Antenna Pixel 50 of the QTA may be comprised of many surprising combinations of materials, not necessarily conductive. Non-conductive materials, or combinations of materials may be used. Because different materials and combinations of materials, create interactions that encourage different kinds of Torus Field Effects. Even the placing of voids and nulls 110 is important and therefore different kinds of lenses and plurality of resonances can be produced. The Antenna Pixel 50 elements may be constructed as metallic conductors or mixed media. The Antenna Pixel 50 elements may be semi-conductors, or even insulators; they may be non-magnetic, magnetic, paramagnetic, electro-static, electro-magnetic, even plasma. The materials themselves, having different properties, create different kinds and natures of "field-effects" with the ratios of "voids" between the pixel elements, creating an inherent matrix of near limitless electromagnetic lenses. Isolating, encouraging independent, but holistic field effect interactions of the Torus, to create electromagnetic lenses for practical advantages of wireless connectivity is unique and unobvious.

QTA's Antenna Pixel 50 elements within the Antenna Pixel Matrix structure function independently.

Different EM and RF signals may simultaneously find a plurality of resonances in both transmission and reception. The electrical configuration, impedance, (2) Ohms of the Antenna Pixel, and the Antenna Pixel Matrix are encouraged to be as low as possible. Lower impedance allows the best power handling possible to yield the best signal with the minimal loss possible. This is called the Q of the system, 1 being ideal, ≤0 representing gradients of poor to worse. Furthermore, lowering impedance Q reduces chaotic signal "noise" because the EM and RF have many opportunities to gain resonances, not just with one tuned frequency or a ratio of one frequency of spectrum.

Antenna Pixels 50 offer many advantages and solve many problems of modern telecommunications and wireless connectivity. Some of these include, but are not limited to, systems for Artificial Intelligence, because without bi-directional "call and response," no real AI system can exist. QTA provides this AI bidirectional connectivity at scale. For example, Bluetooth only allows one device to be connected at a time. Even though the frequency spectrum is allocated and available, sensor data cannot be wirelessly connected for IoT if there are no separate antennas in a phone or mobile device. QTA solves this by serving as a single broadband antenna. Also, each RF frequency in a cell phone typically requires a separate DSP and paired A-to-D and D-to-A chipsets, whereas QTA provides direct delivery of frequencies to the device, reducing the need for multiple chips and intermediary circuitry. Another example is that connectivity for drone flight, robotic interfaces, or autonomous driving requires high-speed data in diverse orientations and often in harsh electromagnetic environments or Faraday-cage-like circumstances. QTA overcomes these limitations by increasing signal gain and therefore extending the range for drones and robotics, effectively expanding the available service area. Because QTA antennas operate non-line-of-sight, and Antenna Pixels can gain resonance at any orientation, they are ideal as non-fixed, mobile transceiver platforms. They are also immune to harsh electromagnetic environments, and their lower operating impedances allow for better power handling with minimal signal loss, which is especially important for ground planes and Faraday-cage situations.

Another example is that wireless connectivity at the Edge, especially in rural communities lacking infrastructure, becomes possible with QTA because there is no requirement for cell towers. QTA provides a non-line-of-sight communications framework and does not require radio towers. A single QTA can receive Wi-Fi signals from both terrestrial and satellite sources and act as a repeater. Since Antenna Pixels allow frequency dynamics, QTA becomes a natural basis for a distributed communications grid without the need for extensive legacy infrastructure. Also, cloud computing relies on software as a service and constitutes a delicate global ecosystem that demands high bi-synchronous data rates, minimal error margins, and large-scale connectivity. QTA is an optimum solution because its Antenna Pixels provide "Last-Inch-of-the-Last-Mile" coverage for countless disparate devices, overcoming multipath issues and penetrating walls or other obstructions. The transfer function in QTA allows efficient use of available bandwidth, and because fewer nodes are needed, a Super Wide Array Network (SWAN) mesh can form. This not only conserves energy-potentially by as much as 50%—but also reduces the costs and power burdens associated with data centers. Because QTA's internal efficiencies are significant, it serves as a "green" wireless option.

Also, QTA independently provides a multidimensional, near-instant quantum mechanism for safeguarding integrity at the point of wireless exchange. QTA therefore enables secure wireless financial transactions, which call for high-level biosecurity and real-time fraud detection, augmented by data mining tools and advanced AI. All these systems must seamlessly integrate with today's complex telecommunications environment. QTA transitions effortlessly among fiber, twisted pair, cables, satellite uplinks, cell towers, microwave downlinks, the internet, 5G, and Bluetooth. It offers verifications and protections against spoofing, malware, and other unauthorized access while also meeting military-grade encryption needs to resolve weak links in wireless financial transactions. QTA's higher data transfer rates expand bandwidth in any wireless network-whether for supply chain, telemedicine, entertainment, live events, streaming, augmented reality, or AI. The comprehensive solutions QTA provides are too numerous to detail fully within this application.

Antenna Pixels 50 provide an improved method for RF signal to be steered, polarized, and manipulated dynamically. Antenna Pixels 50 can allow optimum transceiver (antenna) patterns to be created on-the-fly. The present disclosure can optimally operate in the areas of multi-path interferences because its principal of operation is derived from both the wavelet/photonics that comprise every single RF signal, allowing operation of the present disclosure as a dual, particle-wave system. A quantum principle of the QTA is that it does not require additional electricity. There is no separate power supply or electrical means, like powered MiMo 5G Antennas. For example, current "Mc-Flat Face," Star-Link or Via Sat small format satellite dishes, all require separate electrical connections. Not only are they not able to fit into a cell phone, but their power requirements alone could never be satisfied by small battery-operated mobile devices.

Effective dual particle and wave nature contribute to QTA's ability to be extremely small, flexible, even conformal, or compacted. They have low mass, (both weight and volume) often a ½ gram and ½" by 1"×⅟₃₂" compared to conventional antenna designs of 1 meter and weighing pounds. This makes QTA ideal for aircraft or spaceflight systems where weight and volume are the essential requirement, following best functional connectivity that is available. QTA offers connectivity, able to operate in GPS or communication denied areas or during emergency or disaster mitigation and recovery. As electric vehicle traffic increases, the need to maintain safe autonomous driving is likewise increased. QTA's are a natural solution as they can operate and provide wide connectivity inside the vehicle and even monitoring safe driving, or providing wireless control to battery, motor, radio, WiFi, all in Faraday-cage-like environments or high EM impacted situations.

QTA's Antenna Pixels 50 form the perfect platform for peer to peer and mesh network systems, and the Quantum Transceiver Antenna is not frequency or bandwidth dependent. It is contemplated by the present disclosure that entire "virtual" inter/intranets (Cloud/Information Computing) in existing network structures, can also "piggy-back" as a carrier wave using the QTA.

The present disclosure teaches that Antenna Pixels are very useful to create 1) broad-band antennas that are very efficient 2) that EM signals do not necessarily have to interfere with each other, (destructive interferences) in reception and for transmission. Therefore, QTA dispenses with having to have multiple frequency dedicated antennas and antenna means that are normally required to isolate and overcome these interferences. The present disclosure teaches that QTA as a single broad-band antenna is highly advantageous for mobile computers and devices to service operational requirements for receiving GPS, GSM, WiFi, Blue-Tooth, 3G, 4G, LTE, 5G, etc. With QTA, Antenna Pixels transceiver functionality of multiple signals does not necessarily impinge and interfere with the wireless objective. For example, one QTA can efficiently transceive AM/FM; L1, L2, L3 GPS, and WiFi, Bluetooth, IoT and 5G RF frequencies which previously required separate dedicated antennas. All these RF Frequency Spectrums, though disparate, can be combined in the QTA because of Antenna Pixels. Touch-Screens and other sensors can even be combined and assigned to specific Antenna Pixels in the Matrix 150.

QTA in mobile devices, satellite or in cloud applications, do not have to be isolated "electrically" nor grounded. The present disclosure shows that it is not required to isolate multiple frequencies. It is possible to combine spectrum and functions using fewer intermediary devices. QTA also improves "interoperability," even between equipment from dissimilar manufacturers or wireless service providers, regardless of frequency spectrum.

"Patch-type" antennas attempt to overcome connectivity problems in mobile devices. QTA with Antenna Pixel 50, may be formed as a small patch format. With QTA there is no need to channel RF signals through extremely precise waveguides, nor is there typically the need for powered amplifiers in order to either receive or send the signals as a single tuned signal. Using QTA, no wave guides are required. Without the need for waveguides or other intermediary devices, QTA manufacturing, maintenance and ultimate cost is significantly reduced. The electromagnetic lenses from the QTA's Torus Field Effects on the Antenna Pixel Matrix 150 are so efficient, and allow for transparency in the particle nature, that efficiencies translate to both "Line of Site" operation, and when operating in "Non-Line-Of-Site" situations or in areas where there is multipath interference from buildings or metal.

Antenna Pixel 50 increases efficiencies to such an extent that stable, unmoving platforms or towers are no longer required, making way for effective connectivity for Last-Inch-of the-Last Mile solutions. QTAs do not need compensating or correcting gyroscopes as are usually required. Rain, wind and inclement weather typically does not interrupt, suspend or degrade wireless service of QTA because of the efficiencies of the Antenna Pixels. QTA is advantageous to Military, First Responder and Emergency Workers, because reliable and uninterrupted communication remains vital to save lives.

Because of the simplicity and the redundancy of the Antenna Pixel 50 they are typically not susceptible to corrosions and fractures at the small joints and interconnections. Antenna Pixel 50 are ideal for handheld devices, because they are not susceptible to the shock of being dropped because there are no wave guides to become misaligned or broken. Even normal perspiration, or the condensation from talking during cell phone conversations does not create significant degradation of RF signal resolution via oxidation, even over prolong periods of time. QTA provides connectivity with precision, stability and alignment when users desire connectivity or communications at higher frequencies from Giga to Terahertz.

Resonance of the entire antenna is usually the most important aspect of its design. As antennas are required to operate at higher frequencies, the bandwidth covers logarithmic increases of the frequency spectrum, more antennas are usually required. This is because the gap between the wave antenna's "center-point" design is much too large and additional antennas must be deployed. As Antenna Pixel 50 dispenses with any predetermined resonance another unobvious advantage of QTA means greater bandwidth, with better efficiencies and often a single QTA antenna solution with no frequency gaps in the spectrum.

The generic term wavelength is left over from the very early days of radio. Frequencies were measured in terms of the distance between the peaks of two consecutive cycles of a radio wave instead of the number of cycles per second and no thought as to their dual particle nature was considered. As discussed previously, radio signals are multi-dimensional, complex, and travel through time and space in dynamic ways; not unlike invisible wisps of smoke which twist, turn and writhe in the effects of the magnetic flux, interactions and interferences.

The Formula for Calculating "Wavelength": C is the velocity, which is the speed of light $\sim 3.00 \times 10^8$ m/sec; $\lambda$ is the wavelength; v is the frequency; You take the speed (C) and divide it by the frequency (v) to get the wavelength (2). Using the value $3.00 \times 10^8$ m/sec will calculate wavelengths for electromagnetic radiation. For speed of sound calculations, C will be about 343 m/sec. Using this formula, for example, a 200 Hertz antenna would need to be nearly 1,500,000 meters long (almost 932 Miles) to resolve the full wavelength; a 20 MHz antenna would be 15 meters long (49.2 feet end to end) at its full wavelength; even at a ¼ wavelength the antenna would need to be 3.75 meters (12.3 feet). At 200 Mhz the full wavelength is 1.5 meters (4.92 feet). In contrast, a single QTA of the present disclosure, Antenna Pixel 50 would be smaller than ½ inches by 1 inch by 0.003-inch thickness and weigh less than ½ gram and this single QTA would operate from 20 Hz to well beyond 40 GHz.

Through the present disclosure, QTA teaches a better understanding of how Radio Signals are comprised and how and what affects their transmission, travel, and reception. Cymatics is a way to visually look at resonances in the audio spectrum. Through the entire frequency spectrum, frequency analyzers are a limited two-dimensional RF tool. Spectrum Analyzers assume a single resonance or ratio to a single resonance. They do not consider multiple resonances as cymatics demonstrates. Nor does the application of Spectrum Analyzers provide a way to consider, let alone observe multiple resonances in RF because of the inherent issues in their designs that we will discuss more in depth. However, as visualizers and modeling tools become available the opportunity to use QTAs with their beneficial Antenna Pixels for Software Defined Radio solutions are finally here.

EM Signals are comprised of oscillations, defined by resonance(s) and described by their "wave-state" and may be envisioned by formulae as a "snapshot" almost like an Electromagnetic Hologram (EmH) of information that can be exchanged by an enabling Quantum Transceiver Antenna. These EmH are separate signals and do not appear to be affected by travelling through different mediums. EM waves are usually dramatically affected in nonlinear media, such as glass, metals, concrete, water, wood, crystals, or interactions between light, static electric and magnetic fields—these interactions include the Faraday effect and the Kerr effect, among many others. The preceding describes not only natural environments but comprise our modern urban cities and rural landscapes. How RF is affected by environments, circumstances, and even by design, is well explored and understood by the application of Snell's Law, Maxwell, Lorentz, Dirac and ET Whittaker and so many others. However, the application of those understood principles applied to Antenna Pixels, opens new understanding and practical application on how QTA operates in both the particle and wave dual nature as described in the present disclosure.

One of the most important reasons that QTA can operate on the dual nature of EM is that both particle and wave is enabled by the Antenna Pixel 50. This dual nature function of QTA operates even at ambient temperatures, including performing quantum tunneling, allowing transmissions to pass through solid matter as if it was invisible. Whereas classical transmissions of RF antennas upon the same path, result in reflections and refractions of the signal, causing loss, degradation and transmission failure.

Refractions are the changes in direction of a wave due to a change in its speed. For example, Radio waves passing through the atmosphere are affected by certain factors, such as temperature, pressure, humidity, and density. These and other factors cause the radio waves to be refracted, especially as they move from one medium into another in which the velocity of propagation is different. Refraction occurs when a wave traveling through two different mediums passes through the boundary of the mediums and bends toward or away from the normal. This bending is always toward the medium that has the lower velocity of propagation.

In refraction, a wave crossing from one medium to another of different density alters its speed and direction upon entering the new medium. The ratio of the refractive indices of the media determines the degree of refraction and is summarized by Snell's law. For example, light dispersing into visible spectrum as it passes through a prism because of the wavelength dependent refractive index of the prism-like material (dispersion). There are experiments in which the wave and particle natures of electromagnetic waves appear in the same experiment, such as the self-interference of a single photon. True single-photon experiments (in a quantum optical sense) can be done today in undergraduate-level labs. When a single photon is sent through an interferometer, it passes through both paths, interfering with itself, as waves do, yet is detected by a photomultiplier or other sensitive detector only once. The frequency of a wave is its rate of oscillation and is measured in hertz (Hz), where one hertz is equal to one oscillation per second. Radio Waves and Light often have a spectrum of frequencies which sum together to form the resultant wave. Different frequencies undergo different angles of refraction.

Waves of the electromagnetic spectrum vary in size, from very long radio waves the size of buildings to very short gamma rays smaller than atom nuclei. Frequency is inversely proportional to wavelength, according to the equation: $V = f\lambda$ where v is the speed of the wave (c in a vacuum, or less in other media), f is the frequency and $\lambda$ is the wavelength. As waves cross boundaries between different media, their speeds change but their frequencies remain constant. Interference is the superposition of two or more waves resulting in a new wave pattern. If the fields have components in the same direction, they constructively interfere, while opposite directions cause destructive interference. The energy in electromagnetic waves is sometimes called radiant energy.

The present disclosure takes into consideration and is based upon the fact that electromagnetic radiation has particle-like properties as discrete packets of energy, or quanta, often associated with photons. The frequency of the wave is proportional to the particle's energy. Because photons are emitted and absorbed by charged particles, they act as transporters of energy. The energy per photon can be calculated from the Planck-Einstein equation: E=hf where E is the energy, h is Planck's constant, and f is frequency. This photon-energy expression is a particular case of the energy levels of the more general electromagnetic oscillator whose average energy is used to obtain Planck's radiation law.

While the "wave-nature" of EM and RF are subject to interactions, interferences, reflections and refractions; in QTA, the underlying particle nature, photonic, "wave-state" may be preserved, and physical objects become as "transparent." The current state of the art teaches that quantum computing or quantum effects, require near absolute zero temperature to achieve entanglement. The QTA operates at nearly any temperature, even at ambient temperature. Even in EM and RF signals that have undergone attenuation, the underlying particle, photonic "wave-state" appears to remain preserved and available because of Antenna Pixels 50 and Antenna Pixel Matrix 150. EM waves are typically described by any of the following three physical properties: the frequency f, wavelength 2, or photon energy E. Frequencies range from 2.4×1023 Hz (1 GeV gamma rays) down to the local plasma frequency of the ionized interstellar medium (~1 kHz). Wavelength is inversely proportional to the wave frequency, so gamma rays have very short wavelengths that are fractions of the size of atoms, whereas wavelengths can be as long as the universe. Photon energy is directly proportional to the wave frequency, so gamma rays have the highest energy (around a billion electron volts), and radio waves have very low energy (around femto electron volts). These relations are illustrated by:

$$f = \frac{c}{\lambda} \text{ or } f = \frac{E}{h} \text{ or } E = \frac{hc}{\lambda} \qquad \text{(Eqn. 1)}$$

Where c=299,792,458 m/s (speed of light in vacuum) and h=6.62606896 (33)×10⁻³⁴ J·s (Planck's constant).

In the present disclosure QTA, the underlying particle, and photonic "wave-state" are available because of the interactive field effects via Antenna Pixel Torus 95 and electromagnetic lenses. This affords an entirely new kind of Quantum Transceiver Antenna of near, limitless EM and RF Frequency tunability, enabling useful transceiver advantages upon the dual particle and wave nature. The theory of the interaction between electromagnetic radiation and matter is described by the theory of quantum electrodynamics. Even though the discoveries of Quantum Electro Dynamics (QED) are in many cases more than a century old, the implications are only just recently being expressed in terms of military and commercial products, and discoveries and/or applications like the present disclosure QTA. Being a central concept of quantum mechanics, the duality of particle/wave addresses the inadequacy of classical concepts like "particle" and "wave" in fully describing the behavior of not only quantum-scale objects, but all physical matter.

The present disclosure enables the practical application of principles that were once confined to theoretical domains. Through the integration of Antenna Pixel 50 in a plug-and-play configuration, conventional electronic systems—regardless of their optimization for quantum processes—can realize substantial improvements in performance and efficiency. These improvements include reduced latency in signal transmission, lower electrical resistance which minimizes heat generation and entropy, and increased gain in electromagnetic signal transceiving. The system further supports near-instantaneous bidirectional communication and cleaner electromagnetic signal quality through reduced noise. As a result, connected electronic devices require less power to operate while benefiting from significantly greater efficiency in data storage, transmission, and processing. This includes enhanced capabilities for handling complex digital tasks such as blockchain transactions and other forms of high-integrity data exchange. Overall, the energy required to create, modify, transfer, retrieve, or delete a single bit of information is markedly reduced, contributing to broader system-level efficiency gains.

Quantum entanglement, also called the quantum non-local connection, creates useable phenomena the inventors pioneered and utilize in the QTA. This is first made possible through the basic building block of the Antenna Pixel. Second, the Field Effect Torus created by the interactions in the Antenna Pixel Matrix are very efficient in reducing impedance/resistance. Ohms Law applied to Antenna Pixels provides a clear, non-obvious understanding of the application of the "Q" of a QTA system, and its efficiencies. The fundamental approach for a plurality of resonances of the Antenna Pixel Matrix cannot be applied to classical "wave-only" approaches which are essentially and inseparably linked by necessity to ratio of a single resonance. Changing power handling, even if it were possible, is impractical since the entire antenna structure is "summed" in totality. Recall, resistance theory to reduce impedance in classical physics is based upon greater mass and increased volume. How can you change resistance in such a monolithic structure? It only results in mismatches of value between the antenna and the RF signal causing loss of tuning of the entire antenna and compromised wireless connectivity. QTA, on-the-other-hand, through Antenna pixels, make variances, even on-the-fly of power handling impedance, voltage, current, magnetics, etc. possible. These factors all contribute to increased efficiencies in the Q of the QTA system. Thirdly, better efficiencies make generating the electromagnetic lenses easier with less resistance allowing stronger plurality of resonances in both particle and wave nature simultaneously. Fourthly, because Quantum Entanglement may involve entire systems at the macro, physical level, not just subatomic schema means are available for practical use. For example, the interaction of entangled systems described by various mathematics as probability wave functions, creates a multi-dimensional tomographic landscape, previously described as Electromagnetic Holography (EmH). EmH Signals offer a schema means, similar to the concept of a Hologram. But when they are observed their dimensional landscape of probabilities collapses and a binary result is presented. This concept is used in creating Q-Bits for quantum computing.

These EmH Signals carry, and may convey, incredible amounts of information. Quantum entanglement is a property of a quantum mechanical state of a system of two or more objects in which the quantum states of the constituting objects are linked together so that one object can no longer be adequately described without full mention of its counterpart-even if the individual objects are spatially separated in a space-like manner. The property of entanglement was understood in the early days of quantum theory, although not by that name. Quantum entanglement phenomena, which has been recently demonstrated to be significantly faster than the speed of light, is at the heart of the EPR paradox. This interconnection leads to non-classical correlations between the observable physical properties of remote systems, often referred to as non-local correlations. Quantum mechanics holds that observables, for example spin, are indeterminate until some physical intervention is made to measure an observable of the object in question. In an aspect of the present disclosure, this phenomena or process is defined by the term discrimination.

To take advantage of EmH Signals in QTA, requires the introduction of several other unique and unobvious concepts. First, that the indeterminate state of an entangled system(s), prior to discrimination is more useful than after observation. Prior to discrimination, quantum theory describes a near infinite state of possibilities. Upon discrimination, which causes subsequent entanglement system collapse, a binary outcome is the result. In the indeterminate state, vast amounts of information/intelligence can be exchanged, received or transmitted via the Antenna Pixel 50 and the QTA's Antenna Pixel Matrix 150. The EmH signals coming in contact with the QTA convey a "resonance" of near limitless probabilities that attempt to "ring," and harmonize through the electromagnetic lenses of the Antenna Pixel Torus 95. The immense scale and practical application of EmH Signals can enable entire databases and libraries to be wirelessly transferred nearly instantaneously, in the near field and/or far field. EmH "resonance" within the intermediary state is possible and contemplated. Therefore, "holographic" object-oriented pattern searches that are based on likeness or similarity of patterns (landscapes of Tomography or Topography) representing resonances or sub-resonance(s) Prime Vibrational Frequencies can be used. In EmH Signals, dissimilarities for exclusion probabilities may be highly useful. Comparing a financial transaction's EmH in the intermediary state, proceeding under QTA would allow near instant examination, even supplemented by AI, to see if the EmH signal contained any known patterns of fraud, deception, or deceit.

Large system(s) are routinely entangled, atomic to micro to macro. When applied to Radio Signals this means that in some way, the particle nature of EM de-facto creates, in the Electromagnetic Holography, a landscape of information of the particle photonic "wave-state" via the wavelets (packages or groups of photonics) that comprise the "wave" properties of the Radio Signal itself. Each Electromagnetic Holography "signal" is unique, having a fingerprint or biometric measurement. These EmH signals have dynamic properties, not static, that may be interactively used and exchanged through QTA. Thus, "broken" or separated parts of an EmH Signal, contain the information of the whole EmH Signal. Therefore, through QTA method or process, using enabling Antenna Pixels, broken EmH Signals may be resolved.

Electromagnetic Holographic Signals can be exchangeable by QTA during a unique intermediary state (IS). The intermediate state is defined as post entanglement, but prior to discernment and collapse. An aspect of the present disclosure relates to a method and process whereby changes or exchanges, through influences of the Antenna Pixels' intermingled Field Effects Torus, whereby additional information, "Additional Properties Exchanged" ("APEx") may be overlaid, during the Intermediate State (IS). This is a separate intelligence property methodology that may be introduced both tomographically, and topographically, as EmH Signals. These new exchanged properties APEx may become jointly and irrevocably entangled during the intermediate state. The resultant combination of these properties of intelligence is that they may be thought of as a new kind of carrier-signal means. Further they may be created, as a second order entanglement(s) producing what it known as a new "probability condition(s)" in which is imprinted (conveyed property) onto the EmH Signal, during the Intermediary State by the QTA.

Another benefit of the properties of QTA includes that they may not be affected by distance, latencies, non-line-of-site, obstructions, ground-planes, materials, interactions or other phenomena. This process and methodology may allow a "wave" signal, broken by multipath or other kinds of interferences, obstructions or interactions, to still contain the wave-state intelligence via its constituents, even if separated in parts. The Antenna Pixel 50 may be configured to reconstruct or extract the original intelligence from the broken RF signal, by establishing a resonance with the underlying EmH Signal. The QTA would need only to gain resonance from both the broken signals, including wave nature and particle nature. This is possible because of Antenna Pixels 50.

Quantum Entanglement requires that the entanglement waveform must collapse in order to determine information about the entanglement itself. The destructive pre-requisite makes useful quantum computing and any everyday quantum devices challenging. QTA offers an alternative by keeping the waveform intact and not collapsing the entanglement. This allows QTA to achieve advantages from EmH Signals and to exchange properties interactively during the Intermediate State.

In another method or process in the current invention, QTA, the Electromagnetic Holography Signal(s) may remain in the Intermediary State generating unique exchangeable properties to EM Signals. Using QTA, EmH Signals, may be preserved and not "collapse" the entanglement. Information may be exchanged and transceived by QTA in new accelerated and more efficient ways.

The Antenna Pixels 50 of the QTA can take advantage of both the particle and wave nature of EM signal through an Artificial Intelligence (AI) driven "difference engine" that is configured to compare the topography, tomography, and/or other probability function landscapes of EmH Signals, without necessitating entanglement collapse. In this manner, the Antenna Pixel 50 is configured to combine, subtract truncate, or modify wave-states, as may be required. Thus, QTA exhibits Quantum Correlations. Quantum Correlations may be conveyed or even entangled chains of properties on the EmH Signals. Additionally, entire individual complex EmH Signal chain(s) of properties or Signal Chains or "communities" of 1 to N unique wave-states may be "carried" upon conventional EM signals and then deconstructed by an AI difference engine for practical purposes. To facilitate QTA using EmH with quantum correlations custom chips, field programable gate arrays, and other software-as-a-service systems by information cloud may be used.

Entanglement and Quantum Correlations are by definition, faster than the speed of light. Therefore, QTAs using EmH Signals and/or Quantum Correlations, are by nature near instantaneous. The combination of these QTA EmH and Quantum Correlations can produce or effect other superluminal (faster than light) processes or methods, that can also be used to significant practical advantage with the QTA. A preferred embodiment of a QTA space-based network may simultaneously use simple or complex quantum correlations from an orbital platform beyond Mars, which remains quantumly connected to another QTA based on the moon, and further connected with the Earth through a network of nodes numbered 1 to N. In this embodiment of a QTA space-based network, near instantaneous communications are enabled anywhere within the QTA network without ever collapsing the waveform and without the usual time delay (latency) associated with conventional EM signal transmission.

Quantum entanglement and quantum correlations suggest that regardless of how an originating signal is broken by various interferences, the remaining wavelet(s) retain the basic wave-state intelligence of the originating signal. The "Q" of a system, 1 being the ideal, gives rise to its efficiency, potential loss, and associated entropy or order. As discussed previously, better Q and plurality of Resonances is a major benefit of QTA and made possible with Antenna Pixels.

Resonance may be one of the single most important issues central to all telecommunications. Resonance is fundamental to both the wave and the particle nature of all matter. In one exemplary embodiment, and in reference to other preferred embodiments of the QTA, resonance at the quantum level is examined using hydrogen as a model system. This analysis serves to illustrate the critical role of resonance in enabling the transmission and reception of signal intelligence via radio frequencies, beginning at the fundamental particle level of matter using QTA. It is through such particle-level resonances that wave-states are imparted to the wave nature of matter, thereby facilitating the QTA's functional integration of quantum behavior in signal processing.

Resonance is the tendency of a system to oscillate at larger amplitude at some frequencies than at others, or by the synchronous vibration of a neighboring object. These are known as the system's resonant frequencies (or resonance frequencies). At these frequencies, even small periodic driving forces can produce large amplitude oscillations. Resonances occur when a system can store and easily transfer energy between two or more different storage modes. (Such as kinetic energy and potential energy). However, there are some losses from cycle to cycle, called damping. When damping is small, the resonant frequency is approximately equal to a natural frequency of the system, which is a frequency of unforced vibrations. Some systems have multiple, distinct, resonant frequencies.

Resonance phenomena occur with all types of vibrations or waves: there is mechanical resonance, acoustic resonance, electromagnetic resonance, nuclear magnetic resonance, electron spin resonance and resonance of quantum wave functions; "wave-state(s)." Resonant systems can be used to generate vibrations of a specific frequency (e.g., musical instruments, ultrasonic imaging, antennas), or pick out specific frequencies from a complex vibration containing many frequencies.

Accordingly, resonant systems may be designed or configured to either generate oscillations at desired frequencies—as in musical instruments, ultrasonic imaging devices, and radiofrequency (RF) antennas—or to isolate and detect specific frequencies from within complex, broadband signals. This capacity for precision frequency discrimination and amplification forms the foundational principle enabling the QTA's quantum-coherent signal reception and transmission at the particle and field levels.

Thus, QTA by Antenna Pixels 50 may utilize discrimination to reinforce resonances. This allows for increased gain for RF Signals using QTA. Electrical resonance occurs in an electric circuit at a particular resonance frequency when the impedance between the input and output of the circuit is at a minimum (or when the transfer function is at a maximum). A transfer function (also known as the network function) is a mathematical representation, in terms of spatial or temporal frequency, of the relation between the input and output of a (linear time-invariant) system. Often this happens when the impedance between the input and output of the circuit is almost zero and when the transfer function is close to one. A wave function is a mathematical tool used in quantum mechanics to describe any physical system including Electromagnetic Systems, i.e., radio signals, EM. The wave function describes the Wave/Particle duality state of the system. It is a function from a space that maps the possible states of the system into complex numbers. The laws of quantum mechanics (i.e., the Schrödinger equation) describe how the wave function evolves over time. The values of the wave function are probability amplitudes—complex numbers—the squares of the absolute values of which give the probability distribution that the system will be in any of the possible states. Thus, Heisenberg's uncertainty principal is expressed as $$\Delta x \Delta p \geq \frac{\hbar}{2}.$$

These probability functions describe EmH Signals on QTA and explain why the term as tomographic and topographic landscapes of information and intelligence is appropriate. With QTA, proceeding to compare complex, Big Data sets and problems may be approached differently with wireless QTA and EmH Signals.

Quantum Physics teaches that Prime Vibrational Frequencies cannot be separated. By extension, on the QTA, a digital signal "representation" from the originating analog signal is preserved on QTA. Anything in the analog world, presented as a digital construct contains in the EmH Signals, some form of its original Prime Vibrational Frequency(s). The QTA may include a constructed Verification Engine. Questions of veracity, that is what is original verses what is a construct, can be approached within the QTA wireless process. The QTA is configured to determining what is an authorized original vs. what constitutes an unauthorized copy can be achieved with QTA and used directly to enable Digital Rights Management. Antenna Pixels allow signals to be approached through discernment by patterns of resonance. Even approximations or exclusions are beneficial. Furthermore, normally uncorrelatable queries may yield surprising results, revealing correlations not previously imagined.

Query via EM or RF Signals, especially using EmH Signals on QTA, is a "search-engine" tool applied directly to wireless signals, producing another beneficial use of Antenna Pixels, relative to RF Signals and EmH in particular. Through the wireless means, QTA enables precise location services that may be able to tell where wireless information is (stored) or came from or went. For security, the QTA wireless embodiment includes a system that may provide information as to what devices may have sent or received it, by tracking the cookie trail of where it traveled to/from. The QTA wireless embodiment may further provide information as to where it was intercepted or compromised and how that information is currently being used.

Referring to FIG. 1, a single Quantum Transceiver Antenna (QTA) is a wireless system comprised of a plurality of Antenna Pixel 50, configured to form an Antenna Pixel Matrix 150. The antenna pixel 50 reduces mass by as much as 90% or more and introduces voids/nulls 110. The voids/nulls 110 are located where the Antenna Pixels 50 are purposed to create overlapping Antenna Pixel Interactions 100 and electromagnetic field effects 65 as electromagnetic lenses 65. QTA enables a combination of the quantum dual particle and wave nature of EM and RF. QTA is configured to encourage a plurality of resonances, at considerably less impedance. This configuration overcomes classic wave only physics, the fixed frequency, constrained by a fixed wavelength, by means of a fixed ratio, established usually by the length of the wire. Lower impedance means less resistance, less heat, better performance with less power providing longer operations.

As discussed in depth previously, (Ω) Ohms Law provides a very effective and important QTA design tool . . . . Wherein: Resistance (Impedance) "R" is measured in (Ω) ohms, and Current "I" is measured in (Amperes), and Voltage "V" is measured in (Volts). Thus the formula Ohm's Law is: V=IR where Voltage "V"="I" (Amperes)×"R" Resistance (Ω); and whereas: Power (Watts) $W=I^2$ (Amps)×R (Ω); many formula combinations are used by one skilled in the art. As discussed, Antenna Pixel 50 offers an alternative way of gaining a plurality of stronger and available Resonances. Specifically, in FIG. 1, Antenna Pixel 50 through their magnetic fields 90 (which exist perpendicular to the electrical field, E→), create a large, pseudo-three-dimensional, synthetic pixel aperture 60 many orders of magnitude greater than their relatively indeterminate, small physical size as shown in FIG. 2.

A single Quantum Transceiver Antenna, the Antennal Pixel Matrix 150, as illustrated in FIG. 1 (see also FIGS. 3, 7, 16) can effectively replace all antennas in a cell phone while providing increased gain and performance, for all the frequencies. Bluetooth, Cell, Wi-Fi, 3G, 4G, LTE, 5G, GPS, IoT, Satellite, etc. may be consistently transceived by QTA as "high-resolution" EM and RF signals via their antenna pixels which allow multiple resonances at lower resistance. (FIG. 13, 150) Effective QTA are ½ gram and ½" by 1"×⅓₂" inch flexible form factor offering performance below 20 Hz to beyond 1 Thz. Nearly any combination of frequencies of the commercial spectrum, in nearly any orientation, even on moving spacecraft, aircraft, satellites, vessels, rail, automobiles, robots or drones, are usable by the QTA.

A single QTA, the Antennal Pixel Matrix 150, as illustrated in FIGS. 1, 7, and 16 can operate UHF, VHF, AM, FM, CB Radios, Marine and Flight Communications, Radar, Satellite radio, CCTV cameras, Drones, and AI Systems, Financial or Security connectivity. QTAs operate both Line-of-Sight "LOS" and Non-Line-of-Sight "NLOS." QTA overcomes multipath and other interferences, summaries in FIG. 9, while more than cubing the available volume of space to transceive RF signals, as described in FIG. 17. QTA's small format, Antenna Pixel Matrix 150 FIG. 17, is a last-in-of-the-last-mile solution, wirelessly operating through walls, between the inside and outside of buildings, off ground planes, metal, water, or in harsh EM environments like self-drive cars, boats, or a Faraday cage.

Figure 13A:
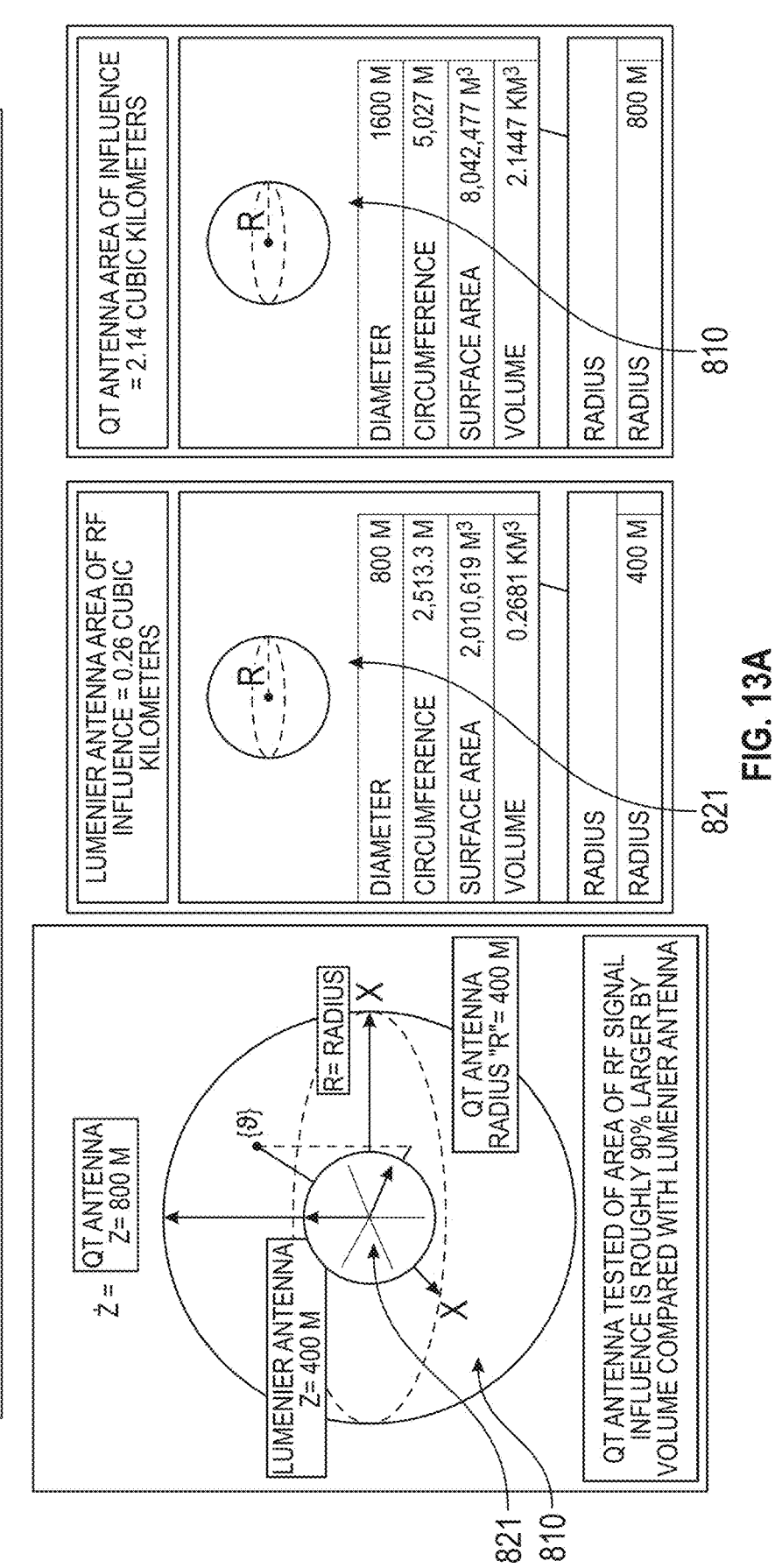
FIGS. 13A-13C show comparative test results confirming the superior gain and signal quality of QTA versus conventional antennas under real-world conditions, in accordance with aspects of the present disclosure.
Figure 13C:
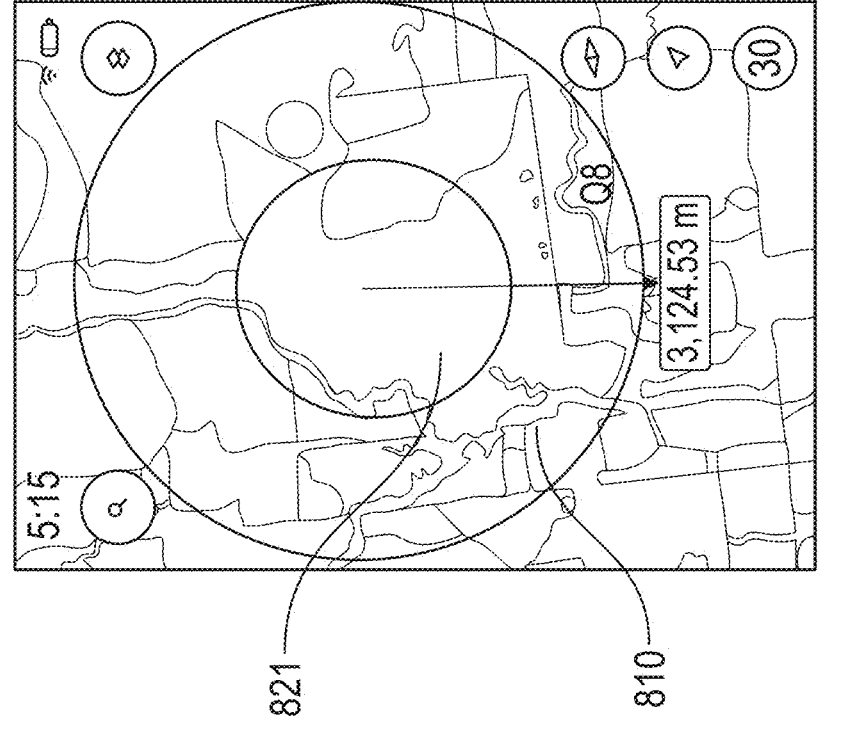
Figure 13B:
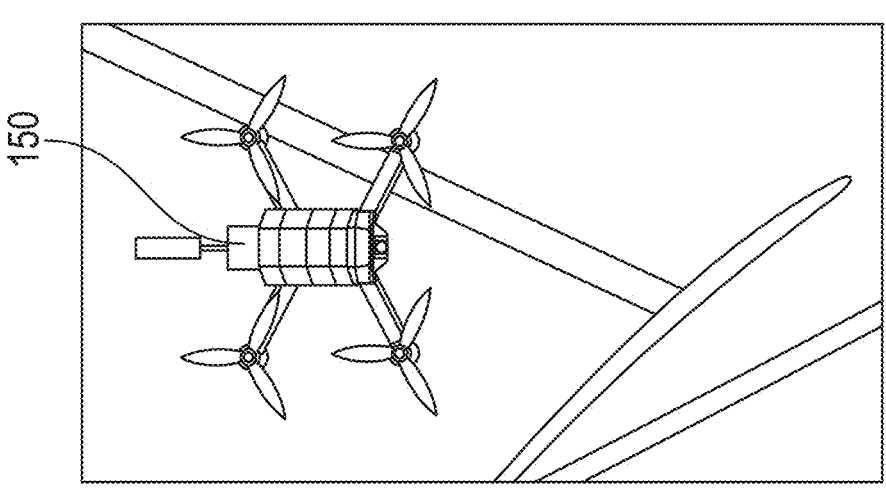

QTA Antenna Pixel Matrix 150, FIGS. 13A-C provides increased life-saving for First Responders, Emergency, Police, Fire Department, Coast Guard or Military Communications, enabling interoperability of communications between all the groups without having multiple antennas, and/or multiple devices. The QTA can transmit and receive in any, and all the allocated fixed frequency bands used for the various divisions of emergency response, "Plug-N-Play" with most manufactured radio systems, FIGS. 13A-C. QTA is manufactured with fewer parts, less materials and reduced complexity. Seamless wireless solution for connectivity to nearly any AI suite, or Software as a Service, especially for expanding services at the edge. FIGS. 13A-C, QTA Antenna Pixel Matrix 150 transceives simultaneously, even in both analog and digital formats, bisynchronous, asynchronous, serially and/or parallel, across broad RF Spectrums even full spectrum (not synthesized) satellite GPS: X, Y, and Z. The Z provides the missing metric of height/altitude and is available on QTA. As illustrated in FIG. 4B, QTA Antenna Pixel Matrix 150, enables clear communications with reduced latency, more data transfers and increased bandwidth. QTA solves the multitude of technical problems caused by limited operations due to "wave only" physics nature.

In accordance with the present disclosure, FIG. 1 illustrates an embodiment of a QTA formed by Antenna Pixel Matrix 150. Antenna Pixel Matrix 150 is comprised of a plurality of Antenna Pixel 50. Antenna Pixel 50 is surrounded by Antenna Pixel Aperture 60, enabling a multidimensional current 70, voltage 80, magnetic field 90, and time/phase (and other dimensions). The multidimensional current 70 is orthogonal to Antenna Aperture 60. Voltage 80 and is orthogonal to multidimensional current 70. Time/phase are orthogonal to Voltage 80. Likewise other dimensions "N" are orthogonal to each further dimension N+1 in relationship to Antenna Pixel 50 and Antenna Pixel Aperture 60. To summarize the advantages and demonstrate near unity, the QTA Antenna Pixel Matrix 150 may be rotated while receiving signals, and the test results may be overlaid. QTA Antenna Pixel Matrix 150 have 95% less mass comparatively, and may be placed into mobile devices, (see FIG. 12) and can transceive wireless signals through buildings without a separate cable means.

Referring to FIGS. 1-3, Antenna Pixel 50 and the Antenna Pixel Aperture 60 enable Antenna Pixel Field Effects Torus 95. Examples of the Antenna Pixel Interactions 100, by these Antenna Pixel Field Effects Torus 95 are shown in voids and nulls 110 in the QTA Antenna Pixel Matrix 150. FIG. 3 illustrates further interactions of voids and nulls 110 with the Antenna Pixel Field Effects Torus 95 by Voids and Nulls 110 as shown in the QTA Antenna Pixel Matrix 150. As illustrated in FIG. 3B, the voids and nulls 110 are configured to interact with the electromagnetic lenses 222 and the Antenna Pixel Field Effects Torus 95 (FIGS. 4A-4C).

In another aspect, FIGS. 4A-4C illustrate further interactions of Antenna Pixel Field Effects Torus 95 by and between individual and groups of Antenna Pixels 100 because of the Antenna Pixel Aperture 60 are possible on QTA Antenna Pixel Matrix 150. This configuration yields various pluralities of resonances, and QTA Antenna Pixel Matrix 150, leads to one to near limitless electromagnetic lenses 65 being available through Antenna Pixel Field Effects Torus 95 in Antenna Pixel 50. Antenna Aperture 60 interacting with one to a plurality of Antenna Pixel 100 of Antenna Pixel Field Effects Torus 95 as well as other Antenna Pixel Field Effects Torus 95 interactions through voids and nulls 110.

Figure 2B:
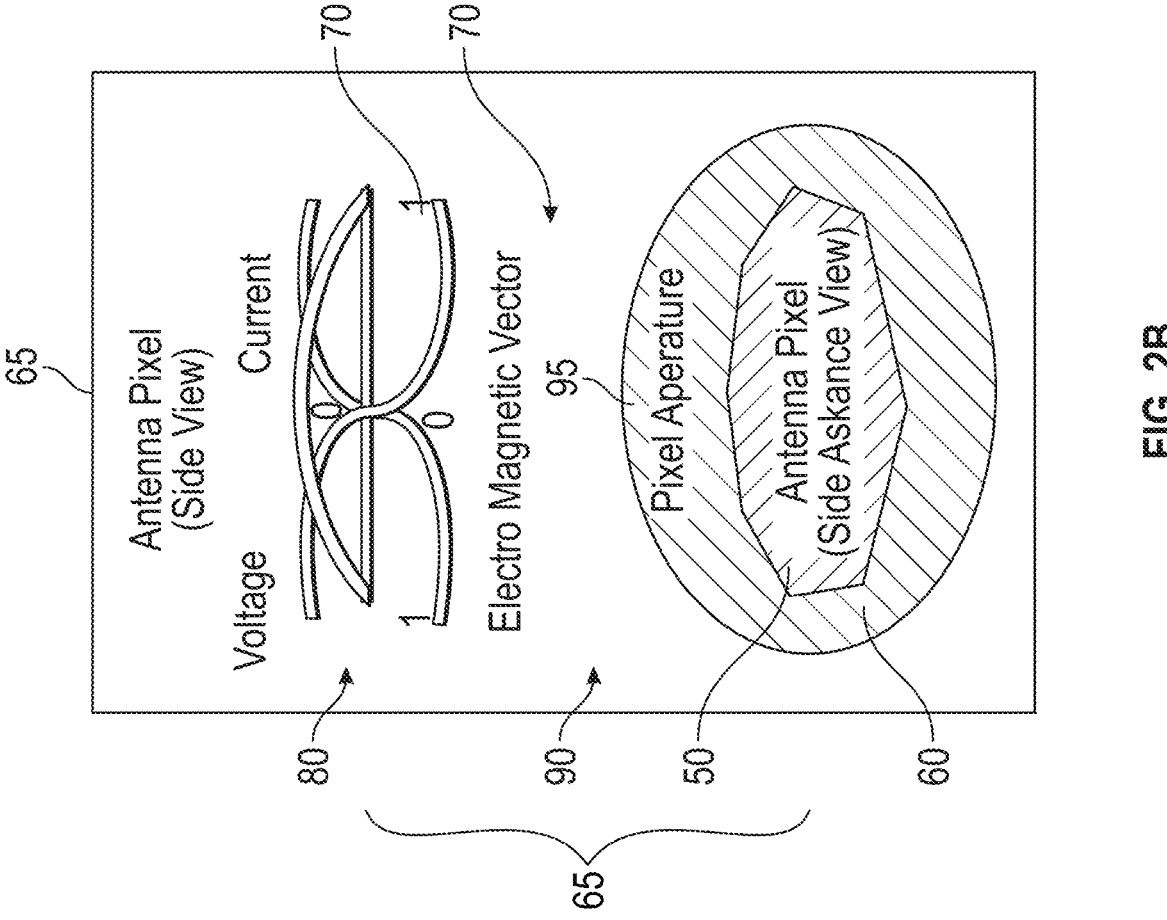
FIGS. 2A and 2B are illustrations of the operational characteristics of individual QTA pixels and their isotropic radiation patterns, in accordance with aspects of the present disclosure.
Figure 2A:
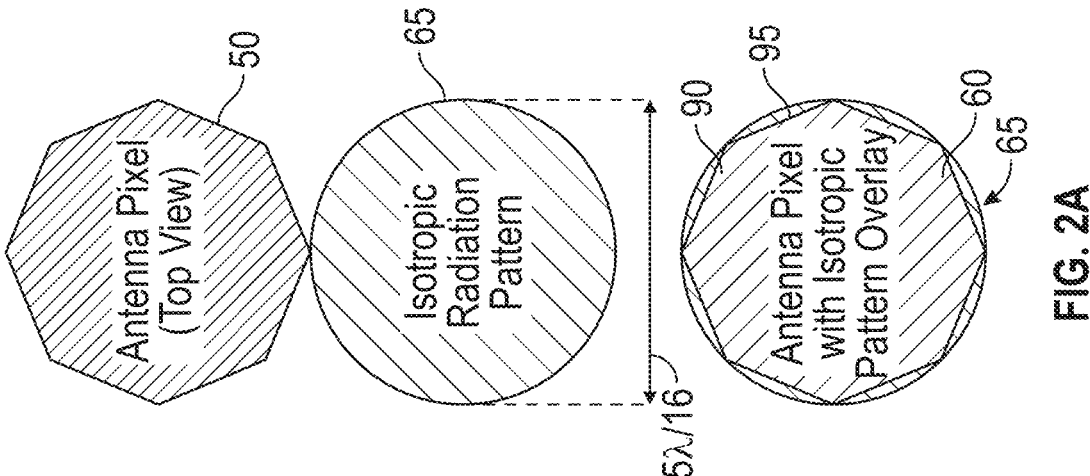

In FIG. 2B an Antenna Pixel 50 and Antenna Pixel Aperture 60 is illustrated in two dimensions including a side and side askance view. FIGS. 2A and 2B illustrate reference Isotropic Radiation Patterns with a suggested wavelength. The Isotropic Radiation Pattern is overlaid on Antenna Pixel Aperture 60. The Antenna Pixel 50 and Antenna Pixel Aperture 60 are an ideal Isotropic Radiation Pattern Generator which may form an EM Field Effects Torus (pattern), Hopf Fibration (pattern), or one to a near limitless Torus Electromagnetic Lenses 65 (pattern), as shown in FIGS. 2 and 3A-C (now used interchangeably) being available through Antenna Pixel Field Effects Torus 95 as illustrated in FIG. 1.

In FIG. 3A a preferred embodiment illustrates a cross-sectional top view of Antenna Pixel 50 interactions. Specifically, FIG. 3A illustrates interactions between the Antenna Pixels 50 and the Antenna Pixel Aperture 60, as well as various interactions between a plurality of Antenna Pixel 50 and voids and nulls 110 on Quantum Antenna Pixel Matrix 150. However, any means or materials may be used or substituted that best encourages pattern generation and interactions of Field Effects. Field Effects form electromagnetic lenses creating a gateway to particle nature transceiver interoperability, frequency dynamic functions and other benefits of dual wave and particle nature EM and RF connectivity. The exemplary embodiment in FIG. 3A illustrates a simplified representation of the Antenna Pixel Matrix Array 150 within the QTA, highlighting the arrangement of individual Antenna Pixel 50. Each Antenna Pixel 50, together with their corresponding Antenna Pixel Aperture 60 and associated one to near limitless electromagnetic lenses 65, operates through Antenna Pixel Field Effects Torus 95. These components collectively form the fundamental building blocks that enable the QTA's ability to simultaneously transmit and receive RF signals as both particles and waves.

Figure 3C:
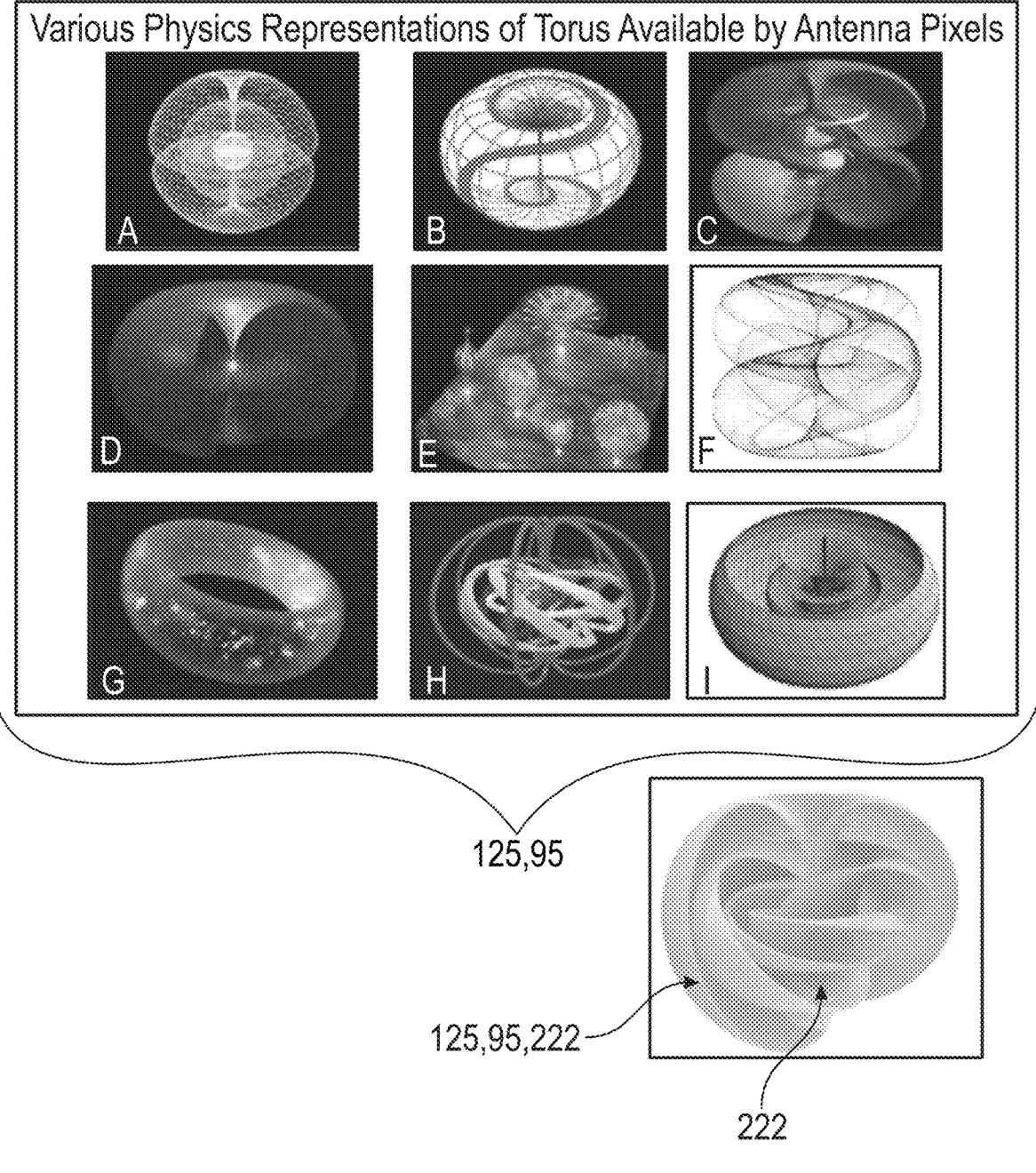
Figure 3D:
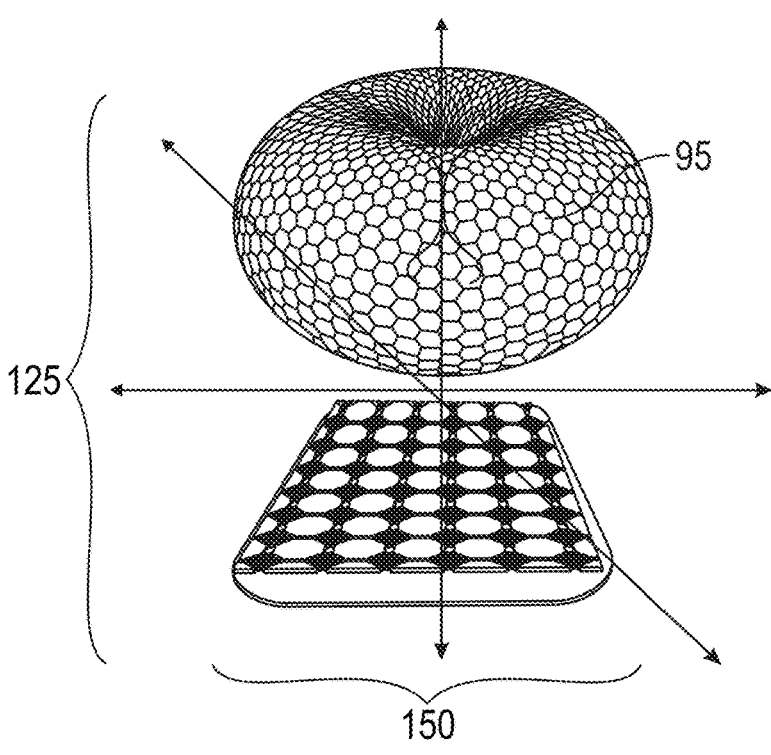
Figure 3E:
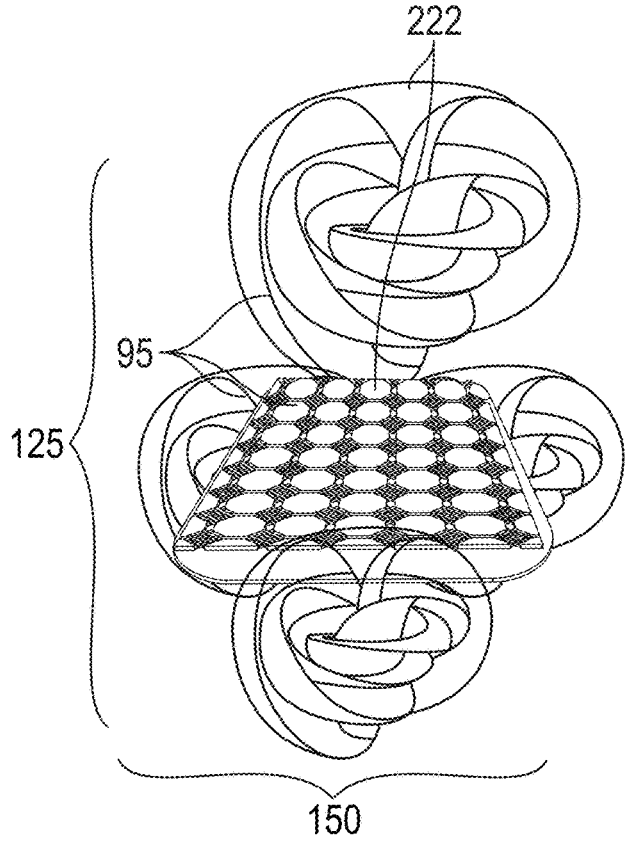

FIG. 3C illustrates various Torus Configurations commonly recognized in physics, specifically focusing on the Antenna Pixel Field Effects Torus 95, which is enabled by Antenna Pixel Aperture 60. As shown in FIG. 3B, even in a single Antenna Pixel 50 can produce a Torus of the Antenna Pixel Field Effects Torus 95 through the Antenna Pixel Aperture 60, giving rise to an array of limitless electromagnetic lenses 65. However, the preferred embodiment of the QTA system utilizes a plurality of Antenna Pixel 50 to form the Antenna Pixel Matrix 150 to maximize performance. FIG. 3C further demonstrates that by applying principles such as Ohms Law and Snells Law, increased power efficiency and stronger pluralities of resonances are yielded. Additionally, FIG. 3B offers mathematical examples for calculating various Antenna Pixel Field Effects Torus 95 for creation of Antenna Pixel Matrix 150 (as in FIGS. 1-3). These calculations enable greater signal gain, stronger resonances, reduce signal loss and noise, and minimize interference-collectively enhancing the system's Q.

Figure 10:
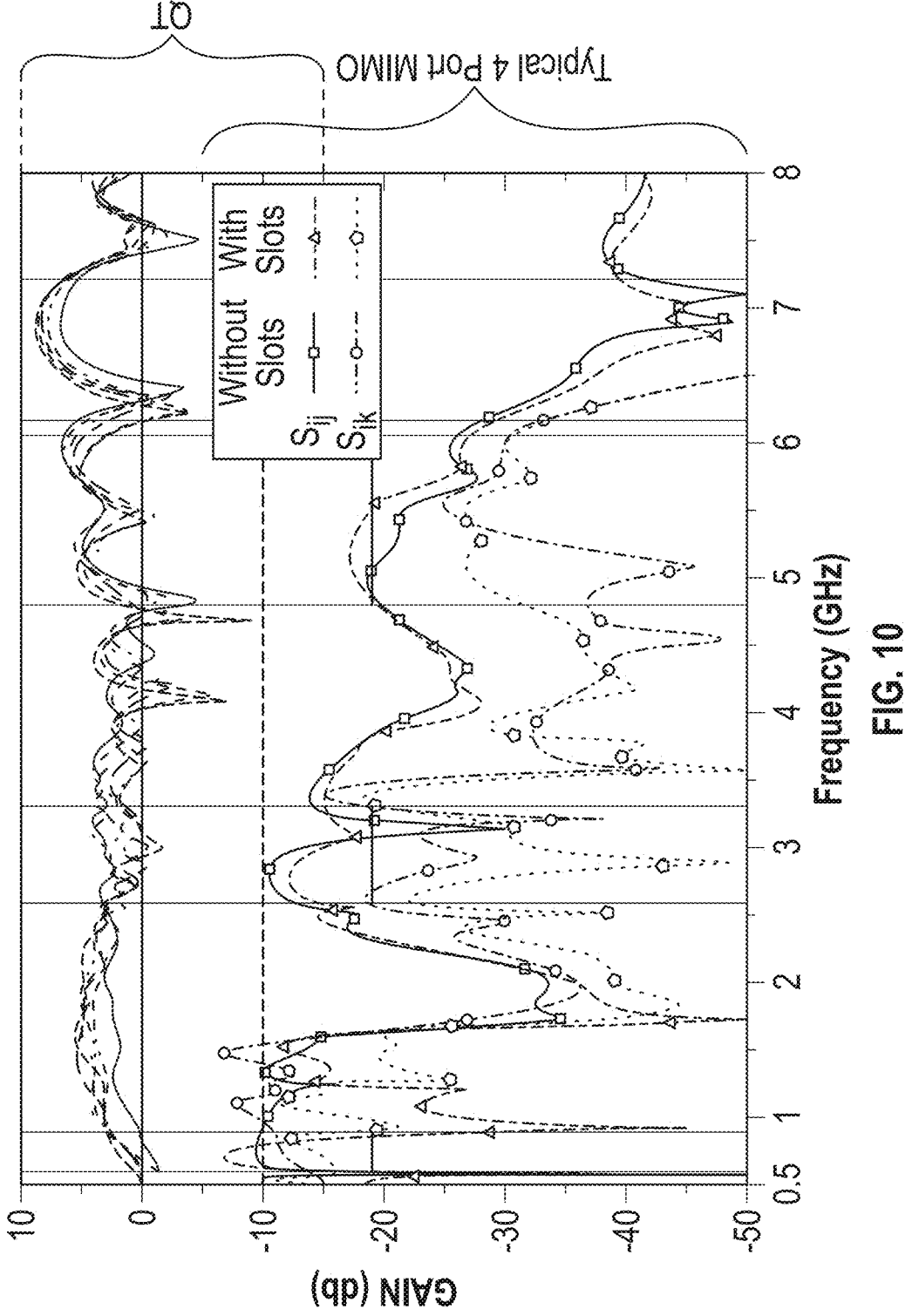
FIG. 10 is a graphical illustration comparing signal gain performance of the QTA against conventional MiMo antennas, in accordance with aspects of the present disclosure.

The WN antennas must remain fixed, face LOS to signal, have separate electricity, and have a separate cable to carry signal from the outside to the inside. QTA Antenna Pixel Matrix 150 eliminates all these limitations. Wavelength oriented antennas designed to operate as a ratio of 512 Mhz would most likely not be able to effectively receive signals for 30 Mhz, 174 MHZ, 2.4 Ghz, or commercially desirable 5G or other frequencies off its 512 Mhz designed center point. However, it is an important concept to understand, that the defined bandwidth of current commercially desirable "5G" is often described from 5 Ghz to 40 Ghz and often to 100 Ghz. Therefore, the center point covers several orders of magnitude greater bandwidth. There is very little chance of wavelength-oriented Antennas being able to operate over such wide spectrums. For example, a typical "powered 5G MiMo 4 pole" WN Antenna, as illustrated in FIG. 10, operating at CenterPoint 6 Ghz would usually not operate 100 Mhz to 200 Mhz off its designed CenterPoint, making it virtually useless to operate below 5.5 Ghz or above 6.5 Ghz. Most Broad-Band antennas do not operate beyond the ratios of the center point frequency they were designed for. Fixed length antennas only operate on the wave nature of RF. That is why conventional antennas have a restricted RF operating envelope; multiple Antennas must be deployed and why the present disclosure QTA Antenna Pixel Matrix 150 overcomes and solves many of the problems of modern wireless connectivity. For example, connecting multiple radios to a single conventional Antenna is seldom accomplished. Moreover, in stark contrast to conventional, prior art WN Antenna systems, the present disclosure, QTA Antenna Pixel Matrix 150 can operate in the new desirable digital formats, in serial or parallel, and/or various hybrids. Conventional antennas usually can only operate serially in an analog capacity.

In contrast, with reference to FIGS. 3D and 4D, the Antenna Pixel Matrix Array 150 of QTA is purposely designed to operate on the dual particle and wave properties of RF signals. As shown in FIG. 3B, each individual Antenna Pixel 50 can gain resonance independently. Alternatively, as illustrated in FIG. 3C, multiple Antenna Pixel's 50 can resonate in concert with one another, and produce a plurality of multiple resonances. This is made possible by the Antenna Pixel Field Effects Torus 95, which is formed through Antenna Pixel Aperture 60 and enables the generation of one to near limitless electromagnetic lenses 65. These lenses facilitate a mathematically precise and highly ordered field interaction that occurs almost simultaneously across the array. The interactions of Pixel Field Effects Torus 95 either individually or through additional plurality of Antenna Pixel 100 and Voids and Nulls 110 are not chaotic and allow for self-tuning resonance with EM and RF Signals in both the wave and particle nature. This may be likened to "micro" to "macro" orchestras able to transceive RF Signals over wide RF spectrums. The QTAs Antenna Pixels 50 may also act as a net, configured to capture RF signals that have been broken by multipath interferences. This allows both the wave and particle nature of EM and RF signals to be utilized, resulting in the detection and utilization of EmH Signals. As a result, the QTA Antenna Pixel Matrix 150 can operate while the radio is connected or placed on the ground (or on metal surfaces), in collapsed buildings, in shielded metal or rubble areas, or inside of heavy equipment, vehicles, boats, submarines, aircraft or spacecraft.

Figure 6A:
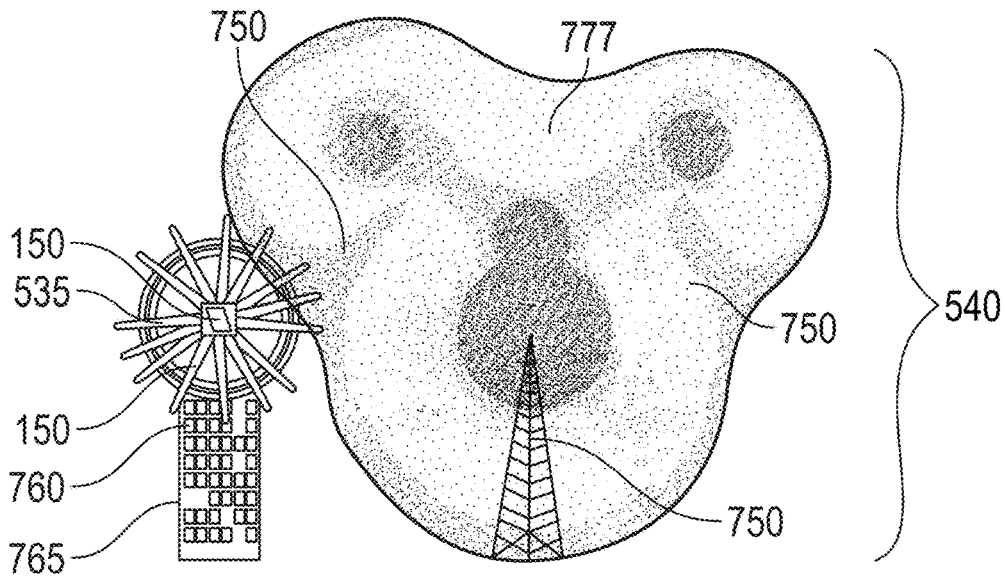
FIGS. 6A and 6B contrast conventional antennas with the QTA demonstrating superior non-line-of-sight signal penetration capabilities in urban environments, in accordance with aspects of the present disclosure.
Figure 6B:
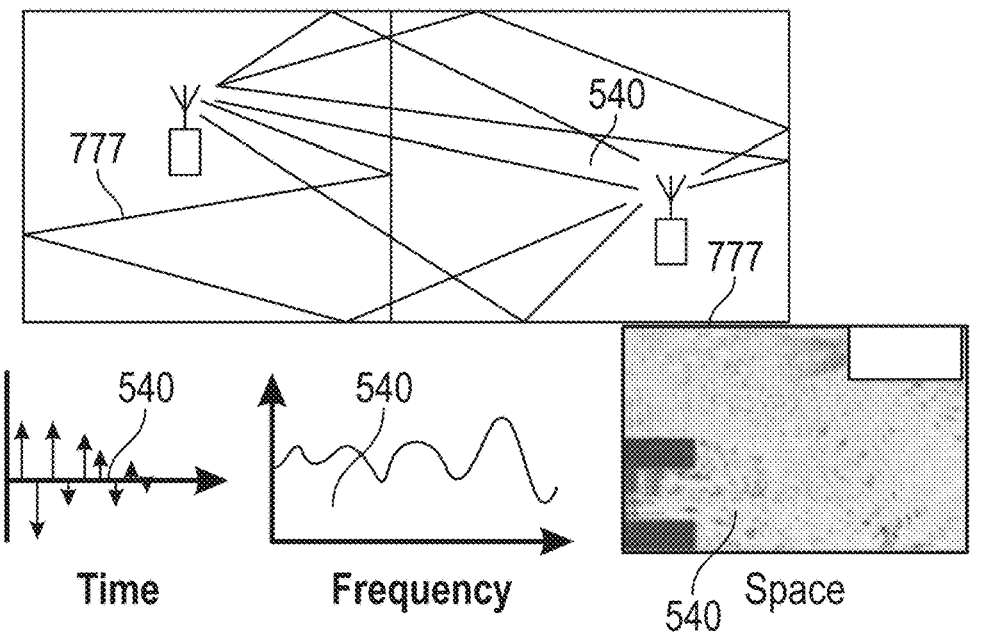
Figure 7B:
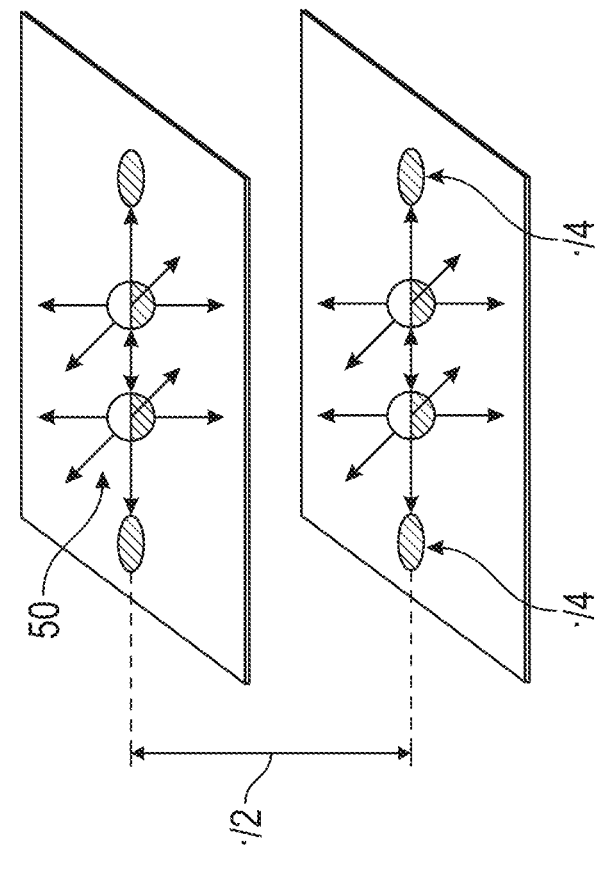
FIGS. 7A-7D are layered and cut-away views of the antenna pixel matrix highlighting the arrangement and interaction of pixels and electromagnetic field effects, in accordance with aspects of the present disclosure.
Figure 7A:
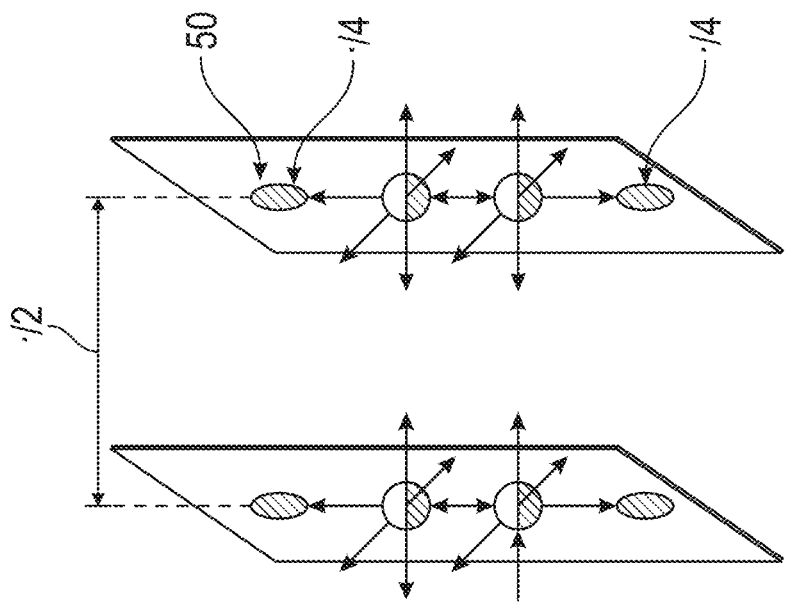
Figure 7D:
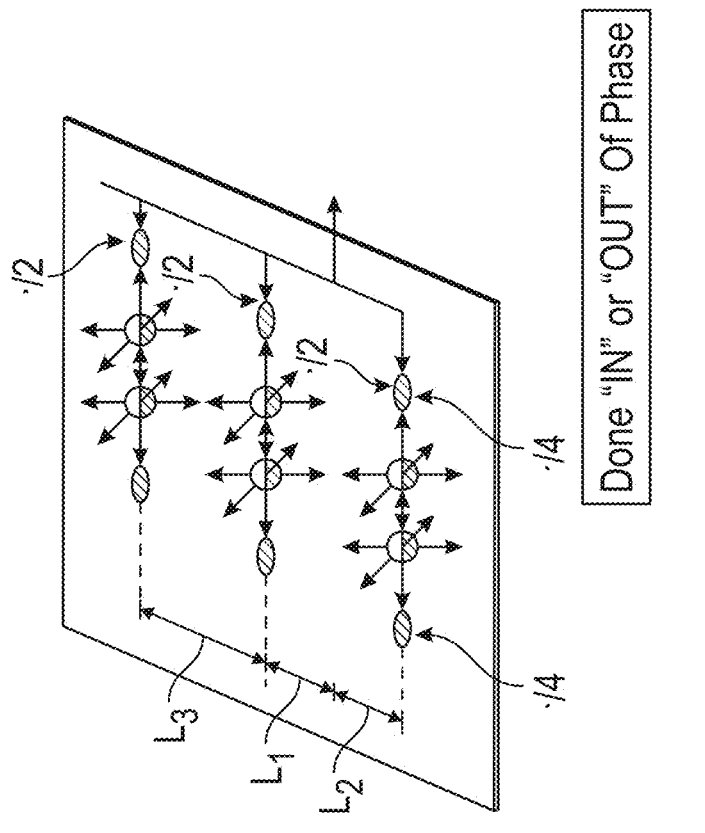
Figure 7C:
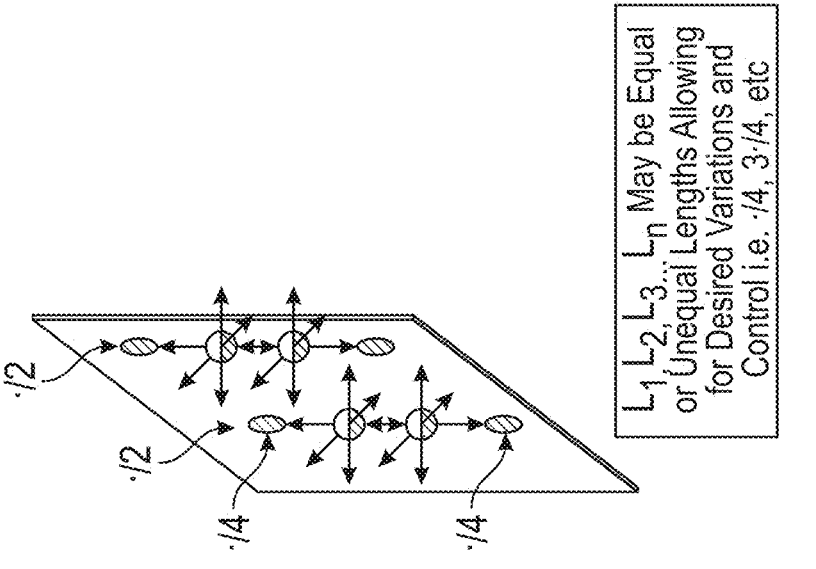
Figure 8:
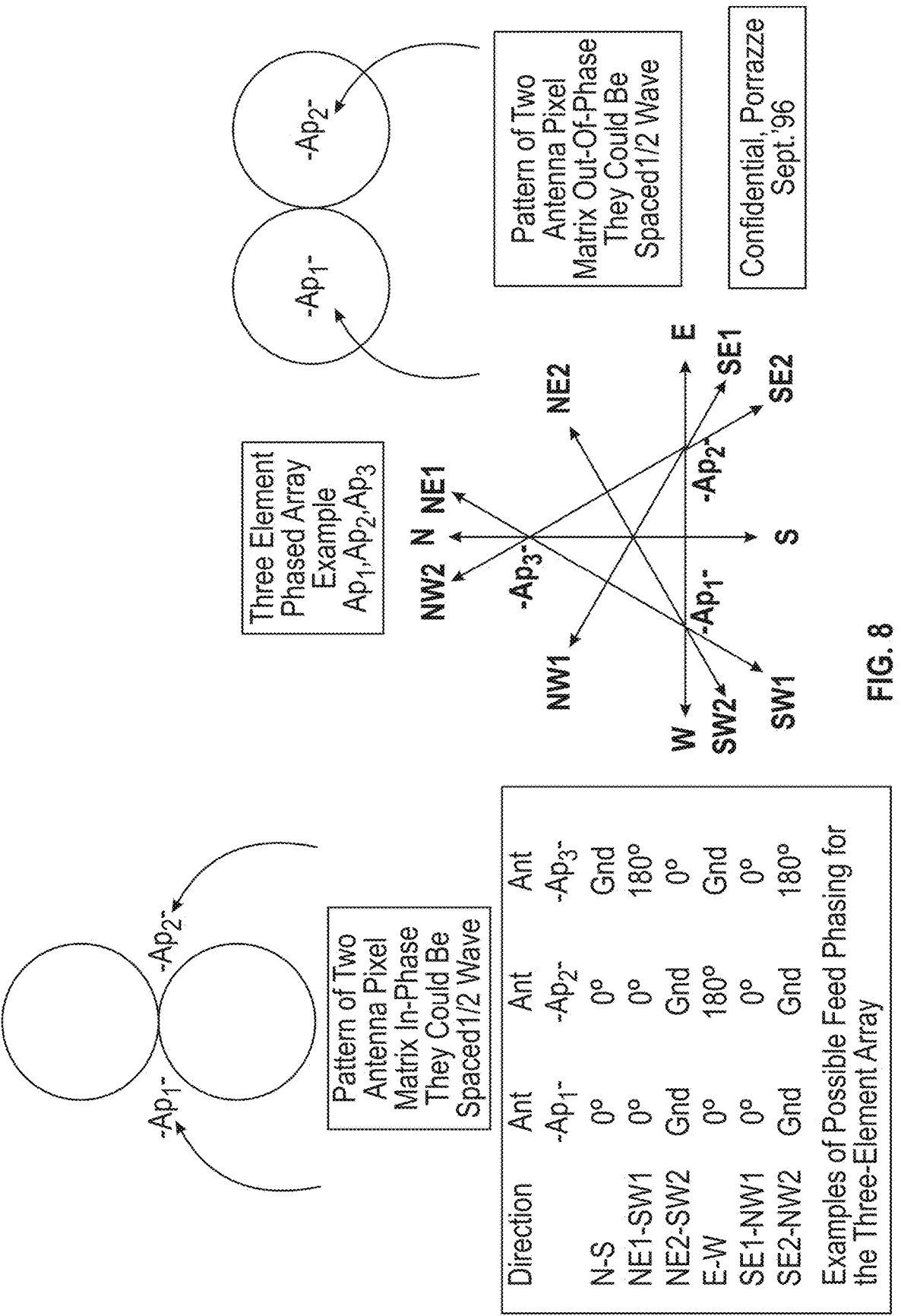
FIG. 8 displays various possible antenna connectors suitable for integration with the antenna pixel matrix array, in accordance with aspects of the present disclosure.

The combined effect of the individual Antenna Pixels, along with the expanded "Z" dimension introduced via the magnetic axis, as illustrated in FIGS. 1, 2, and 6B, generates an enlarged virtual RF aperture within the Antenna Pixel Field Effects Torus 95. This aperture is resolved through the Antenna Pixel Aperture 60 and enhanced by near-limitless configurations of electromagnetic lenses 65. As a result, the Quantum Transceiver Antenna (QTA) described in the present disclosure is exceptionally effective at mitigating multipath interference and excels in both line-of-sight (LOS) and, critically, non-line-of-sight (NLOS) communication environments.

Hopf Fibration, $\eta: S^3 \rightarrow S^2$, is a structure inherent with a nested torus. As illustrated in FIGS. 3C and 3D, the torus Field Effects 125 and antenna pixels 50 are create signal interactions that are expressed as Hopf Fibration(s) are multiple Hyperspheres each containing a nested Torus. This is expressed as a dimensional Hypersphere, interacting and overlapping. Where an overlap is present, there is an electromagnetic lens (field effects 125). It has a family of Seifert surfaces parametrized by the circle, S1S1, whose interiors are disjointed. In accordance with the present disclosure, many interactions are possible, and as EM and/or RF signals interact they create electro-mechanical oscillation (EMO). These EMO seek coherence through resonance and therefore exhibit influences constantly from the sub-atomic, to the macro-physical, that is expressed and conveyed in the process of Transceiving on the QTA Antenna Pixel Matrix 150. The fibers over lines of latitude form nested tori. The three-sphere is a union of two solid tori, joined along their boundary. This boundary is the torus of fibers over the "equator" on S2S2. One solid torus is formed by the fibers over the Southern hemisphere, and the other by the fibers over the Northern hemisphere. The mathematics of these interactions are helpful in understanding Two Level Quantum Systems (Q-Bits) and are used to show the harmonic oscillations generated by Field Effects 125 (FIGS. 3D and 4D), magnetic dipoles as expressed in Dirac Equations presented for EmH in the QTA of the present disclosure.

In geometry, Villarceau circles, are a pair of circles produced by cutting a torus obliquely through its center at a special angle. On the QTA, the hypersphere interactions of plurality of Antenna Pixel 100 and voids and nulls 110 may be considered as the fiber space $S^1$ (a circle) is embedded in the total space $S^3$ (the 3-sphere), and p: $S^3 \rightarrow S^2$ (Hopf's map) projects $S^3$ onto the base space $S^2$ (the ordinary 2-sphere). This is helpful in explaining, visualizing and mathematically expressing how the interactions of Transceiving EM and RF can occur in the fundamental Antenna Pixel 50. The Hopf expressions from these interaction means are substantially different from a monolithic structure, for example, as expressed and required in wave nature antenna. The Hopf Fibration, like any fiber bundle, has the property that it is locally a product space. However, it is not a trivial fiber bundle, i.e., $S^3$ is not globally a product of $S^2$ and $S^1$ although locally it is indistinguishable from it. This has many implications: for example, the existence of this bundle shows that the higher homotopy groups of spheres are not trivial in general. In QTA, this gives rise to the EmH Signal means and ability to convey (vast) amounts of information) near instantly. Translating this to tomographic, tomological "landscape" mathematics, this also provides a basic example of a principal bundle, by identifying the fiber with the circle group. Relating these expressions of EmH Signals back to the QTA, is which firmly demonstrates and distinguishes the interaction means (e.g., 100 and 110) by Antenna Pixel 50 can dynamically and simultaneously operate beneficially on dual particle and wave nature; whereas a monolithic structure(s), cannot; for example, as expressed and restricted in wave nature antenna.

Figure 11A:
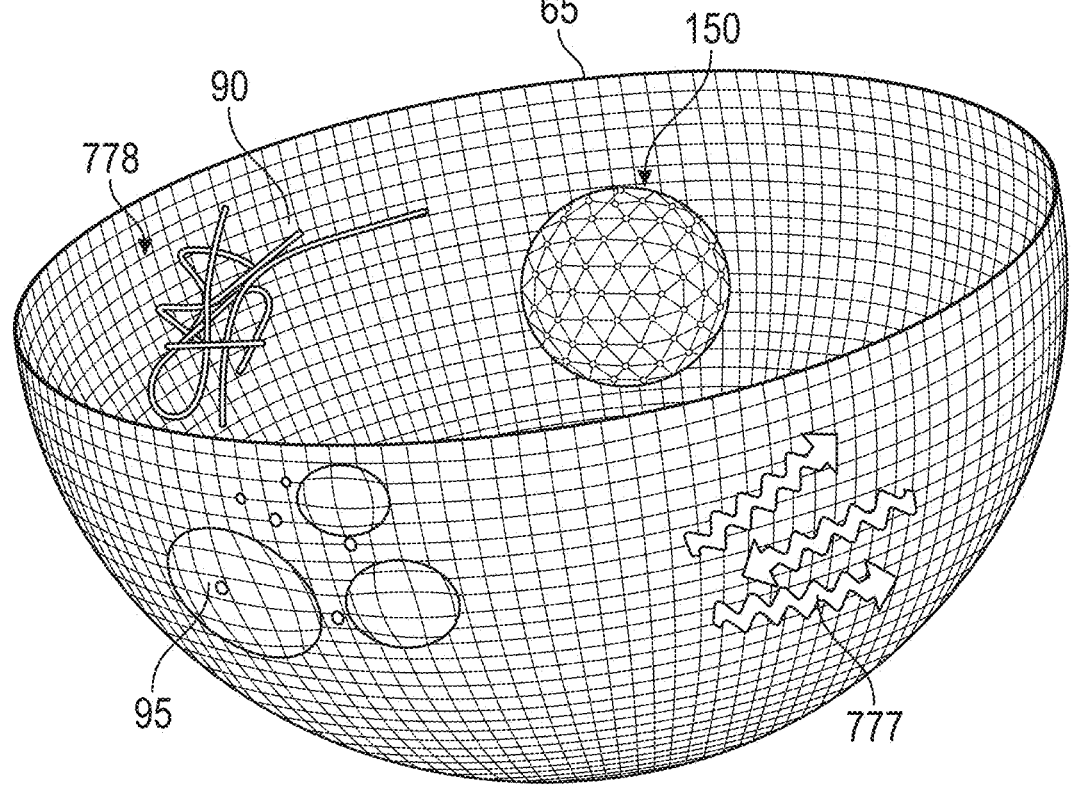
FIGS. 11A and 11B present potential QTA antenna pixel configurations and polarization control schemas, in accordance with aspects of the present disclosure.
Figure 11B:
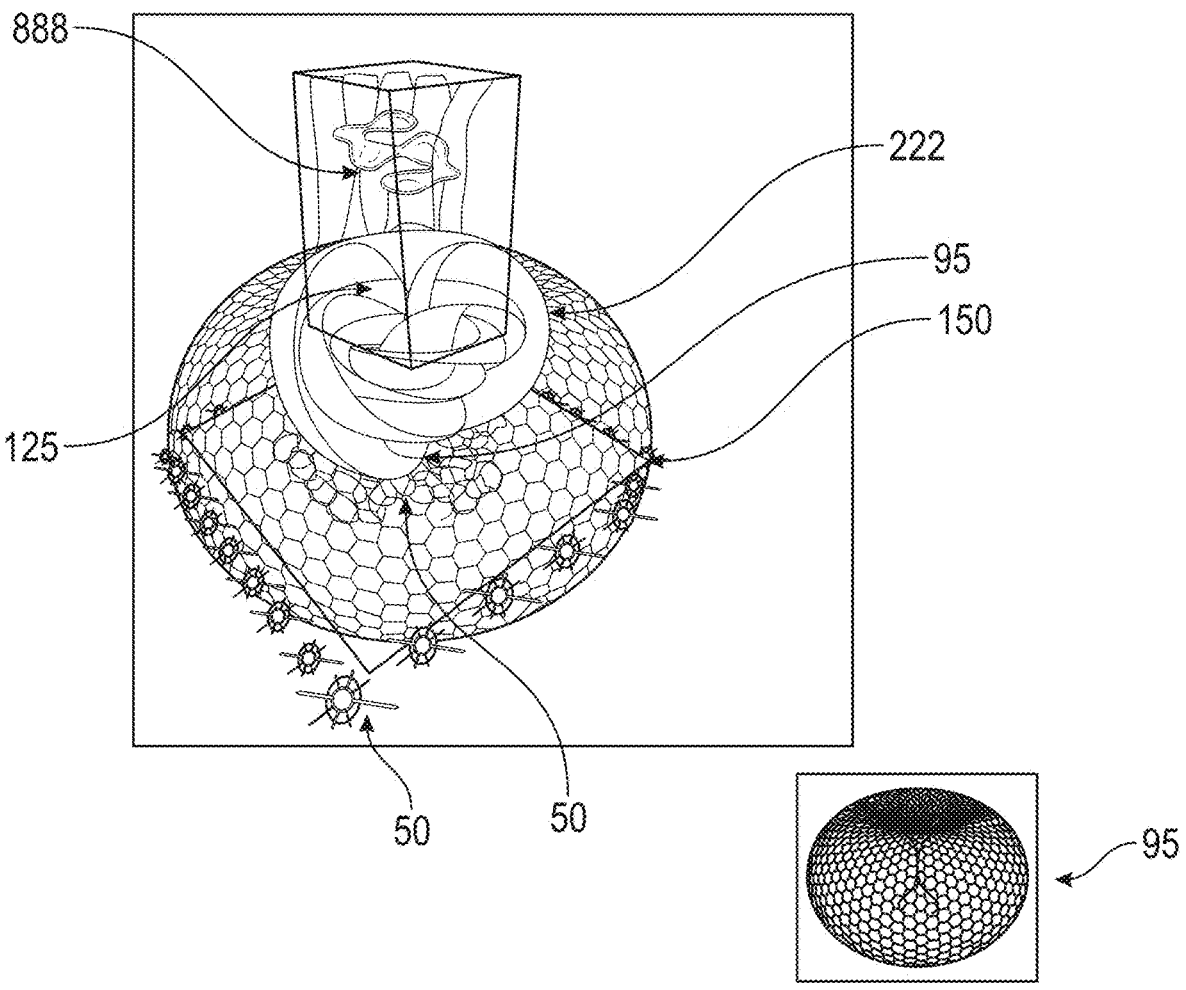

Stereographic projection of the Hopf Fibration induces a remarkable structure on $R^3$, in which all of 3-dimensional space, except for the z-axis, is filled with nested tori made of linking Villarceau circles. This provides both a mathematical method of expressing as well as visualizing how EM and RF signals are transceived on the QTA. Monolithic structures by nature, WN Antennas, specifically prohibit this function. On the QTA, the EM and RF signals interact with these vesica piscis electromagnetic lens(es) (Field Effects 125). These signals, expressed mathematically, resolve as each fiber projects to a circle in space (one of which is a line, thought of as a "circle through infinity"). EM and RF Signals are drawn into the Torus Field Effect means and gain coherence and resolve through transception, as a seamless, repeating and ongoing process of the QTA FIG. 1 Antenna Pixel 50 and QTA Antenna Pixel Array 150. Each Torus is the stereographic projection of the inverse image of a circle of latitude of the 2-sphere. (Topologically, a Torus is the product of two circles.) There are numerous aspects of the Hopf Fibration pattern 222 FIG. 3C, 3E which describe the many-to-one continuous function from the 3-sphere onto the 2-sphere, which create an EM Lens means for the QTA multi-band frequency dynamic capability. Specifically, in one configuration; the QTA Antenna Pixel Array 150 acts as an Isotropic Radiation Pattern Generator forming a Hopf Fibration pattern 222 FIG. 3E, 4C and FIG. 11B; which, by the nature of its EM centripetal force and spiraling nested EM Torus field structure, orders the incoming signal transmissions being received, as fibers along the surface of the structure, mapping the signals onto the nested torus, allowing for multiple discrete incoming and outgoing signals to coexist simultaneously, with immunity to interference, because they are mapped in a specific location according to their natural occurring order. This QTA Hopf Fibration function 222 of ordering and mapping EM Signals and RF Signal Transmissions, can be likened to the ordering and mapping of visible white light through a prism, separating by means of refraction, each color in the rainbow, according to each of their discrete wavelengths (appearing in the familiar order we are accustomed to seeing); red, orange, yellow, green, blue, indigo, and violet light. Red appearing as the longer wavelengths (620-750 nm) up to violet being the shorter wavelengths (380-450 nm) with each color in between appearing in their natural occurring order. Whereby a prism uses the glass medium for light refraction to order the wavelengths, the QTA generates EM Torus Field Effect Patterns FIG. 3C to order the wavelengths. This described function of the invention also can be optimized to produce a momentum means across the Antenna Pixel Array Matrix 150, behaving as a quantum motor.

Figure 5:
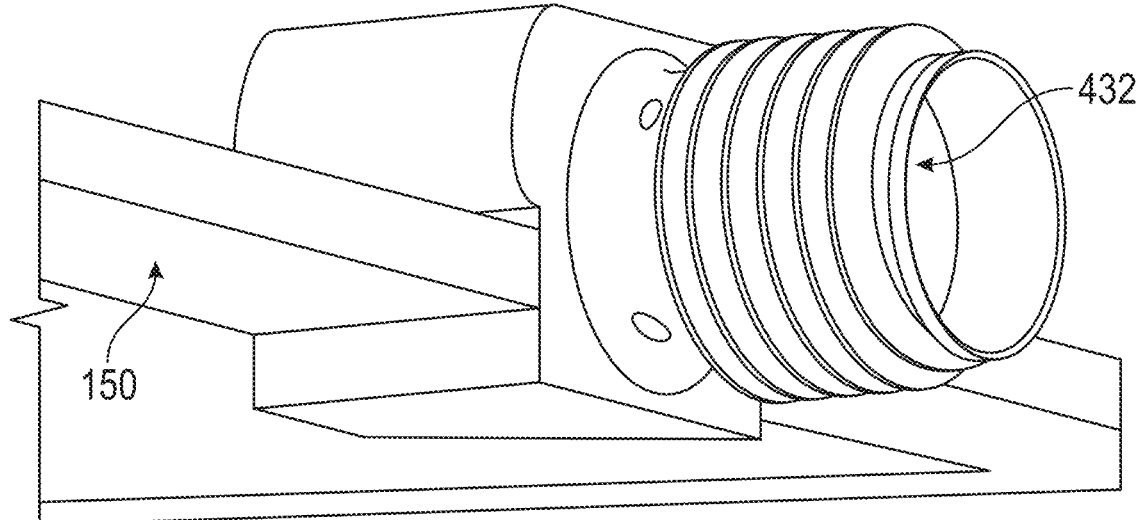
FIG. 5 is a comparison of electromagnetic signal separation principles using prism analogies to illustrate QTA's frequency resolution, in accordance with aspects of the present disclosure.

The use of Antenna Pixels 50 of the present disclosure, enables the benefits of Phased Array systems, without the limitations associated with conventional monolithic phased array structures. The modular nature of the QTA allows for dynamic polarization control on a single antenna, as illustrated in FIGS. 7A-7D and FIG. 8. Additionally, larger, scalable arrays of QTAs can be formed either wirelessly or via physical connectors, as shown in FIG. 5, further enhancing flexibility and coverage.

Polarization is a phenomenon peculiar to transverse waves. Light and other electromagnetic waves are transverse waves made up of mutually perpendicular, fluctuating electric and magnetic fields. EM wave propagates in the x-direction, the electric field oscillates in the xy-plane, and the magnetic field oscillates in the xz-plane. A line traces out the electric field vector as the wave propagates. For a linearly polarized electromagnetic wave traveling in the x-direction, the angle the electric field makes with the y-axis is unique. An unpolarized electromagnetic wave traveling in the x-direction is a superposition of many waves. For each of these waves the electric field vector is perpendicular to the x-axis, but the angle it makes with the y-axis is different for different waves. For EM Signals traveling in the x-direction Ey and Ez are randomly varying on a timescale. The QTA's ability to dynamically manage these field interactions across its Antenna Pixel Matrix allows for precise control of polarization states and enables advanced signal manipulation without reliance on fixed geometries or complex, monolithic array systems.

Electromagnetic waves transport energy through space. In free space this energy is transported by the wave with speed c. The magnitude of the energy flux S is the amount of energy that crosses a unit area perpendicular to the direction of propagation of the wave per unit time. It is given by $S=EB/(\mu_0)=E^2/(\mu_0 c)$, since for electromagnetic waves $B=E/c$. The units of S are $J/(m^2 s)$. $\mu_0$ is a constant called the permeability of free space, $\mu_0=4\times*10^{-7}$ $N/A^2$. The energy transported by an electromagnetic (EM) wave is proportional to the square of the wave's amplitude, $E^2$. The pointing vector S is the energy flux vector. Its direction is the direction of propagation of the wave, i.e., the direction in which the energy is transported. Mathematically it is defined as: $S=(1/\mu_0)\,E{\times}B$. Energy per unit area per unit time is power per unit area. S represents the power per unit area in an electromagnetic wave. If an electromagnetic wave falls onto an area A where it is absorbed, then the power delivered to that area is: $P=S{\cdot}A$. The time average of the magnitude of the Poynting vector, <S>, represents the irradiance or intensity. The irradiance is the average energy per unit area per unit time and is given by: $<S>=<E^2>/(\mu_0 c)=E_{max}^2/(2\mu_0 c)$. This framework is fundamental to understanding how energy is transmitted and received in electromagnetic systems, including within the QTA. The ability of the QTA's Antenna Pixel Matrix to interact dynamically with the electric and/or magnetic field components allows it to capture, redirect, and/or redistribute this energy flux with high precision across a wide spectrum, even performing as a quantum motor.

EM waves may also transport momentum. In the QTA, the Antenna Pixels 50 are configured to facilitate this momentum transfer. In a monolithic antenna design, signal properties are typically aggregated and processed as a singular outcome, without spatial or dynamic variation across the antenna structure. In contrast, the QTA architecture allows signal characteristics to be adjusted in real time at multiple levels: within individual Antenna Pixel interactions, among groups of pixels, across defined regions, and even through dynamic interrelationships among those regions. This frequency-adaptive, pixel-level control allows for on-the-fly modulation and optimization of signal behavior-unlocking new pathways for RF performance, signal steering, interference mitigation, and adaptive resonance management that are simply not possible in fixed, monolithic antenna systems.

In the QTA of the present disclosure, this control, increases gain and efficiencies while decreasing noise, and lowering power consumption. These attributes may be further enhanced with the Transceiver Discriminating Chip "TDC" as discussed in greater detail below. Antenna Pixels 50 completely alter influences of multipath interferences in the resolution of EM and RF Signals. For example, the momentum flux (S/c} is individual to QTA antenna pixels as opposed to monolithic structures whose elements (i.e. a phased array) influence to a total value outcome. So, for each Antenna Pixel, or group of interactions of EM or RF Signals drawn into the Tori, for example, Hopf Fibrations in the Field effects, the magnitude of the momentum flux (S/c) is independent, not like a monolithic structure. The amount of momentum that crosses a unit area perpendicular to the direction of propagation of the wave per unit time (within the influence of interactions per Antenna Pixel). If an electromagnetic wave falls onto an area A where it is absorbed, the momentum delivered to that area in a direction perpendicular to the area per unit time is $dp_{perp}/dt=(1/c)\,S{\cdot}A$. The momentum of the object absorbing the radiation therefore changes. The rate of change is $dp_{perp}/dt=(1/c)\,SA_{perp}$, where $A_{perp}$ is the cross-sectional area of the object perpendicular to the direction of propagation of the electromagnetic wave. The momentum of an object changes if a force is acting on it. $F_{perp}=dp_{perp}/dt=(1/c)\,SA_{perp}$ is the force exerted by the radiation on the object that is absorbing the radiation. Dividing both sides of this equation by $A_{perp}$, we find the radiation pressure (force per unit area) $P=(1/c)\,S$. If the radiation is reflected instead of absorbed, then its momentum changes direction. The radiation pressure on an object that reflects the radiation is therefore twice the radiation pressure on an object that absorbs the radiation. Electromagnetic waves transport energy and momentum across space.

In another preferred embodiment, the more QTA Antennas deployed, the larger the volume area of the resultant self-tuning "virtual-mesh" network. This requires consideration of the particle nature of EM and that by transfer-function information and intelligence can be near instantly exchanged in the Intermediary State (IS) through resonance on Antenna Pixels 50 and Antenna Pixel Matrix 150 even if they are physically separated by distance, near field and far field. EmH Signals principally enabled by QTA Antenna Pixels 50 and Antenna Pixel Matrix 150 renders one to near limitless, self-tuning resonance availability. This system also offers other desirable and new types of RF modulation, resolution, methods and processes of Transceiving EM and RF Signals.

Antenna Pixels 50, provides for new schemas for transmission and reception of intelligence, including to EmH signals. In the short term, QTA Antenna Pixel Matrix 150 have great impact to benefit emergency, first responder telecommunication and wireless transmissions. The present disclosure may be utilized in mesh platforms and viral dispersion systems, for virtual networks, for enabling super wide area networks SWANs, and for rural connectivity, including edge applications. Connectivity in rural areas is achievable and cost effective using QTA, because there is no requirement for traditional expensive cell tower infrastructure, as illustrated in FIGS. 6A and 6B, nor other traditional method limitations depicted. Cell Towers are used to gain height for Line-of-Sight cellular transmissions and are not required for QTA operation.

During an emergency, the QTA described in the present disclosure can help overcome common communication failures experienced by first responders. It addresses issues such as faulty or ineffective communication channels, resource bottlenecks, and inefficient or non-working telecom networks. Critically, the QTA reduces or eliminates the need for costly infrastructures, especially those used for telecom, IoT, AI, etc. in both developed or emerging industrial and third world-countries. As illustrated in FIGS. 6A and 6B, the QTA Antenna Pixel Matrix 150 embodies several capabilities. These include full spectrum RF operation and spatial signal resolution across X, Y, and Z axis (height, altitude GPS). Moreover, the system enables reliable non-line-of-sight (NLOS) RF transmission and simultaneous reception. The system is able to enable transmission and reception through walls 760, windows (Glass and metalized/mylar sun glare filters attenuates most 5G Signals), between floors, and between the inside of the building and the outside. The ability to facilitate communication across interior and exterior spaces fulfils the promise of Last-Inch-of-Last-Mile connectivity solutions.

Figure 4E:
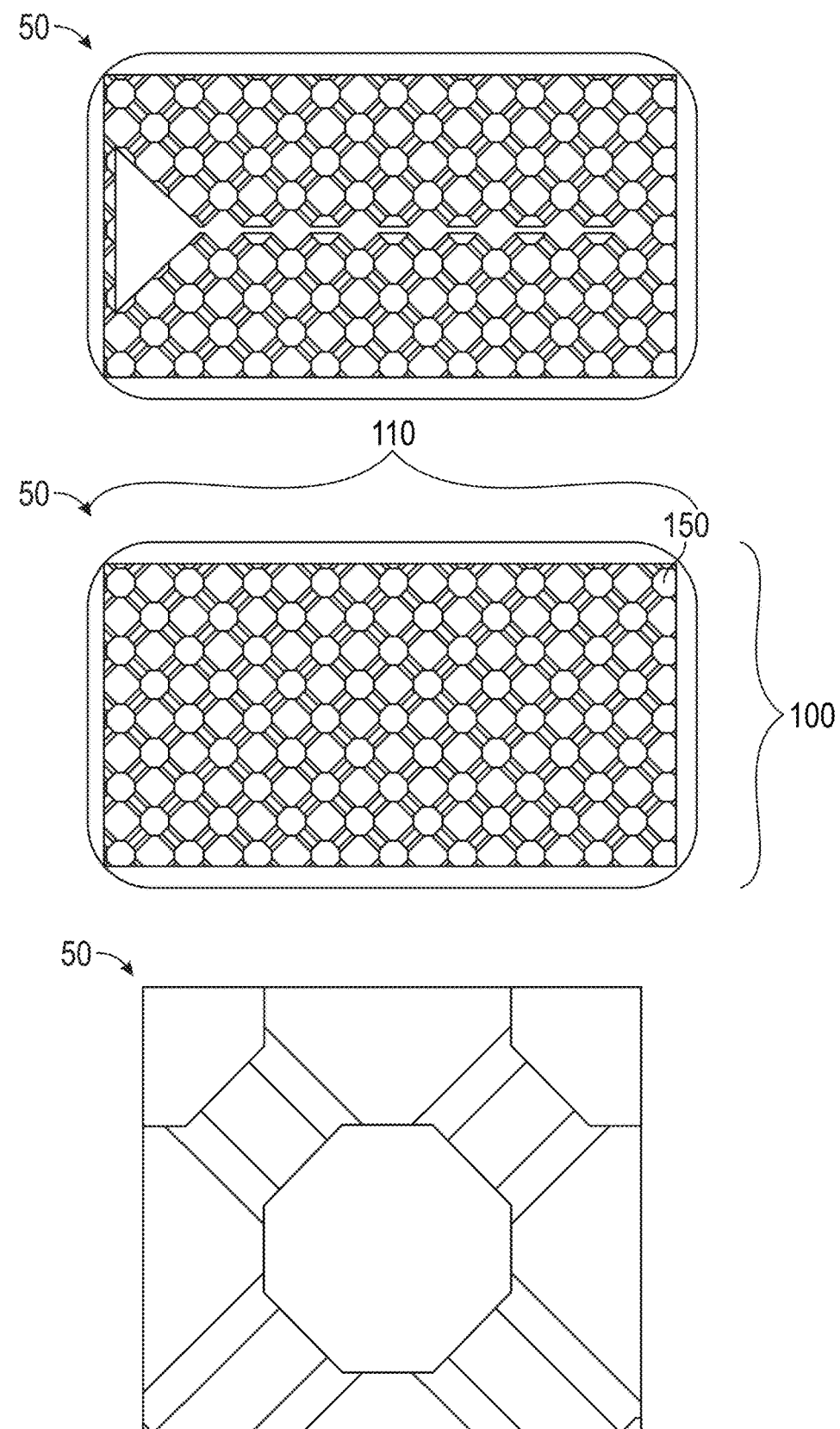

Matrix: FIGS. 4A-4E provide a step-by-step example of how a preferred embodiment QTA Antenna Pixel Matrix Array may be formed. FIG. 4A illustrates an initial base layer of the antenna matrix comprising a planar substrate configured to support a uniform geometric arrangement of individual Antenna Pixels 50. The positioning of the pixels within this array is designed to establish controlled spatial relationships, including engineered voids and nulls 110, which serve to optimize electromagnetic field interactions, increase signal gain, discrimination and data throughput and facilitate the coherent propagation of radio frequency (RF) energy. FIG. 4B depicts the integration of Antenna Pixel Apertures 60 aligned with each Antenna Pixel 50. These apertures are configured to open electromagnetic field pathways through which signal interactions may occur. In conjunction with the apertures, electromagnetic lenses 65 are incorporated to focus, refract, or modulate incident and outgoing EM fields. These lenses function as tunable components capable of real-time adjustment to enhance signal coherence, beam shaping, and frequency-specific gain. FIG. 4C demonstrates the activation and formation of Antenna Pixel Field Effects Tori 95, which emerge around each pixel through the energization of the matrix structure. These toroidal field effects are fundamental to the QTA's ability to manipulate electromagnetic signals using both wave and particle characteristics. The toroidal formations enable resonant field containment, dynamic signal tuning, and localized control of transmission and reception characteristics. FIG. 4D introduces a vertical expansion-commonly referred to as the Z-dimension-within the matrix configuration. This Z-axis extension may include structural or field-based enhancements such as vertical layering or magnetic axis tuning. This configuration increases the effective virtual RF aperture of the antenna, thereby enabling enhanced signal performance in complex environments, including those requiring non-line-of-sight (NLOS) transmission through barriers such as concrete walls, glass, metalized films, or between structural floors. FIG. 4E shows the completed QTA Antenna Pixel Matrix Array 150 as a fully functional, multidimensional transceiver platform. In this final configuration, the QTA supports simultaneous multi-frequency operation, polarization control, adaptive gain management, and dynamic beam steering. The system is operable in both serial and parallel communication modes and may be reconfigured on-the-fly in response to changes in the RF environment, user position, or application-specific requirements.

FIG. 5 illustrates examples of how single, or multiple connector(s) 432 are used for input or simultaneous output to the QTA Antenna Pixel Matrix Array 150. The QTA can gain and induce wireless resonance even when not directly connected. While not explicitly shown, interconnections between plurality of QTA Antenna Pixel Matrix Arrays, even wirelessly are possible and in many instances and embodiments, are highly desirable.

FIGS. 6A and 6B depict conventional classical WN Antennas, as Cell Signal Transmitter Antennas, and that the EM Signals 777 are comprised of varied frequencies and disbursed as if a plasma of waves and particles. The Waves or transmission of EM Signals 777 are broken by non-line-of-site transmissions and receptions. The EM signals 777 as waves cannot reach the building because they are interfered with by various multipath objects creating obstructions, including windows, walls, elevators, etc. breaking the EM Signals 777. However, QTA Pixel Matrix 150 can act as a Last-Inch-of the-Last-Mile solution because various frequencies of EM Signals 535 from below 20 Hz to 100 Ghz and beyond 1 Thz, can be both received and transmitted through the enabling Antenna Pixel Field Effects Torus 95, and the one to nearly limitless tuned electromagnetic lenses. This QTA Antenna Pixel 50 and QTA Antenna Pixel Matrix Array system provides optimal, on-the-fly, self-tuning, resonance possibilities beyond the WN Antenna. Furthermore, the system allows varied EM Signals to be separated for transmission or reception as EM Signals 540, as both waves and particles, even different frequencies simultaneously.

FIGS. 7A-7D and FIG. 8 provide an exemplary aspect of how to configure and use Antenna Pixels 50 to create desirable phased array antennas that are dual particle and wave oriented. FIGS. 7A-7D illustrate independent control of Antenna Pixel 50, Pixel Aperture(s) 60 and Phased Array Configurations possible on Antenna Pixel Matrix 150

Figures 9A, 9B, 9C, 9D:
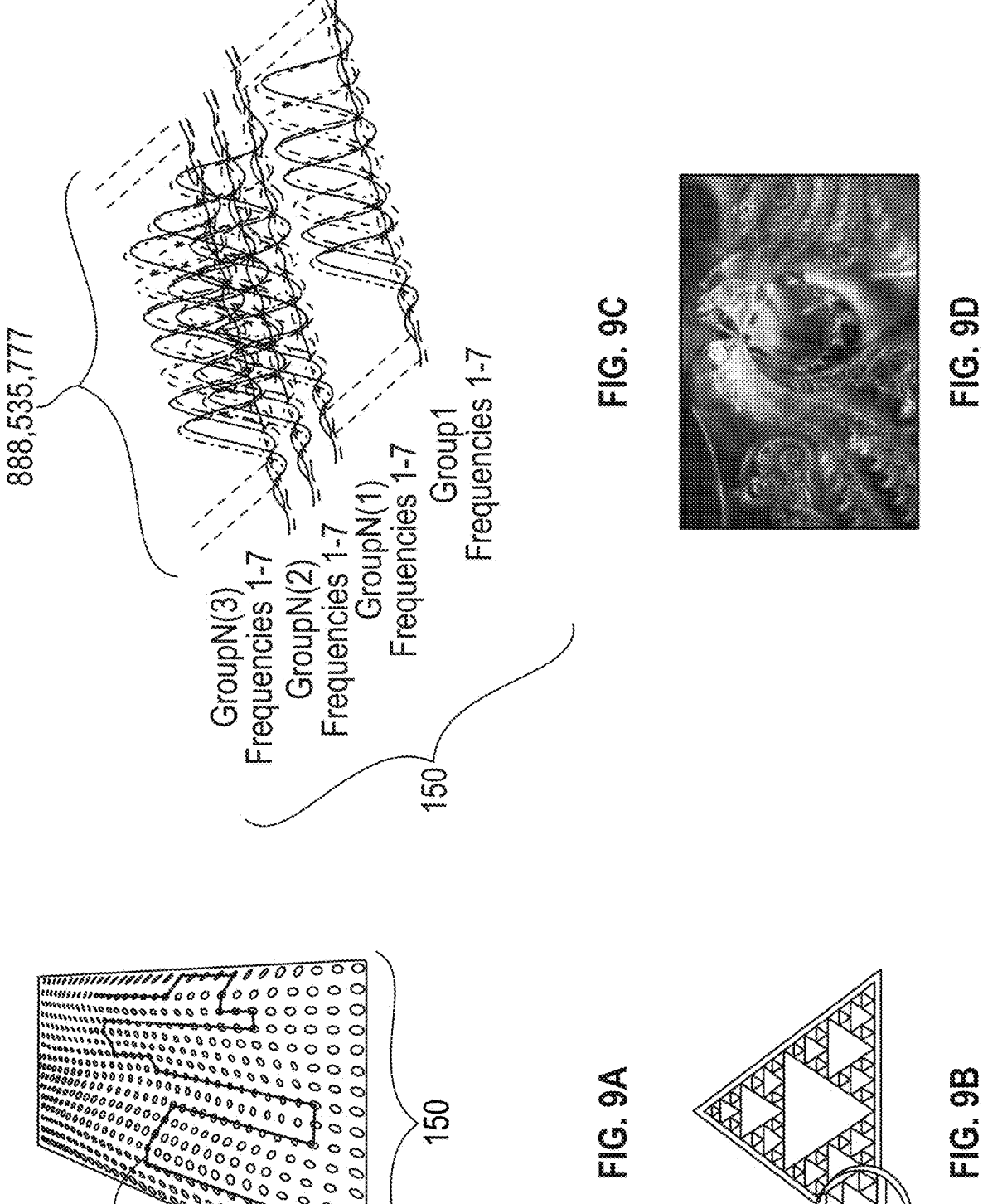
FIGS. 9A-9D illustrate conventional antenna limitations due to multipath interference versus the improved QTA resolution capabilities in urban high-rise settings, in accordance with aspects of the present disclosure.

FIG. 9A suggests a single layer matrix of Antenna Pixels 50 distributed evenly on a Quantum Transceiver Antenna, demonstrating how traditional WN Antenna resonance may be accommodated by nearly endless possibilities of interacting Antenna Pixel Field Effects Torus 95 created by Antenna Pixel 50 via Antenna Pixel Aperture 60. FIG. 9B is an example of a fractal iteration, conveying two concepts. First, that Electromagnetic Holography Signals via Intermediate States, even when broken, contain the pattern connecting to the whole. Broken EM Signals can still find resonance per FIG. 9A, and the information or intelligence of the whole EM Signal may be reconstituted, like a "Net": A Quantum Transceiver Antenna Pixel Matrix Array 150. The Preferred Embodiment of the QTA according to the present disclosure, would be to use the teachings of the dual particle and wave nature. Second, that Antenna Pixel 50 are not necessarily Fractals. Fractal Antennas are a sub-group of WN Antennas. Therefore, it is the interactions of Antenna Pixel Field Effects Torus 95 which are electromagnetic lenses 65. While it is possible that a QTA Antenna Pixel Matrix 150 might be organized and manufactured as a Fractal pattern, the QTA's preferred embodiments do not encourage nor require Fractal organizations of Antenna Pixel 50 nor in the QTA Pixel Matrix 150.

The Electromagnetic Lens Field Effects are what is important to the dual nature wave and particle, not the self-iteration of a pattern. The QTA promotes an "ordering" Antenna Pixel Matrix 150. Various EM Signals, such as Cell Tower Radio Plasma (e.g., EM signals 777), as illustrated in FIG. 6A may exhibit fractal-like properties similar to fluid dynamics, as shown in FIG. 9D. Complex RF Signals even as phone use TDMA, CDMA or other schemas, and encrypted or carrier signals, as illustrated in FIG. 9C, are resolved through resonance(s), not by fractal iterations. On the QTA's Antenna Pixel Matrix Array 150, the resonance(s) facilitated by the interactions of Antenna Pixel Field Effects Torus 95, as one to nearly limitless, self-tuned electromagnetic lenses 65 on plurality or groups of Antenna Pixel 100 and Voids and Nulls 110 are the preferred embodiment. This enables many of the benefits of the present disclosure QTA, including, but limited to: operating on ground planes, in water which is an EM Signal and RF sink, operate non-line of sight, have better performance, and gain efficiencies using less energy.

The following are summarizations of the prominent technical characteristics, benefits and advantages of the present disclosure, Quantum Transceiver Antenna. (FIG. 3A, 3D). The QTA Antenna Pixel 50, and Antenna Pixel Matrix Array 150 comprising interactions of Antenna Pixel Field Effects Torus 95, on plurality or groups of Antenna Pixel 100 and Voids and Nulls 110 uses less impedance (less resistance means less heating and more useable energy).

FIG. 10 is a graphical illustration of test results confirming the superior gain comparison between even a NON-POWERED QTA Antenna Pixel Matrix Systems 150, weighing less than ½ gram and ½" by 1"×⅓₂" that is not even configured according to the phased array particle embodiments suggested by FIGS. 7A-7D and FIG. 8.

With reference to FIGS. 4A-4D, the Antenna Pixel Matrix 150 of the present disclosure operates with orders of magnitude lower power requirements than conventional antenna systems while accomplishing the same amount of work. Empirical measurements confirm that the QTA structure exhibits a flat capacitance profile, indicating stable energy storage and release characteristics across the operational frequency spectrum. Similarly, impedance remains substantially constant over a wide range of frequencies, minimizing reflection losses and enabling efficient signal coupling. Additionally, voltage measurements across the electromagnetic (EM) signal frequency envelope remain uniform, demonstrating consistent signal behavior without the spikes, dips, or phase irregularities commonly associated with traditional antenna systems. This high degree of electrical and spectral stability is a result of the unique field interactions and geometry of the Antenna Pixel Matrix, including the integration of the Antenna Pixel Apertures 60, electromagnetic lenses 65, and Field Effects Tori 95 as illustrated in the referenced figures.

Comparatively, Antenna Pixel Matrix 150 operates with lower voltage to accomplish equivalent operations than other antennas, as discussed above regarding Ohms Law and power handling for better efficiencies. This is especially true when measured gain as illustrated in FIG. 10 is compared between Antenna Pixel Matrix Array 150 and powered, 5G Phased Array MiMo Antennas. What is especially important to understand per FIGS. 6A and 6B, is that the Antenna Pixel Matrix Array 150 can be multi-function, simultaneous, bisynchronous, analog or digital or both, as presented in the preferred embodiment of FIGS. 4A-4E.

Another important fact taught by the embodiments of FIGS. 3D and 4B and shown in FIGS. 6A and 6B is that the Antenna Pixel Matrix Array operates using interactions of Antenna Pixel Field Effects Torus 95, from macro physical to sub-atomic, as one to nearly limitless, self-tuned electromagnetic lenses 65 on plurality or groups of Antenna Pixel 100 and Voids and Nulls 110 as the preferred embodiments. These Quantum Field Effects are inter and intra dimensional. Whereby, the particle nature of EM signals solid objects, even rock bricks, metals and ground planes may become "transparent."

Antenna Pixel Matrix Array 150 can often receive and transmit "intelligence" through rock, metal and concrete. This includes and is not limited to EM, RF and EmH signals. These same principals and efficiencies often allow Antenna Pixel Matrix Array 150 to operate non-line-of-sight, to transmit or receive signals, to operate directly on a ground plane, or even exposed to "high-voltage" interferences, especially for example inside a Self-Driving Car or other "Autonomous" vehicle. The basic concepts of Antenna Pixel 50 and Antenna Pixel Matrix Array 150 will also allow new wireless products and mobile electronic devices to be created that don't need anywhere near the same amount of power and current to get the job done fast, economically and conveniently, yielding greater profits.

Another preferred embodiment uses the principals of Electromagnetic Holographic (EmH) Signals to new and pragmatic advantages in wireless transmissions, AI systems, and even imaging. The Antenna Pixel Matrix Array 150 not only reduces infrastructures, but it also allows functional integration. Multiple functions may be performed simultaneously and harmonizing operations over greater volumes of useable service area, with greater bandwidth with faster, more efficient data transfers over wide frequency operating bands. Nearly all AI and AI dependent systems are rendered essentially useless without wireless connectivity. By necessity and definition, AI must receive, monitor, respond and transmit. This is a two-way bi-directional wireless connectivity. AI cannot proliferate using methods or approaches that break this fundamental requirement. Connectivity, especially bi-directional, interactive connectivity is required for AI that the present disclosure Antenna Pixel Matrix Array 150 provides.

In the present disclosure, and it its preferred embodiment (s), the characteristic of Antenna Pixels 50 as illustrated in FIG. 1, is to operate simultaneously, and independently, in both receiving and transmitting EM Signals as illustrated in FIGS. 3D, 4B, or 6A-6B. This means that any number of EM signals may be simultaneously received or transmitted via Antenna Pixel 50 on the Quantum Transceiver Antenna Pixel Matrix Array 150 with immunity (no or negligible interference) with each other. This is not possible with conventional antenna. Under the present disclosure Antenna Pixel Matrix Array 150, for example, bandwidth can be orders of magnitudes of higher order than other comparable transceiver schema. Specifically, FIG. 10 and FIGS. 13A-13C, demonstrate that transmitting the same RF Signal information, one by Quantum dual particle and wave nature, and the other by conventional wave only, the Antenna Pixel Matrix Array 150 transceiver can send and receive information, over greater distance and volume of service area, more efficiently. As a result, there is greater gain, with less RF Signal loss, with less power draw, and less resultant heat. Using Antenna Pixel Matrix Array 150 as provided in FIGS. 13A-13C at 5G frequencies compared with well-known Lumenlier antenna, the performance field results demonstrate full video streaming via QTA over twice the distance and at more than 50% higher bandwidth at distances beyond double the operating range of the 5G conventional Lumenlier Antenna. This demonstrates a true comparison between conventional antennas and the present disclosure, QTA with Antenna Pixel Matrix Array 150. The Antenna Pixels 50 do not parasitically interact and/or interfere with one another and there are no impendence mismatches resulting in loss of VSWR.

Conventional wavelength-oriented Antennas are unable to resolve or resonate with the particle, photonic wavelets that comprise EM. In accordance with several embodiments of the present disclosure, the Antenna Pixels are able to accomplish this requirement fulfilling the current need for communications and transduction required in urban environments, rural areas, battlefields, underwater, underground, in space, in the body, and other areas where smaller, less expensive, multifunction Quantum Transceiver Antennas, operating at many frequencies of EM and RF Signals that must be received and/or transmitted with precision, simultaneously.

The present disclosure has many alternative functions which can be optimized. In, several different preferred embodiments and functionality that are shown describing superior, conformal, frequency dynamic, substantially planar, full spectrum, broad band, receiving and a transmitting (i.e., transceiving) QTA antenna means, processes, methods and systems that are superior to conventional antennas.

All the following "representative" antenna can be combined and replaced in a single QTA of less than ½ gram and ½" by 1"×¹⁄₃₂" in thickness. (FIG. 13).

Another advantage of this embodiment includes the QTA functioning as a rectenna. A rectenna (rectifying antenna) is a special type of transceiver antenna that is used for converting electromagnetic energy into direct current (DC) electricity and back again. They are used in wireless power transmission or receiving systems that transmit or receive power by wireless radio signals. QTA, because of Antenna Pixels, can operate as an ideal rectenna. Moreover, in telecommunications applications, where the wireless signal contains information as well as energy in the form of radio signals, Antenna Pixels make it possible to separate the intelligence from the electricity. This means QTA can directly rectify the Radio signals and electricity can be harvested, recycled, stored in a battery or flash capacitor or other means, fed into the grid or microgrid, used for Power Purchase Agreements for monetization, wirelessly transmitted to another QTA or receiving system for further redistribution, or combined harvesting QTAs much like a photovoltaic system and stored for later use. QTA accomplishes energy harvesting from Radio Signals while preserving the intelligence of the Radio Signal, non-destructively.

Other advantages of the present disclosure include that the QTA may be collocated on or inside of solar photovoltaic systems, even as a layer in thin-film-solar, on top of or inside of batteries, even as a component of the battery itself electrolyte container, or anode, or cathode, etc., and on or inside of display means. Furthermore, the QTA may be collocated as part of electrical storage systems, transformers, motors, generators, amplifiers or constructed to perform an integral part of the aforementioned kinds of equipment. The QTA may be Formed as a capacitor, flash-capacitor or other kind of electrical or data storage means, or as part of, or collocated with various kinds of sensors. Monitoring or control can be accomplished by the QTA as well as the collection, storage and transception of electricity or radio signals. As Radio Signals, the QTA can combine intelligence, non-destructively with the sending of wireless power.

Another advantage of the present disclosure is the QTA formed as a thermocouple. Thermocouples generate electricity from a difference in heat. They also work simultaneously as sensors to measure temperature at precise points. It comprises two dissimilar metals joined together to form a junction. Common thermocouple materials include copper/constantan (Type T), iron/constantan (Type J), and chromel/alumel (Type K). Any of these are suitable materials to form Antenna Pixels. When several thermocouples, made of the same materials are combined in series, they are called a thermopile. Because Thermocouples sense temperature in such a way that it converts thermal energy into electrical energy, the Antenna Pixel Matrix 50 may be constructed of different materials to become both a transceiver antenna as well as a thermocouple. This is accomplished by the Antenna Pixel Matrix formed as a junction as a thermocouple. The temperature change in the junction results in a production of voltage and this phenomenon is based on the Seebeck effect.

TABLE 1

| International Type Designation | Conductor Material | Temperature Range (° C.) |
|---|---|---|
| K | Ni—Cr (+) Ni—Al (−) | 0 to +1100 |
| T | Cu (+) Cu—Ni (−) | −185 to +300 |
| J | Fe (+) Cu—Ni (−) | +20 to +700 |
| E | Ni—Cr (+) Cu—Ni (−) | 0 to +800 |
| N | Ni—Cr—Si (+) Ni—Si (−) | 0 to +1250 |

The potential difference across the junctions is proportional to the temperature difference between the (+) hot and cold (−) Antenna Pixels (dipole). The governing equation is: $E_{emf}=-S\Delta T=S\ (T_{HOT}-T_{COLD})$, where $E_{emf}$ is the voltage output of the thermocouple. S is a temperature-dependent material property, known as the Seebeck coefficient (For a type K thermocouple, this is roughly 4.1 μV/° C. between 0° C. and 1000° C.)

Alternatively, the QTA may be collocated or be constructed to accommodate existing thermocouples or thermopiles. The QTA as a thermocouple may be constructed as to add additional functionality that includes an IoT sensor that can send signals as to the temperature of the environment it is transceiving. Various combinations of 1 and 2 above for transceiving EM and RF Signals as well as harvesting energy, or transceiving power wirelessly, while preserving the integrity and intelligence of the signal are possible.

Because of Antenna Pixel 50, QTA may be placed in harsh electromagnetic environments and still transceive. The Q of QTA is extremely high while having low mass. In the Environment of electric motors, and generators particularly, the QTA is an ideal monitoring bi-directional antenna, especially for appliances and IoT. Further, QTA functioning in a rectenna capacity can operate in any number of combinations, including: self-power, harvest energy, controller, recycle energy, transceive power wirelessly to the motor directly or from the generator, or direct electricity back into alternative power systems. The QTA of the present disclosure may be formed as a motor or transformer or generator directly or may be collocated with any of those kinds of electrical systems. In particular, the QTA because of its near limitless electromagnetic lenses make it ideal to be constructed as an embodiment as a transformer means. Nearly any ratios, resonances, inductively, capacitively reactively, etc., may be accomplished, because of the Antenna Pixel(s).

Another advantage of the present disclosure is that the QTA can directly transceive Telemetry Data. Telemetry is the automatic measurement and wireless transmission of data from remote sources. QTA may be configured as a transceiver and simultaneously as a telemeter (a device that measures telemetry). QTA Telemetry can measure electrical or physical data as a telemeter, providing various metrics such as various electrical values and comparisons, speed, temperature etc. These measurements are inherently available to QTA as EM and RF Signals that are available as electrical voltages, wherein a multiplexer means may combine these voltages, along with timing data, into a data stream for transmission by QTA to a remote receiver. The receiver can separate the data stream into its original components, and the data is displayed and processed according to user specifications.

In general, telemetry works inherently very well in the QTA for other reasons that are related to its construction. The QTA has flat capacitance, impedance, and resistance, even under load. These qualities make QTA ideal to be both an efficient and simultaneous Transceiver and Telemetry Sensor(s). At the source QTA can measure either electrical data, such as voltage and current, or physical data, such as temperature. QTA can transceive in real-time or it is also possible to data-log (time delay) this data to remote locations for monitoring and analysis. At the receiving end, AI systems and instructions can be returned to the QTA with less latency and immunities to interferences as well as its interactive and bi-directional nature. QTA can remotely monitor health, security, performance and even components in real time. QTA Telemetry can measure startup and processing times, user behavior and resource use, and to assess the state of a system(s). Telemetry is also used to gather information in fields such as meteorology, agriculture, defense and healthcare. QTA for Meteorology, includes but is not limited, both transceiver and telemetry connectivity for Weather balloons and other meteorological devices to collect and transmit meteorological data such as temperature and barometric pressure. QTA for Agriculture may be utilized as a transceiver for base connectivity and as a telemeter, including, but not limited to: interactive broadcasting of specific frequencies to plants to monitor or control hydrology, help make plants bigger, faster, stronger, disease resistant, with increased harvest yields in shorter time frames; independently or simultaneously, able to provide information on carbon or greenhouse gas sequestration or emissions;

providing weather stations and sensors gathering data on the environment, such as temperature, humidity and solar radiation, that help farmers make decisions about what and when to plant crops and harvest or mitigate issues.

The QTA may also be utilized for space exploration and defense. NASA and the U.S. military use telemetry to monitor the location, performance and health of satellites, spacecraft and aircraft, again all ideal embodiments for QTA as wireless connector and telemeter. QTA for drones, autonomous vehicles, and automobiles can be utilized to add real-time GPS, telemetry sensing and connectivity in harsh EM. The use of telemetry in healthcare and telemedicine is sometimes referred to as biotelemetry. Because of QTAs very low impedance and low voltage operations, QTA's sensitivity and efficiencies makes it a match for individuals with heart conditions or other medical issues. QTA can provide connectivity for first responders, emergency, disaster mitigation where wireless transception of telemetry devices to monitor heart rate, blood pressure and other vital statistics are required.

In another aspect, the QTA may be a telemeter whereby the telemetry data can be transferred using analog, digital, or combinations thereof to various electronic devices. Telemetry applications may use the QTA to provide wireless connectivity and include measuring and transmitting data from internet of things (IoT), sensors located in automobiles, smart meters, power sources, robots and even wildlife. QTA Telemetry sends data using its transceiver to connect with computer networks, satellites, cable, and even infrared and ultrasonic technologies as may be required.

Figure 12:
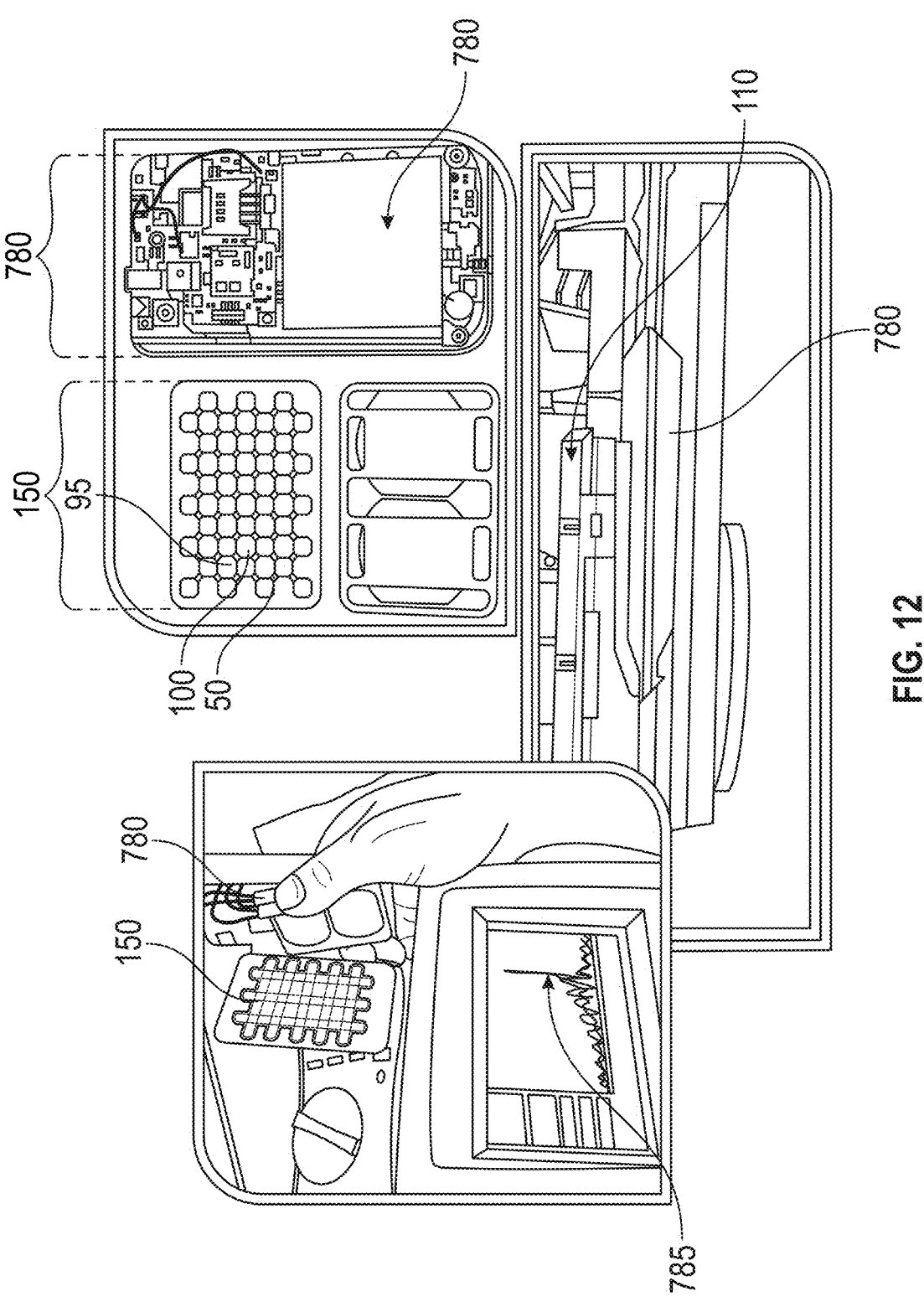
FIG. 12 illustrates examples of fractal antenna patterns and signal propagation characteristics for comparison, in accordance with aspects of the present disclosure.

In another aspect of the present embodiment, the Transceiver Discrimination Chip "TDC", is also referred to as the "Smart Module". In an exemplary embodiment, a radio transceiver may function as the discriminator and the QTA operates optimally. However, it may be advantages to collocate a controller in the form of a TDC or to form the Antenna Pixel Matrix to be a TDC. In this embodiment, wireless monitoring of any QTA may be accomplished and adjustments may be made on-the-fly, including Software Defined Radio. Software radios have significant utility especially for first responders, the military and cell phone services. Any circumstance or situation that serve a wide variety of changing radio protocols in real time. The Quantum Transceiver Antenna (QTA) serves as a configurable transceiver, making it a foundational enabler of cognitive radio (CR) systems. As illustrated in FIGS. 10 and 12, the QTA operates as a reconfigurable antenna system capable of supporting software-defined radio (SDR) architectures. Unlike traditional antennas constrained by fixed frequencies or narrowband centerline ratios, the QTA is dynamically programmable and can adapt its operating parameters in real time. In cognitive radio applications, the QTA can intelligently monitor its electromagnetic environment, detect available frequency channels, and autonomously adjust its transceiving behavior to optimize communication performance. This includes mitigating interference, avoiding congestion, and enabling simultaneous multi-user access to the spectrum. Such dynamic spectrum management allows for significantly more efficient use of available bandwidth. Because of its broadband capability, high gain, and compact form factor, the QTA is ideally suited for integration into mobile and portable devices, providing flexible, high-performance connectivity without the limitations of conventional, single-tuned antennas. As such, QTA represents a critical advancement in the implementation of adaptive, intelligent wireless communication systems.

In another aspect, QTA may be configured and constructed to take advantage of the principles traditionally associated with superheterodyne transceivers. An advantage of the QTA lies in its inherent ability to resolve electromagnetic (EM) and radio frequency (RF) signals in a frequency-dynamic, real-time manner. Due to this capability, it is not necessary for the QTA to be physically integrated or collocated with conventional superheterodyne transceiver architectures. Rather, the QTA inherently functions as a broadband antenna system ideally suited for software-defined radio (SDR) applications, making it effectively plug-and-play. In conventional superheterodyne systems, a variable-frequency oscillator (VFO), frequency mixer, and filter are used to convert incoming signals to a fixed intermediate frequency (IF) or baseband for further processing. The QTA architecture inherently supports these subsystems through its Antenna Pixel Matrix design. Each pixel can interact with incoming signals in a spatially and spectrally adaptive manner, enabling dynamic frequency selection and signal conditioning without the need for discrete, analog circuit components. Although not required, the QTA may optionally be configured to operate in conjunction with, or in the manner of, a superheterodyne transceiver. Such integration may offer advantages in applications where reducing system size and complexity is desirable. In such configurations, one skilled in the art could construct a QTA system that includes a TDC incorporating a time-to-digital converter, VFO, or mixer subsystem, either physically integrated or virtually realized within the QTA's signal architecture. Unlike traditional SDR systems that rely on analog-to-digital converters (ADCs) to sample RF signals at an intermediate frequency, the QTA enables direct interaction with RF signals at their native frequencies. Through its unique pixel-based architecture, the QTA can receive, resolve, and process RF signals without the need for traditional down conversion or amplification stages, thereby simplifying the system architecture and increasing operational efficiency. Ultimately, the QTA provides an ideal antenna platform for SDR by offering dynamic spectrum access, high-frequency agility, and compatibility with evolving wireless standards. Its ability to operate without fixed tuning points or rigid signal pathways supports more efficient use of spectral resources and reduces the constraints associated with static frequency allocations. Additionally, QTA provides for infrastructure advancements via software updates, including broad spectrum adaptation; overcoming the expensive installation of new telecommunication infrastructure, as legacy architecture becomes obsolete.

Matrix: The QTA of the present disclosure is size, shape, and form independent. QTA may be comprised of layers of thin, flexible, polymeric film impregnated with Antenna Pixel 50. The QTA may be able to operate actively, passively, independently, or in concert with one another as in Antenna Pixel Matrix Array 150. The application of Antenna Pixel 50 changes how photonic information and intelligence, for the entire electromagnetic frequency spectrum, is transceived and applied via both dual wave and particle nature for nearly all EM and RF signals.

An aspect of the present disclosure enables computers, micro-processors and radio device controllers to dynamically address and manipulate independently addressable Antenna Pixel 50 to produce high-resolution, transmittable high quality radio frequency (RF) signals. QTA can be collocated on top of a screen containing video pixels with immunity to interferences, whereas WN antennas operating under classical physics are not able to be collocated, nor to use video pixels in a manner suitable for antennas.

In one preferred embodiment, the Antenna Pixels 50 may be formed to simultaneously serve as the display means when implemented as part of the Antenna Pixel Matrix Array 150 using the QTA's disclosed methods, processes, and concepts. This represents a significant departure from conventional antenna systems. Typically, collocating any antenna with a display introduces substantial interference from nearby electronics, particularly those transmitting video signals-interference that disrupts wireless connectivity. In standard practice, AM/FM, UHF, and digital broadcast antennas are mounted far from display devices. Even Bluetooth and Wi-Fi antennas, while sometimes appearing integrated, are carefully placed at the edges of smartphones to avoid interference from displays, batteries, and charging components. While this placement allows marginal functionality, performance remains limited. The QTA, through its Antenna Pixel Matrix Array 150, overcomes these limitations. Because Antenna Pixels 50 operate under quantum principles and generate Torus Field Effects and electromagnetic lenses, they exhibit resilience to interference, ground planes, and harsh EM environments. As a result, the array can be placed anywhere-behind the display, laminated within it, or constructed as the display itself-without loss of performance. When so constructed, the Antenna Pixel Matrix Array 150 can function both as a high-performance antenna and as a display, operating independently or simultaneously to enable both wireless connectivity and video rendering. This multifunctionality allows two traditionally separate systems—antenna and display—to operate cooperatively or with mutual immunity. Additionally, the array may act as a video controller and antenna controller, enabling full software-defined radio (SDR) capability. The QTA can transmit and receive simultaneously, support non-line-of-sight (NLOS) operation, and deliver reliable performance in Last-Inch-of-the-Last-Mile connectivity scenarios, including communication from outside to inside homes or buildings.

The present disclosure teaches in FIGS. 2, 3A-3D and FIG. 4B the Antenna Pixel Matrix Array 150 may be independently isolated and that the Antenna Pixel 50 and their associated attendant means are independent and not "summed," like "monolithic" and other traditional antennas. Specifically, as in FIG. 4, Antenna Pixel Aperture 60 one to near limitless electromagnetic lenses 65 being available through Antenna Pixel Field Effects Torus 95 that are the fundamental building blocks which enable simultaneous particle and wave RF transmission and reception as amplified through a plurality of various Antenna Pixel 100 and voids and nulls 110 on Quantum Antenna Pixel Matrix 150.

Another preferred embodiment uses any of the three combinations including collocation, multi-function, and combined controller means. If Antenna Pixel 50 use QTA taught methods, processes and concepts, then the Antenna Pixel Matrix Array 150 may replace all the many disparate Antennas currently required in a cell phone, computer, or other mobile devices, even having the Antenna Pixel Matrix 150 be collocated on or in the battery, with immunity, or collocated on the electronic display.

Also as previously described, the Antennal Pixel Matrix 150 could simultaneously become the display means. All these functions increase immunity to interferences, provide better NLOS support, enable better operations in EM or RF challenged areas, reduce energy, require less charging, provide better integrated wireless interoperability, increase wireless signal transfer rates, decrease complexity of manufacturing, and increasing efficiencies, while increasing profitability. Functionality with the Intermediate State, IS, for EmH signals is also contemplated. The Antenna Pixel 50 allows the physical size and volume of the QTA antenna mass to be reduced by 90% compared to reference antennas of similar performance, as illustrated in FIGS. 10 and 12. As a result of the Antenna Pixel 50, the QTA of the present disclosure has equal or exceeding performance to reference antennas, or other antennas currently deployed in mobile devices, measured as gain and bandwidth.

As discussed, Antenna Pixel0 and their interactions on Antenna Pixel Matrix Array 150 can gain resonance, resolve the wavelet's wave-state, and receive the intelligence of the originating wave despite it being broken (EmH Signals). It is also possible for conventional, antennas to receive transmissions from the Antenna Pixel 50 and their interactions on Antenna Pixel Matrix Array 150 even though these may be fixed-ratio conventional antennas that may not be able to gain resonance with particle nature. This is because of the QTA's ability to operate on the dual nature of electromagnetic as both waves and particles. The RF transmitter, attached to the Antenna Pixel 50 and their interactions on Antenna Pixel Matrix Array 150 may achieve optimum resonances and produce the ideal pattern(s) of transmission or reception. The Antenna Pixel 50 on the Antenna Pixel Matrix 150 acts as a virtual self-tunable array system. In accordance with the present disclosure, a harmonic EM wave provides the demonstration of energy flowing from its highest state to a lower state, following the path of least resistance. In this instance the simple interconnectivity and interaction with Antenna Pixel 50 and their interactions on Antenna Pixel Matrix Array means 150 of the present disclosure. The Radio Transmitter, Receiver or Transceiver acting as the discriminator(s) means (not shown).

Other conventional antennas, operating on the wave nature of EM, may be able to receive transmissions from Antenna Pixel Matrix Array 150 as if they were operating as a traditional antenna. The RF Signal intelligence transmitted by the QTA's array-matrix, survives interferences, remaining whole and intact at some fundamental ratios which conventional fixed ratio antennas can receive. Thus making QTA able to function plug and play with conventional antennas or existing infrastructure. In contrast, conventional antennas where the originating (transmitting) EM waves were interfered with or impinged could not be received by other receivers connected to these receiving conventional Antennas. Only when these conventional WN Antennas were removed and replaced and connected with QTAs of the present disclosure, can these transceivers act as quantum discriminators and receive the transmitted EM signal via the Antenna Pixel 50 and their interactions on Antenna Pixel Matrix Array 150 of the present disclosure. This fact is exactly predicted by quantum mechanics and is simply the double slit experiment reversed. The originating particles/wavelets from the QTAs of the present disclosure, are not affected by the kinds of interferences that affect whole waves, and as such are not affected by those interferences. These particle photonic wave-states, embodied from the transmitting QTA, provide two wholly compatible concepts that conventional WN Antenna are not able to achieve. First, an optimal resonance on the Antenna Pixel 50 and their interactions on Antenna Pixel Matrix Array 150 can assemble optimal resonance between like QTA antennas, because they both simultaneously operate on the dual particle and wave nature of EM. As previously described, the intermediary state of EM Signals as particles have properties of complex quantum probabilities that may be considered as tomographic and topographic landscapes of information or intelligence EmH Signals. In an embodiment of the present disclosure, these EmH Signals may be directly transmitted optimally between like QTAs. However, transmission of QTA to conventional WN Antenna or vice versa optimal resonance enabled by Antenna Pixel 50 and their interactions on Antenna Pixel Matrix Array 150 may be perceived as "waves" of a ratio which discriminating receivers connected to conventional, fixed-ratio WN Antennas can gain resonance according solely to the wave nature of EM.

In accordance with the present disclosure, the ability of QTA to take advantage of the dual wave and particle nature of RF, allows a single QTA Antenna or plurality of QTA antennas to be connected to multiple receiving radios operating at disparate bands of the RF spectrum, plug-n-play. Each radio operates as its own "quantum" RF discriminator. For example, a QTA configured as a Quantum Transceiver Antenna could simultaneously support a radio operating at 512 MHz, while another radio connected to the same QTA could transceive signals in the 30 MHz to 174 MHz range. Concurrently, Bluetooth devices could operate at 2.4 GHz, GPS modules could function at their respective satellite frequencies, and additional QTAs could maintain connections at 5G telecom bands-all within the same system. This simultaneous multi-band, multi-mode operation provides full-spectrum support for Internet of Things (IoT) applications, real-time AI interaction, and next-generation telecommunications. The QTA of the present disclosure is configured to achieve this simultaneously.

In another aspect, the Antenna Pixel 50 and the Antenna Pixel Matrix Array 150 may be insulated or not insulated as required. In one preferred embodiment, Antenna Pixel Matrix Array 150 may be formed between layers of polymeric films, so that they are not susceptible to oxidation or misalignments and may function from low frequency to ultra-high frequencies. In one embodiment, the low frequencies may be below 20 Hz and the ultra-high frequencies may be greater than 10 THz. Additionally, the Antenna Pixel Matrix Array 150 may be in any shape, surface, or holding material. Furthermore, it may be built into radio systems, electronic devices, displays, batteries, photovoltaics, motors, transformers, or other suitable for use with EM and RF Signal Transception.

Antenna Pixels 50 are not coils in any traditional sense, nor are they strung together to satisfy some resonance theory based on ratios of fixed pole length. Antenna Pixels 50 may be disbursed in a random pattern if released in a liquid, gel, aerosol or into weightless space as an application may require. For example, synthetic camera lens, micro manufacturing, disbursed military mesh network communications, or medical imaging. While the Antenna Pixels 50 are generally arranged in a uniform or structured matrix, in certain applications, they may be configured in a fractal or self-similar pattern, if such geometry is beneficial to the intended function.

In another aspect of the present disclosure, the QTA may use polymeric films (e.g., 1 oz copper clad Kapton) providing for a multi-layer, lightweight, flexible geometry. The QTA may be spread on, painted or printed on many materials, and may be applied as a decal or woven into clothing. In the case of nano-crystals or nano-tubes forming the structure of the Antenna Pixel 50, preferred embodiments of the present disclosure may be "grown" using techniques and manufacturing procedures well known in the art, especially semi-conductors, including, but not limited to LEDs. The Antenna Pixel Matrix Array 150 is configured to operate across various impedance levels to optimize power handling and ensure effective matching with external systems. Through Antenna Pixels 50, the present disclosure enables the highest available data rates by supporting synchronous and bisynchronous operation modes. These modes may function in parallel, serial, or hybrid configurations, depending on the application requirements. Additionally, Antenna Pixel 50 provides for a resilient distributed and redundant QTA architecture making it suitable for harsh all-weather, underwater, under-earth (in mines or tunnels), and wireless applications both on earth, under sea, embedded in ice, or used in space.

Antenna Pixel 50 can be activated and energized in any pattern(s) or resonances required. The Antenna Pixel 50 and Antenna Pixel Matrix Array 150 are configured to accommodate the dual wave and particle nature EM and RF Signals. The particle nature, wave-states can activate different groups of Antenna Pixels 50 on Antenna Pixel Array because they are able to find a localized resonance between a particular unique plurality or grouping of Antenna Pixel 100 and/or Voids and Nulls 110 through the Antenna Pixels Field Effects Torus 95 which through vesica piscis creates a one to near limitless electromagnetic lens(es) 65 (FIGS. 1 and 3A-C). The Antenna Pixel 50 is capable of receiving and transmitting signal intelligence at the photonic level through resonance interactions within the Antenna Pixel Matrix Array 150. These interactions give rise to self-tuning resonances that enable the exchange and conveyance of electromagnetic hybrid (EmH) signals. Communication occurs both within the Antenna Pixel Matrix 150 and between separate Antenna Pixels 50, even when physically separated. Such communication may take place wirelessly in both near-field and far-field environments, enabling highly adaptive and spatially dynamic transception capabilities. Accordingly, any given wave or particle wave-state may dynamically establish its own optimal pathway of least resistance within the Antenna Pixel Matrix Array 150, as it functions as a transceiver for electromagnetic (EM) and radio frequency (RF) signals. The Antenna Pixels 50 of the present disclosure serve as an ideal medium for supporting particle-based wave-states and their associated quantum phenomena. Unlike conventional wave-nature (WN) antennas, which impose pre-determined resonances based on fixed lengths, ratios, or structural orders, the QTA's architecture allows for adaptive, non-fixed resonance behavior. This enables more efficient and flexible signal interaction and transmission at the quantum level.

Pixel: In accordance with the present disclosure, the transducer Pixel 50 is configured to efficiently manage diverse frequency bands. The integration of Antenna Pixels 50 with electromagnetic principles inherently leverages the wave-particle duality of electromagnetic (EM) and radio frequency (RF) signals, as illustrated in FIG. 4D. The present disclosure enables instantaneous, simultaneous, bisynchronous transmission and reception of wave-states through the Antenna Pixel Field Effects Torus 95. These toroidal field interactions, formed through a vesica piscis geometry, generate a near-limitless electromagnetic lensing effect, as shown in FIG. 1. This configuration allows the system to transceive signal intelligence wirelessly-even across physical distances—in environments that are harsh, obstructed, or otherwise unsuitable for conventional wave-nature (WN) antennas of the prior art. As such, the QTA provides a significant advancement in reliable wireless communication under extreme or interference-heavy conditions.

The Antenna Pixel Matrix Array 150 enables dynamic and adaptive operation through a virtually limitless combination of pathways and interconnections among Antenna Pixels 50 at any given moment. Rather than relying on uniform resonance across the entire matrix, individual Antenna Pixels transceive continuously, leveraging both the wave and particle nature of electromagnetic signals. Resonance is established as needed during transmission or reception, allowing the system to respond in real time to signal demands. In this configuration, the connected radio receiver or transmitter serves as the quantum discriminator, precisely engaging with the desired frequencies to achieve optimal performance.

In a preferred embodiment of the present disclosure, when the near limitless Electromagnetic Torus Field Effects Lens 95 is activated in Antenna Pixel 50, approximately an infinite number of Antenna Pixel combinations are created. The Quantum Transceiver Antenna (QTA) described in the present disclosure operates using distributed, frequency-dynamic resonance, which differs fundamentally from systems that rely on uniform resonance characteristics. Measurements such as Standing Wave Ratio (SWR) or Voltage Standing Wave Ratio (VSWR) typically assume a single conductive path of fixed length. As a result, traditional RF test equipment—such as spectrum analyzers—may not fully capture the QTA's unique operating behavior. A spectrum analyzer functions as a radio receiver, displaying signal amplitude across frequency bands by scanning over a defined range. It uses the superheterodyne principle, mixing incoming signals with a local oscillator to convert them to a more easily processed intermediate frequency (IF). While this is effective for analyzing signal strength and frequency distribution, it does not reflect the QTA's simultaneous wave-particle-based interactions, nor its localized and dynamic resonance formation across a matrix of independent Antenna Pixels 50. In the QTA's Antenna Pixel Matrix Array 150, resonance occurs selectively and adaptively-either at the level of individual Antenna Pixels or among dynamic groupings-based on the nature of the transmission or reception event. The system supports continuous, real-time interaction with electromagnetic (EM) signals, without requiring uniform resonance across the entire array. This enables the QTA to perform advanced functions such as frequency discrimination, spatial targeting, and quantum-level signal handling, which may not be observable through standard measurement techniques. Accordingly, alternative diagnostic methods are recommended to evaluate and characterize the QTA's full spectrum of performance capabilities.

RF test equipment usually can only distinguish and display the measurement of "one" cluster or group of clusters of Antenna Pixel 50 resonating at any frequency. By inherent design, the test equipment "assumes" this is the entire antenna. Therefore, the measurement is often inaccurate or misleading. The Performance of the QTA, as shown in head-to-head performance tests, is usually much better than even the superior test measurements show. While traditional RF analysis focuses on detecting single resonance or fixed ratios—such as through VSWR feedback—the Antenna Pixel Matrix Array 150 is designed to support multiple, simultaneous resonances. These interactions form electromagnetic lenses that enable wave and particle state transception. Because of this, performance assessment and construction optimization of the QTA should be guided by methods that account for distributed, dynamic resonance rather than relying solely on single-resonance measurement tools. Also, conventional RF test equipment does not take into consideration that the Antenna Pixel 50 of the present disclosure is capable of producing "pure" EM and RF Signals at the transmitting or receiving frequencies. These instruments typically rely on heterodyning and bandpass filters that exclude return signals which do not conform to expected spectral behavior-overlooking signal components produced by the QTA's dual wave-particle interactions. Therefore, to accurately evaluate the QTA's performance, test equipment must be modified to recognize and consider the actual dual particle and wave nature of EM. Otherwise, such tools offer only partial insight into the system's operation, primarily reflecting wave-based characteristics. Real-time, three dimensional thermal and infrared (IR) imaging are two methods that may be utilized to capture the QTAs dynamic signal behavior in both the wave and particle domains.

For manufacturing and deployment considerations it is important to emphasize that the operational concepts of the present disclosure's QTA differ significantly from those of conventional WN Antennas. This distinction is especially evident in the behavior of the Antenna Pixel Field Effects Torus 95, which, through vesica piscis geometry, forms near-limitless electromagnetic lenses, as illustrated in FIG. 1. It is known in the field of electromagnetics that nearly any conductive material can function as an antenna at some frequency, provided proper impedance matching is achieved. For example, a straightened paper clip has been shown to operate effectively at 160 meters when matched to a transmitter, radiating power isotropically in free space. The RF aperture of such a structure approximates that of a theoretical isotropic source. Applying this concept to the Antenna Pixels 50 of the present disclosure reveals that each pixel can similarly function as an ideal isotropic source. One of the fundamental functions of the Antenna Pixel 50 is to enable the construction of highly sophisticated QTA systems capable of precise radiation pattern control and robust performance in non-line-of-sight (NLOS) and multipath environments. This is achieved by the constructive interaction among various Antenna Pixels 50, the number of Antenna Pixel 50, their dynamic coupling with the electromagnetic forces generated by the Torus Field Effects. Together, these elements generate adaptive electromagnetic lenses in the Antenna Pixel Matrix Array 150 of the present disclosure.

In the present disclosure, the radiation pattern is controlled by focusing the radiated energy. In an embodiment of the present disclosure, QTA may be a self-tuning system. In this case, the most important factor of resonance is achieved with the optimal preservation of energy and the minimal loss possible. The geometry of the Antenna Pixel 50, the number of Antenna Pixel 50 layers (or their depth of field), their polarization, phase alignment, and the strength of the electromagnetic forces are the primary factors governing performance. The total amount of energy radiated remains constant for a given transmitter output power. When this energy is focused, the energy radiated in one or more directions will increase while energy radiated in other directions will decrease. As illustrated in FIG. 10, this directional energy shaping is the basis of the gain observed in the Antenna Pixel Matrix Array 150. This gain remains consistently distributed, even when the system is in motion, reoriented, or rotated-highlighting its stability and adaptability in dynamic operating environments.

Conventional WN Antennas have an aperture analogous to a camera lens. An ideal isotropic source has a circular aperture with a diameter of approximately $\frac{5}{16}$ wavelength. In a standalone configuration, an individual Antenna Pixel 50 in the present disclosure resembles such an ideal isotropic source. By contrast, the aperture of a dipole antenna is shaped in an elliptical pattern when observed from a position perpendicular to the conductor axis (i.e. 90 degrees off-axis). When multiple Antenna Pixels 50 interact, particularly in conjunction with waveguides and the Antenna Pixel Field Effects Torus 95 formed via vesica piscis geometry (as shown in FIG. 1), the resulting radiation pattern begins to resemble a modified dipole configuration. Pixel: The cross-section area of the aperture of a dipole is 1.64 times that of an isotropic source. Using the relationship:

$$\text{Gain} = 10\log\frac{A_1}{A_2} = 10\log(1.64) = 2.15 \text{ dB}$$

where $A_1$ is the aperture of the dipole and $A_2$ is the aperture of an Isotropic Source, the gain enhancement of the QTA configuration becomes quantitatively evident.

When viewed in three dimensions, an individual Antenna 50, of the present disclosure, exhibits behavior similar to a dipole. This is because the Antenna Pixel 50 has two electrical poles, not two physical poles. Additionally, it exhibits two electrical zeros across its structure. For this reason, a single Antenna Pixel 50 may also be described as a "di-zero" antenna. When the diameter (length) of an Antenna Pixel 50 is configured such that its poles are at the ends of the radiating material (e.g., material that is conductive, semiconductive, dielectric, magnetic, insulating, etc.) and the zeros are aligned at the center, the individual Antenna Pixel 50 will be exactly one-half (½) wavelength long. This configuration establishes the fundamental resonance of the QTA system and defines its harmonic structure. Traditional dipoles are typically center fed, where it presents a pure resistive, balanced, load to the feed line. This has led to the misconception that conventional dipole antennas require two physical poles. In contrast, the present disclosure employs a matrix or three-dimensional array of Antenna Pixels 50 within the Antenna Pixel Matrix Array 150, often arranged in multiple layers. The system can be fed from any point depending on application-specific needs and whether the Transducer Pixels are operating under active, dynamic control or passive, static control. While center-fed and end-fed configurations remain common and straightforward, the QTA architecture, of the present disclosure, also allows for multiple feed points to support diverse frequency bands and operational requirements.

Additional factors influencing the aperture of the present disclosure include the number of Antenna Pixels 50 layers, the physical size of the Antenna Pixel Matrix Array 150, and the interaction of the Antenna Pixel 50 interconnections or waveguides, especially the Nulls and Voids 110. These elements, when combined, contribute to reinforcing field interactions generated by the Antenna Pixel Field Effects Torus 95, which—through vesica piscis geometry—forms a near-limitless electromagnetic lens, as shown in FIGS. 1 and 4D. This results in a dynamically active electromagnetic focusing component within the QTA system. The combination of the Antenna Pixel 50 with the electromagnetic lens component balances the effects of aperture interferences and contributes to a system behavior similar to that of an ideal planar magnetic phased array. However, there are several differences: the QTA does not require additional electrical power to achieve gain. As represented in FIG. 10, the preferred embodiment of the Antenna Pixel Matrix Array 150 demonstrates a gain of 10-12 dB—equivalent to a $2^3$ to $2^4$ logarithmic increase—when compared to a standard 5G MIMO antenna, while using approximately 90% less mass and 90% less power, with no additional electricity. Although the QTA functions without requiring additional energy input, power may be applied as needed, using the quantum methods, processes, and concepts described in connection with FIGS. 7A-7D and FIG. 8. In certain applications, Pixel control of Antenna Pixel Matrix Array 150 or pluralities of Antenna Pixel Matrix Array 150 may benefit from micro-processor controllers, chips, FPGAs, etc. to provide enhanced control, multi-functions and adaptability.

Whether operating in a powered or unpowered mode, Antenna Pixel Matrix Array 150 of the present disclosure is fundamentally distinct from magnetic planar phased arrays and other types of WN Antenna. Another differentiator lies in the Antenna Pixel Field Effects Torus 95, which—via vesica piscis geometry—forms near-limitless electromagnetic lenses. This structure enhances resonance efficiency and enables superior power handling across the array. In conventional antennas, any object introduced into the aperture of an antenna will affect the operation of the antenna, resulting in pattern distortion, skewing of balance, change of feed impedance, and resonant frequency shift In certain cases, intentional aperture interference, such as placing other conductors into the aperture, is used to cause severe pattern distortion in a manner that focuses the radiated energy into a tight beam. By contrast, the present disclosure offers a new level of dynamic control that may eliminate the need for these techniques. The QTA, through its reconfigurable Antenna Pixels 50 and distributed matrix architecture, achieves beam shaping and high-resolution RF performance through electromagnetic field interactions rather than mechanical structure.

Pixel: The dual wave-particle design of present disclosure enables the QTA Transducer Pixels to operate on the fundamental properties of EM and RF signals, making the system inherently self-tuning. When connected to nearly any transceiver, the QTA functions in a plug-and-play manner without the need for manual calibration. With ongoing advances in component miniaturization and nanotechnology, preferred embodiments may include configurations in which a single transceiver—or a plurality of transceivers—is integrated directly into, or fully embodied within, an individual Antenna Pixel 50 or the Antenna Pixel Matrix Array 150. Similarly, preferred embodiments may include one or more Transceiver Discriminator Chip(s) (TDCs) as integral components of a single Antenna Pixel 50 or of the Antenna Pixel Matrix Array 150. The form, functionality, and desirability of TDCs may be used to manage and coordinate the operation of the Antenna Pixels 50 in response to both wave and particle characteristics of EM and RF signals. Conventional techniques for impedance matching and optimization may still be applied when interfacing the QTA with its feed line.

As previously described, the control factors of the Antenna Pixel Matrix Array 150 allow the QTA according to the present disclosure to be installed directly on or within a wide variety of materials, including metal objects, soil, concrete, fiberglass, substrates, ground planes, or any other substance. This capability opens the door to eliminating the need for conventional cellular or radio towers. QTAs may instead be integrated into infrastructure such as lamp posts, electrical or telephone posts, street signs, billboards, roadways, building interiors and exteriors, underground tunnels, subways, caves, vehicle hulls, buoys, on piers, marinas or bridges, and even painted on or embedded within vehicles. These examples are merely illustrative and are not intended to place limits on QTA placement or location. The ability to install QTAs in locations where conventional wave-nature antennas cannot function reliably is a core advantage of the present disclosure. While improved signal range and power efficiency are significant benefits, one of the most impactful features of the QTA is its ability to penetrate non-line-of-sight environments. As illustrated in FIG. 9, the QTA supports Last-Inch-of-the-Last-Mile connectivity, enabling reliable communication in buildings, elevators, and other challenging spaces where conventional antennas fail. This also includes embodiments where the Antenna Pixel Matrix Array 150 is integrated directly into end-user devices—such as displays, smartphones, or other multifunction platforms—whether in standalone or collocated configurations, and optionally paired with embedded controller systems for enhanced performance. Conventional WN Antennas cannot be deployed in many of the environments or configurations supported by the present disclosure. Their fixed-wave, fixed-ratio design makes them highly susceptible to attenuation and interference when placed on or near conductive surfaces or within obstructed environments-often rendering them ineffective. In contrast, the QTAs of the present disclosure, as dual wave-particle systems, can operate effectively in a wide range of locations and orientations. Their fixed-wave, fixed-ratio design makes them highly susceptible to attenuation and interference when placed on or near conductive surfaces or within obstructed environments-often rendering them ineffective. In contrast, the QTAs of the present disclosure, as dual wave-particle systems, can operate effectively in a wide range of locations and orientations. QTAs may also take advantage of the "height above ground" factor, which influences radiation patterns in wave-based systems. As such, QTAs can be positioned in locations typically reserved for conventional antennas, while achieving greater range and performance. Additionally, QTAs may be integrated into airborne platforms, drones, aircraft, satellites, spacecraft, or robotics, and embedded into IoT sensor systems to support advanced connectivity and AI-driven applications.

The QTA according to the present disclosure enhances coherence of electromagnetic signals through toroidal geometries functioning as tunable electromagnetic lenses, enabling simultaneous resolution and concentration of gain across a full spectrum of radio frequency signals. Operating using quantum principles, the QTA exhibits both particle and wave characteristics, rendering solid materials effectively invisible to enable non-line-of-sight communication and immunity to multipath interference and ground planes. With low impedance and high gain at reduced power consumption, the QTA replaces disparate antennas in electronic devices, smart phones, vehicles, aircraft, satellites, routers, and infrastructure, providing plug-and-play wireless connectivity with space-based platforms and terrestrial networks, supporting applications such as mobile telecommunications, imaging, security, navigation, smart cities, IoT, Edge computing, AI connectivity, and emergency response interoperability.

In an additional embodiment according to the present disclosure, the QTA functions as a flash capacitor, leveraging its layered matrix structure for energy storage. This configuration includes a first layer where the perimeter of each antenna pixel is doped with a superconductor material, such as cobalt, and a second layer where each pixel is fully doped with the same material, creating a differential for energy storage. The layers may be connected by cobalt-doped graphene tubes, or a third thick layer (1-2 mils) doped with cobalt, or other superconductor, can be added as a storage means. This structure can be rolled into a cylindrical battery-like form or kept flat for integration into devices like cell phones or routers, enabling the QTA to serve as both an antenna and an energy storage solution.

The QTA according to the present disclosure is utilized as an electromagnetic imaging device to detect and synthesize the resonant frequency and electromagnetic signature of a material, which manifests as a moving state in multiple dimensions, a standing wave, and a radiant field. Equipped with detection and synthesis modules, the QTA captures these properties and replicates them through a field state, expanding its utility beyond communication into material analysis and quantum imaging, leveraging its quantum-based capabilities for high-precision imaging.

The QTA according to the present disclosure enhances Global Positioning System (GPS) functionality by providing precise, three-dimensional location determination without relying on atomic clock-based signal travel time estimates. Using a positioning module, the QTA measures X, Y, and Z coordinates of both the user device and satellite, including altitude, achieving sub-meter accuracy for applications in complex environments like aircraft and high-rise buildings, revolutionizing GPS precision across navigation and aviation.

In an enhanced embodiment according to the present disclosure, the QTA serves as a quantum imaging device at ambient temperature within a preferably spherical chamber. It simultaneously sends frequencies to excite or reflect off an element and receives the resulting signals to image its raw electromagnetic signature without magnets. Optionally, magnets on the chamber's boundary layer enable imaging of the element's structured expression under magnetic influence, providing a dual-mode, contactless imaging solution for material characterization without cryogenic cooling.

The Electromagnetic Imaging Device (EMID) embodiment further expands the QTA's versatility, positioning it as a multifunctional device with applications beyond communication and energy storage, into electromagnetic imaging and material characterization. In EMID, Quantum Transceiver Antenna (QTA), according to the present disclosure, is utilized as an electromagnetic imaging device capable of detecting, identifying, recording and synthesizing the resonant frequency and electromagnetic signature of a material or element. This functionality leverages the QTA's advanced quantum-based properties to capture the material's resonant frequency, as well as its electromagnetic signature, which manifests as a complex phenomenon comprising a moving state across multiple dimensions, a standing wave, and a radiant field, all simultaneously observable within a detectable dimension. The QTA, according to the present disclosure, includes a detection module to acquire these properties and a synthesis module to replicate them through a field state, effectively copying the material's electromagnetic characteristics. This capability enables the QTA to not only serve as a communication antenna but also as a sophisticated tool for material analysis and electromagnetic replication, broadening its applications in fields such as material science, electromagnetic research, and advanced imaging technologies.

The QTA, according to the present disclosure, is integrated with firmware comprising a Transceiver Discriminator Chipset to form a Smart Module, enabling plug-and-play incorporation into electronic devices, transforming serial devices to become multi-function, multi parallel, multi-frequency capable smart devices. The Smart Module performs multiple frequency transmissions and simultaneous sending and receiving, with assignable channels for power management, energy harvesting, and gesture interface, Airscreen and Wavescreen control, and for smart applications and controls. This enhances device capabilities in wireless communication, energy harvesting and storage, power efficiency, gesture-based interaction, and smart application performance, making it adaptable to devices like smartphones, IoT systems, autonomous vehicles, aircraft, aerospace and satellite communication platforms, smart homes and smart cities.

The QTA, according to the present disclosure, functions as a capacitor and when paired with a display or CCD becomes an AirScreen or Wavescreen module, enabling beyond-touchscreen gesture control off the screen surface. Users interact with air or projected images using gestures, detected by the QTA's electromagnetic wave generation and sensing capabilities, providing a sterile, contactless interface for controlling devices such as smartphones, tablets, and medical devices. This hygienic solution enhances user interaction in health-sensitive environments.

The QTA, according to the present disclosure, is paired with a display mechanism (e.g., LCD or CCD) as an AirScreen module, acting as a near-field capacitor controller activated by hand proximity for off-screen gesture control, and with a projected display as a WaveScreen module, mapping capacitance onto projected images for air-based gesture interaction. Both modules provide hygienic, contactless interfaces for devices like smartphones, laptops, and medical systems, leveraging the QTA's quantum principles for precise, responsive control.

The QTA, according to the present disclosure, is adapted for biosecurity by collecting a user's dynamic, multidimensional electromagnetic signature for authentication. A biosecurity module receives and stores this signature, updating it over time to adapt to changes, using the QTA's quantum principles and resonance to detect subtle electromagnetic signals from the user. This provides a high-sensitivity, adaptive biometric solution for secure access to devices and systems like smartphones, security systems, and medical devices.

The QTA with Integrated Charge-Coupled Device (CCD) technology, according to the present disclosure, enhances the Quantum Transceiver Antenna by creating a Quantum Tunneling Transceiver Array (QTTA) providing a highly sensitive and multifunctional platform for simultaneous detection, imaging, and communication across a broad spectrum of signals, including photons, electromagnetic fields (EMF), and radio frequency (RF) signals. The QTA comprises a grid of quantum tunneling junctions on a semiconductor substrate, capable of detecting faint signals through quantum tunneling effects, with specialized layers and antenna pixels optimizing sensitivity to EMF and RF signals. Integrated with the QTA, the CCD employs a full-frame design with potential wells formed by negative potential walls and electrodes, or magnetic monopoles, accumulating signal-generated charges and transferring them via vertical and horizontal electrodes to an output node for conversion into digital data. This hybrid system not only enables high-resolution imaging and signal mapping but also supports real-time RF transmission and reception through an integrated telecommunications module, making the QTTA-Quantum Tunneling Transceiver Array a versatile device for applications in telecommunications, astronomy, and environmental monitoring, all performed concurrently with minimal interference due to advanced frequency multiplexing and parallel processing techniques.

In an advanced embodiment according to the present disclosure, the pixel matrix can be configured as a plurality of magnetic monopoles, where each antenna pixel acts as a quantum tunneling element exhibiting a single magnetic pole, enhancing detection and interaction with signals through unique magnetic field properties. This magnetic monopole configuration increases sensitivity and transmission efficiency, further expanding the antenna's capabilities across its diverse applications.

In telecommunications applications, where the wireless signal contains information as well as energy in the form of radio signals, Antenna Pixels make it possible to separate the intelligence from the electricity, "Q-Tricity". This means the QTA can directly rectify both radio signals and electrical energy-referred to as "Q-Tricity"-which can be harvested; recycled; stored in a battery, flash capacitor, or other means; fed into the grid or a microgrid; used for Power Purchase Agreements for monetization, including through crypto, NFTs, or tokens; wirelessly transmitted to another QTA or receiving system for further redistribution; or combined with other harvesting QTAs, much like a photovoltaic system, and stored for later use. QTA accomplishes this with Radio Signals while preserving the intelligence of the Radio Signal, non-destructively.

Further aspects of the present disclosure are provided by the subject matter of the following clauses:

A Quantum Transceiver Antenna comprising, means capable of generating an electromagnetic Torus Field means, using EM and RF Signals such that Field Effects means are generated, comprising, near limitless, independent overlapping electromagnetic lenses means, that through resonance means can order, or organize EM and RF Signals as a Transceiving Antenna.

A Quantum Transceiver Antenna comprising, a plurality of any independent means, as Antenna Pixel, capable of generating multiple electromagnetic Torus Fields means comprising a plurality of near limitless, independent overlapping electromagnetic lenses means, that through resonance means can order, or organize either by dual nature, particle or wave EM and RF Signals as a Transceiving Antenna.

A Quantum Transceiver Antenna comprising a plurality of any independent means, formed as an Antenna Pixel Matrix, capable of generating multiple electromagnetic Torus Fields means using EM and RF Signals such that Field Effects means are generated, comprising a plurality of near limitless, independent overlapping electromagnetic lenses means, that through resonance means can order, or organize EM and RF Signals as a Transceiving Antenna and; another simultaneous function means, including, but not limited to a Transceiving Rectenna, telemeter, sensor, hearing-aid, thermocouple, touch-screen, display, power means, wireless power transceiver means, etc.

A Quantum Transceiver Antenna comprising a plurality of any independent means, formed as an Antenna Pixel Matrix, capable of generating multiple electromagnetic Torus Fields means using EM and RF Signals such that Field Effects are generated, comprising a plurality of near limitless, independent overlapping electromagnetic lenses means, that order, or organize EM and RF Signals by dual nature particle and as waves independently and simultaneously.

A Quantum Transceiver Antenna according to any preceding clauses, comprising a transceiver able to resolve EM and RF Signals simultaneously from below 20 Hz to beyond 1 Thz; said transceiver able to resolve EM and RF Signals simultaneously from below 20 Hz to beyond 1 Thz; and may operate including, but not limited to: line-of-sight, non-line-of-sight; through solid objects, even rock, soil, walls, bricks, metals, etc.; ground planes; in harsh electromagnetic environments; in water; Faraday Cages; engines; motors; transformers or generators; overcome multipath and other kinds of interferences; Frequency Agile; or Frequency Dynamic;

Multi-Function; Asynchronous, Bisynchronous, serial, parallel, analog, digital or other combinations.

A Quantum Transceiver Antenna according to any preceding clauses, which may be collocated, to create wireless connectivity, including, but not limited to: cell phones, routers, modems, edge networks, WiFi systems, AI Systems, sensors, IoT devices, batteries, radios, TVs, motors, transmitters, receivers, game-controllers or computer interface (s), displays, generators, photovoltaics, and any other kind of electronic devices or equipment.

A Quantum Transceiver Antenna according to any preceding clauses, which orders the interference patterns so that existing signals can gain resonance in unified coherence, with a reduction in resistance and the multiple signals co-exist without disruption to any of the individual frequencies.

A Quantum Transceiver Antenna according to any preceding clauses, where the Antenna Pixel benefits from comprising certain materials, including, but not limited to: cobalt, graphene, diamond, silicon, copper, silver, gold, neodymium, allowing for increased efficiencies of operation, including but not limited to: increased gain; better resolution of EM and RF signals, better Q, lower power requirements, greater operating distances, fewer components, smaller sizes, less weight, and other benefits to wireless connectivity.

A Quantum Transceiver Antenna comprising a first Antenna Pixel Matrix capable of generating one or more electromagnetic Torus Field means such that Field Effects means are generated, comprising near limitless, independent overlapping electromagnetic lenses means, as a Hopf Fibration means, maintaining quantum entanglement means, able to order, or organize EM and RF Signals, EmH Signals as an antenna for near instantaneous connectivity with reduced latency, near and far field, as a quantum entanglement means transceiver.

A Quantum Transceiver Antenna comprising a first Antenna Pixel, a plurality of N+1 Antenna Pixel, capable of generating electromagnetic Torus Field means, comprising a second means able to generate Field Effects means; comprising near limitless, independent overlapping electromagnetic lenses means, said means resonance means can order or organize EM and RF Signals as a transceiving antenna.

A plurality of Quantum Transceiver Antennas according to any preceding clauses, comprising a quantum means, wherein the Intermediary State of quantum entanglement is maintained in equilibrium means, such that said means, regardless of separation near or far field, gain sympathetic resonance means; and wirelessly transceive or exchange, including, but not limited to: information, intelligence; energy, Electromagnetic Holographic Signals; act as a repeaters, propagating RF and EM signals as a wireless, mesh-network means; wherein, the addition of each Quantum Transceiver Antenna means there is increase of coherence and resolution of signals as in a mesh network.

A Quantum Transceiver Antenna according to any preceding clauses; comprising, an AI, discernment engine, or search engine means through resonance with the Electromagnetic Holographic Signals means, near instantly wirelessly interface dimensionally using quantum correlations means, with any cloud, data base, or data set, stored or live, including, but not limited to: the internet; the weather; the stock market; financial transactions; block chain or crypto mining; economic projections; commodities; elections; supply chains; flight and travel reservation systems; historical records, maps, medical records; sporting events, team or athlete performances; etc. whereby inquiry means is established, including, but not limited to: predictions, associations, relationships, hidden or unobvious patterns, entertainment, security, fraud alert, etc.

A Quantum Transceiver Antenna according to any preceding clause wherein the Antenna Pixel may be configured similar to a Charged-Couple Device means, Transceiving multiple frequencies, non-ionizing radiation, propagating from materials, both organic and inorganic, which can be rendered into visual data through software encoding and mapping means, in order to create real-time images from under the earth, within the human body, and into space; performing a non-line-of-site imaging system means.

A Quantum Transceiver Antenna comprising quantum means, wherein RF and EM signals may be wireless transmitted and received simultaneously.

A Quantum Transceiver Antenna according to any preceding clause, as an AI System means, or as a thought, brain computer interface means.

A Quantum Transceiver Antenna according to any preceding clause, wherein, the quantum means also establishes a new wireless, virtual information network means, wherein any bandwidth, or spectrum of frequencies may be transceived by any number of users, devices or applications, regardless of proximity, near or far field.

A Quantum Transceiver Antenna comprising quantum means for Full Spectrum, real-time GPS means from either space based or terrestrial resources providing X, Y and Z (height and altitude) information.

A Quantum Transceiver Antenna comprising quantum means, wherein Multifunction means Display may be collocated.

A Quantum Transceiver Antenna according to any preceding clause, comprising embodying materials that optimize specific frequencies and function.

A Quantum Transceiver Antenna according to any preceding clause, comprising a Transceiver Discriminator Chip "TDC" to instruct individual Antenna Pixel, or a plurality of Antenna Pixels to perform specific functions or frequencies.

A Quantum Transceiver Antenna comprising Antenna Pixel of uniform size and orientation to form a transceiving Antenna, or Hypersphere touch screen off the surface of the device means.

A Quantum Transceiver Antenna according to any preceding clause, comprising Antenna Pixel constructed of different sizes and orientations or composition of materials to form a transceiving Antenna, such that the impedance means is lower than 6 ohms and reduces the power required to send and resolve signals is less than 5 watts.

A Quantum Transceiver Antenna according to any preceding clause, comprising a Transceiver Discriminator Chip "TDC" to instruct individual Antenna Pixel, or a plurality of Antenna Pixels to perform specific functions or frequencies including but not limited to steer and/or change their polarity or orientation, whereby said electromagnetic lenses may on-the-fly, resolve EM or RF signals as an antenna, including, but not limited to, EmH Signals, transceiving wirelessly both inside and outside of buildings without wires or cables with decreased latency.

The Quantum Transceiver Antenna according to any preceding clause, comprising a quantum means able to maintain an indeterminate quantum state of entanglement with a plurality of Antenna Pixel Matrix, separated either near or far field, in sympathetic resonance of entanglement whereby EM and RF signals, as transceiving antenna(s) create near instantaneous connectivity means.

The Quantum Transceiver Antenna according to any preceding clause, whereby the Antenna Pixel Matrix can simultaneously separate EM and RF Signals from their energy or electricity and store, and/or stream, performing the function of a flash capacitor means, while preserving the said Signal's intelligence or information resolving the EM or RF Signal's as an antenna.

The Quantum Transceiver Antenna according to any preceding clause, whereby the Antenna Pixel may be extruded with layers of graphene, or diamond, or superconductive material, enabling energy or intelligent signals to be stored, and/or streamed, performing the function of a flash capacitor means, preserving the intelligence of EM or RF signals, said Signals are separated and harvested as energy or electricity.

The Quantum Transceiver Antenna according to any preceding clause comprising an Antenna Pixel specifically tuned to transceiver frequencies, radiating from materials, both organic and inorganic, which through independent software data mapping and/or Software-as-a-Service means, is presented as visual information to create real-time images means, including, but not limited to: from under the earth; within the human body, into space; directly from mammals, plants or cells, etc.

The Quantum Transceiver Antenna according to any preceding clause using non-ionizing radiation.

The Quantum Transceiver Antenna according to any preceding clause comprising an Antenna Pixel Matrix collocated with photovoltaic layer means, said means enables the conversion of solar energy to useable transceiving of both power, and intelligence.

The Quantum Transceiver Antenna according to any preceding clause whereby the users own unique EM or RF Signals are recognized enabling new forms of bio-identification means and security means.

The Quantum Transceiver Antenna according to any preceding clause comprising an ordering separation and inquiry sorting or filtering system as a search engine means, simultaneously as an Antenna.

The Quantum Transceiver Antenna according to any preceding clause whereby, filtering by frequency means enabling a new type of banded internet, whereby categories of information can reside in separate frequency bands allowing for rapid transception, said frequency bands dedicated to a specific purpose, including, but not limited to: Medical/Health, Education, commerce, finance, transportation, tracking, IoT, and entertainment, each on a distinct, separate designated frequency band; etc. all of which can reside and be transceived from any plurality of Antenna Pixel Matrix, regardless of near or far field, on land, on water, underwater, underground, in buildings, in mobile platforms, aircraft, drones, and terrestrial and/or space-based networks.

A Quantum Transceiver Antenna comprising quantum means, wherein EM or RF signals may be wirelessly transceived and independently or simultaneously is a telemeter.

A Quantum Transceiver Antenna according to any preceding clause, comprising quantum means, wherein RF and EM signals may be wireless transceived and independently or simultaneously may be including, but not limited to a telemeter for Agriculture; for Meteorology; for space exploration and defense; monitor the location, performance and health of satellites, spacecraft and aircraft; for Drones, autonomous vehicles, and automobiles; for Healthcare and Telemedicine as biotelemetry for monitoring heart rate, blood pressure and other vital statistics; for the internet of things (IoT) sensors located in automobiles, smart meters, power sources, robots and even wildlife; or for frequencies to monitor and enhance the growth of plants; etc.

A Quantum Transceiver Antenna (QTA) comprising: a scalable, thin-film antenna structure configured for bi-synchronous, multifrequency resonance; a layered matrix of antenna pixels forming the antenna structure, wherein the antenna pixels are of uniform size and shape, and wherein the layered matrix includes voids and nulls arranged in a predetermined pattern; wherein the QTA is configured to enhance coherence of electromagnetic signals using toroidal geometries integrated within the antenna structure, the toroidal geometries functioning as tunable electromagnetic lenses to simultaneously resolve and concentrate gain across a full spectrum of radio frequency signals; and wherein the QTA operates using quantum principles, exhibiting both particle and wave characteristics, to enable non-line-of-sight communication.

The QTA according to any preceding clause, wherein the thin-film antenna structure is fabricated using a deposition process, and wherein the layered matrix of antenna pixels is scalable to adapt to a plurality of device form factors.

The QTA according to any preceding clause, wherein the voids and nulls in the predetermined pattern are configured to optimize electromagnetic signal propagation and reduce interference within the layered matrix.

The QTA according to any preceding clause, wherein the toroidal geometries are dynamically tunable to adjust signal gain and frequency response based on operational requirements of a device incorporating the QTA.

The QTA according to any preceding clause, wherein the QTA is configured to render solid materials effectively invisible to electromagnetic signals, enabling penetration through physical obstacles for non-line-of-sight communication.

The QTA according to any preceding clause, wherein the QTA is immune to multipath interference and operates independently of ground planes, providing stable signal performance in complex electromagnetic environments.

The QTA according to any preceding clause, wherein the QTA exhibits low impedance and achieves high gain with reduced power consumption compared to conventional antennas, leveraging the quantum principles for signal amplification.

The QTA according to any preceding clause, wherein the full spectrum of radio frequency signals includes frequencies ranging from ultra-low frequencies (ULF) to terahertz frequencies, and wherein the QTA supports simultaneous operation across multiple frequency bands.

The QTA according to any preceding clause, further comprising a control module coupled to the toroidal geometries, the control module configured to dynamically adjust the tunable electromagnetic lenses to optimize signal coherence and gain based on real-time environmental conditions.

The QTA according to any preceding clause, wherein the layered matrix of antenna pixels is arranged in a fractal or periodic pattern to enhance multifrequency resonance and signal resolution across the full spectrum of radio frequency signals.

The QTA according to any preceding clause, wherein the QTA is configured to function as a flash capacitor, comprising: a first layer of the layered matrix wherein a perimeter of each antenna pixel is doped with a superconductor material; a second layer of the layered matrix wherein each antenna pixel is fully doped with the same superconductor material, creating a differential in doping between the first layer and the second layer; and a storage means coupled to the second layer, the storage means configured to store energy generated by the differential in doping, wherein the QTA is operable as an energy storage device.

The QTA according to any preceding clause, wherein the superconductor material is cobalt, and wherein the differential in doping between the first layer and the second layer enables the QTA to store electrical energy as a flash capacitor.

The QTA according to any preceding clause, wherein the first layer and the second layer are connected by graphene tubes, and wherein the graphene tubes are doped with the superconductor material to enhance energy storage capacity.

The QTA according to any preceding clause, wherein the storage means comprises a third layer disposed on a side of the second layer opposite the first layer, the third layer being a thick substrate having a thickness of 1 to 2 mils and doped with the superconductor material.

The QTA according to any preceding clause, wherein the first layer, the second layer, and the third layer are tightly rolled into a cylindrical shape to form a battery-like structure for energy storage.

The QTA according to any preceding clause, wherein the first layer, the second layer, and the third layer are maintained in a flat configuration for integration into a device selected from the group consisting of a cell phone, a router, and an electronic device requiring energy storage.

The QTA according to any preceding clause, wherein the QTA is configured to function as an electromagnetic imaging device, comprising: a detection module configured to obtain a resonant frequency and an electromagnetic signature of a material, wherein the electromagnetic signature comprises a moving state in multiple dimensions, a standing wave, and a radiant field simultaneously present in a detectable dimension; and a synthesis module configured to synthesize and copy the resonant frequency and the electromagnetic signature through a field state, enabling replication of the material's electromagnetic properties using the QTA.

The QTA according to any preceding clause, wherein the QTA is configured to function as a Global Positioning System (GPS) device, comprising: a QTA module configured to measure a precise location of a user device and a satellite in three-dimensional space along X, Y, and Z axes; wherein the QTA determines the precise location, including an altitude of the satellite and an altitude of the user device, without reliance on a time interval of signal travel measured by an atomic clock; and wherein the QTA provides location accuracy, enabling precise positioning in environments including aircraft and high-rise buildings.

The QTA according to any preceding clause, wherein the positioning module utilizes the QTA's bi-synchronous, multifrequency resonance and quantum principles to directly assess the X, Y, and Z coordinates of the user device and the satellite, independent of signal propagation time.

The QTA according to any preceding clause, wherein the QTA is configured to integrate with a user device selected from the group consisting of a smartphone, a tablet, a smartwatch, an aircraft navigation system, and a wearable device, providing real-time, three-dimensional location data.

The QTA according to any preceding clause, wherein the QTA's toroidal geometries and layered matrix of antenna pixels enable the measurement of altitude differences between the user device and the satellite, enhancing vertical accuracy in multi-level environments.

The QTA according to any preceding clause, wherein the QTA supports simultaneous communication and positioning functions, leveraging its multifrequency resonance to maintain connectivity with space-based platforms while determining precise location coordinates.

The QTA according to any preceding clause, wherein the QTA is configured to function as an electromagnetic imaging device, comprising: a detection module configured to obtain a resonant frequency and an electromagnetic signature of a material, wherein the electromagnetic signature comprises a moving state in multiple dimensions, a standing wave, and a radiant field simultaneously present in a detectable dimension; and a synthesis module configured to synthesize and copy the resonant frequency and the electromagnetic signature through a field state, enabling replication of the material's electromagnetic properties using the QTA.

The QTA according to any preceding clause, wherein the QTA is configured to function as a quantum imaging device at ambient temperature, comprising: a chamber configured to house the QTA and an element to be imaged; a transceiver module integrated within the QTA, configured to simultaneously send frequencies to excite or reflect off the element and receive reflected or emitted frequencies from the element; and wherein the QTA utilizes its quantum principles and bi-synchronous, multifrequency resonance to image a raw expression of the element's electromagnetic signature at ambient temperature without the use of magnets, based on the sent and received frequencies.

The QTA according to any preceding clause, wherein the chamber is spherical in shape, and wherein the transceiver module is configured to send and receive frequencies uniformly across the spherical chamber to image the element's raw expression in all spatial dimensions.

The QTA according to any preceding clause, further comprising a plurality of magnets selectively positioned on a boundary layer of the chamber, wherein the magnets are evenly distributed or placed at apex points of geometric configurations, and wherein the transceiver module is configured to send frequencies to excite or reflect off the element and receive frequencies altered by the magnetic fields to image a structured expression of the element.

The QTA according to any preceding clause, wherein the QTA is operable to switch between a first mode, imaging the raw expression of the element by sending and receiving frequencies without magnets, and a second mode, imaging the structured expression of the element by sending and receiving frequencies with magnets, to analyze both intrinsic and magnetically influenced properties of the element, wherein the QTA's toroidal geometries and layered matrix of antenna pixels enable the simultaneous sending and receiving of multifrequency signals, exciting or reflecting off the element to detect its electromagnetic signature, including multidimensional states and resonant frequencies, at ambient temperature without requiring cryogenic cooling.

A smart module for an electronic device, comprising: a Quantum Transceiver Antenna (QTA); a firmware or chipset integrated with the QTA, forming the smart module, wherein the firmware or chipset is configured to instruct the QTA to perform multiple frequency transmissions simultaneously and to simultaneously send and receive multiple transmissions; wherein the smart module is operable to execute bi-synchronous, multifrequency resonance across a plurality of frequency bands, enabling plug-and-play integration into an electronic device with enhanced communication and data processing capabilities.

The smart module according to any preceding clause, wherein the firmware or chipset includes a plurality of assignable channels, comprising: a first set of assignable channels dedicated to power management, biosecurity and gesture interface functions; and a second set of assignable channels dedicated to smart applications and control functions; wherein the assignable channels enable the smart module to dynamically allocate frequency bands for specific operational tasks within the electronic device.

The smart module according to any preceding clause, wherein the first set of assignable channels for power management and gesture interface is configured to: regulate power distribution to the QTA and other components of the electronic device based on operational demand; and identify and authenticate the user, and interpret gesture inputs from a user to control the electronic device, leveraging the QTA's simultaneous send-and-receive capabilities to detect and process identity and gesture-related signals.

The smart module according to any preceding clause, wherein the second set of assignable channels for smart applications and control is configured to: manage data transmission and reception for smart applications, including Internet of Things (IoT) connectivity, artificial intelligence (AI) processing, and edge computing; and provide control signals to the electronic device, enabling real-time adjustments to device functionality based on application requirements.

The smart module according to any preceding clause, wherein the QTA's toroidal geometries and layered matrix of antenna pixels, under the control of the firmware or chipset, enable the simultaneous sending and receiving of multifrequency signals across the assignable channels, maintaining signal coherence and minimizing interference.

The smart module according to any preceding clause, wherein the electronic device is selected from the group consisting of a smartphone, a tablet, a laptop, a router, an IoT device, a wearable device, and a satellite communication system, and wherein the smart module enhances the device's capacity for multi-functionality, wireless communication, power efficiency, gesture-based interaction, and smart application performance.

The smart module according to any preceding clause, wherein the firmware or chipset enables dynamic adjustment of the smart module's transmission and reception parameters, including frequency selection, signal amplitude, bandwidth, and channel assignment, to optimize performance in real-time based on environmental conditions, user interactions, or application demands.

The QTA according to any preceding clause, wherein the QTA is configured to function as a capacitor display with a gesture-controlled interface, comprising: a Wavescreen module integrated with the QTA, wherein the Wavescreen module enables beyond-touchscreen gesture control by detecting user interactions with air or projected images off the surface of the capacitor display; wherein the QTA's layered matrix of antenna pixels and toroidal geometries generate and detect electromagnetic waves to facilitate the gesture-controlled interface; and wherein the Wavescreen module provides a sterile, contactless interface for controlling an electronic device, reducing the need for physical contact with the display surface.

The QTA according to any preceding clause, wherein the capacitor display comprises a first layer of the layered matrix with antenna pixels having a perimeter doped with a superconductor material and a second layer with antenna pixels fully doped with the same superconductor material, enabling energy storage and electromagnetic wave generation for the Wavescreen module.

The QTA according to any preceding clause, wherein the Wavescreen module is configured to project images off the surface of the QTA capacitor display and detect user gestures interacting with projected images or air, utilizing the QTA's bi-synchronous, multifrequency resonance to interpret the gestures as control inputs for the electronic device.

The QTA according to any preceding clause, wherein the electronic device is selected from the group consisting of a smartphone, a tablet, a laptop, a medical device, a wearable device, and an interactive kiosk, and wherein the Wavescreen module enhances user interaction by providing a hygienic, contactless control interface.

The QTA according to any preceding clause, wherein the Wavescreen module leverages the QTA's quantum principles to detect subtle changes in electromagnetic fields caused by user gestures, enabling precise control of the electronic device without physical contact, thereby reducing contamination risk in health-sensitive environments.

The QTA according to any preceding clause, wherein the QTA is configured to function as a near-field capacitor controller, comprising: an AirScreen module integrated with the QTA and paired with a display mechanism selected from the group consisting of a Liquid Crystal Display (LCD) and a Charge-Coupled Device (CCD); wherein the AirScreen module enables off-screen gesture control of an electronic device by detecting changes in the QTA's capacitance activated by electromagnetic radiation from a user's hand in proximity to the display surface; and wherein the QTA's layered matrix of antenna pixels and toroidal geometries generate and sense the near-field capacitance for interpreting user gestures as control inputs.

The QTA according to any preceding clause, wherein the AirScreen module is configured to operate without physical contact between the user's hand and the QTA, or display surface, leveraging the QTA's bi-synchronous, multifrequency resonance and quantum principles to detect subtle electromagnetic field changes induced by hand proximity for precise device control.

The QTA according to any preceding clause, wherein the QTA is further configured to function as a capacitor controller with a projected display, comprising: a WaveScreen module integrated with the QTA and paired with a projection system, wherein the WaveScreen module maps the QTA's capacitance field onto a projected image off the surface of the electronic device; wherein the user interacts with the projected image using gestures, touching the image in the air with hand movements, and the QTA detects changes in the capacitance field to interpret the gestures as control inputs for the electronic device.

The QTA according to any preceding clause, wherein the WaveScreen module utilizes the QTA's layered matrix of antenna pixels and toroidal geometries to generate and sense the capacitance field mapped onto the projected image, enabling precise gesture-based control without physical contact with a display surface.

The QTA according to any preceding clause, wherein the electronic device is selected from the group consisting of a smartphone, a tablet, a laptop, a television, a gaming console, a medical device, and an interactive kiosk, and wherein the AirScreen and WaveScreen modules provide hygienic, contactless interfaces for user interaction and device control.

The QTA according to any preceding clause, wherein the WaveScreen module is configured to project interactive images into the air and dynamically adjust the capacitance field based on the projected image's position and user gestures, leveraging the QTA's quantum principles for real-time control responsiveness.

The QTA according to any preceding clause, wherein the QTA is configured to function as a biosecurity device, comprising: a biosecurity module integrated with the QTA, configured to collect an electromagnetic signature from a user, wherein the electromagnetic signature comprises a multidimensional, moving dynamic pattern of waves and field effects unique to the user; wherein the QTA receives electromagnetic signals emanating from the user as a living organism, utilizing its bi-synchronous, multifrequency resonance and quantum principles to detect and analyze the electromagnetic signature; and wherein the biosecurity module stores the electromagnetic signature and updates it over time to enhance user recognition and authentication for secure access to an electronic device or system.

The QTA according to any preceding clause, wherein the biosecurity module is configured to continuously monitor and receive the user's electromagnetic signals, adapting the stored electromagnetic signature to account for changes in the dynamic pattern over time, thereby improving the accuracy of user identification.

The QTA according to any preceding clause, wherein the QTA's layered matrix of antenna pixels and toroidal geometries enable the detection of the multidimensional electromagnetic signature, including variations in wave patterns and field effects, for distinguishing the user from other individuals.

The QTA according to any preceding clause, wherein the electronic device or system is selected from the group consisting of a smartphone, a tablet, a laptop, a security system, a medical device, and an access control system, and wherein the biosecurity module uses the electromagnetic signature as a biometric identifier for secure authentication.

The QTA according to any preceding clause, wherein the biosecurity module is configured to compare the received electromagnetic signature with the stored signature in real-time, granting or denying access to the electronic device or system based on the match accuracy, leveraging the QTA's quantum principles for high-sensitivity signal detection.

A Quantum Tunneling Transceiver Array (QTTA) comprising: a Quantum Transceiver Tunneling Array (QTTA) composed of a plurality of quantum tunneling junctions arranged in a two-dimensional grid on a semiconductor substrate, wherein each junction is configured to detect photons, electromagnetic fields (EMF), and radio frequency (RF) signals through quantum tunneling effects; and a Charge-Coupled Device (CCD) integrated with the QTA, the CCD comprising a silicon chip with a plurality of potential wells formed by negative potential walls and electrodes, wherein the potential wells are configured to accumulate signal-generated charges to and from the QTA.

A Quantum Tunneling Transceiver Array (QTTA) system utilizing a plurality of magnetic monopoles, comprising: a quantum tunneling-based pixel matrix composed of a plurality of quantum tunneling elements arranged in a two-dimensional grid on a semiconductor substrate, wherein each element is configured as a magnetic monopole, exhibiting a single magnetic pole to detect and interact with photons, electromagnetic fields (EMF), and radio frequency (RF) signals through quantum tunneling effects enhanced by magnetic monopole properties; a telecommunications module integrated with the pixel matrix, comprising RF transceivers, amplifiers, and modulation/demodulation circuitry, configured to transmit and receive RF signals simultaneously with the detection and imaging functions, wherein the magnetic monopoles enhance signal transmission efficiency through their unique magnetic field interactions; a processing system configured to convert detected signals, influenced by the magnetic monopole interactions, into digital data files representing images or signal maps; wherein the plurality of magnetic monopoles within the pixel matrix are tuned to specific frequency ranges using specialized layers or antenna pixels, selected from the group consisting of microstrip antennas and conductive coatings, to optimize sensitivity to EMF and RF signals, and the system is configured to perform simultaneous detection, imaging, and telecommunications using frequency multiplexing, parallel processing, or time division techniques to avoid interference.

The QTA according to any preceding clause, wherein the QTA supports advanced antenna configurations, including antenna arrays for MIMO antennas, beamforming, phased array antennas, smart antennas, adaptive antennas, reconfigurable antennas and rectennas; in telecommunications applications, where the wireless signal contains information as well as energy in the form of radio signals, whereby the Antenna Pixels separate the intelligence from the electricity, "Q-Tricity", which is: i) harvested; ii) recycled; iii) stored in a battery or iv) flash capacitor or other means; v) fed into the grid, vi) or microgrid, vii) used for Power Purchase Agreements for monetization, including crypto NFT/tokens viii) wirelessly transmitted to another QTA or receiving system for further redistribution or ix) combined harvesting QTAs much like a photovoltaic system and stored for later use.

The QTA according to any preceding clause, wherein the QTA can act as an active and/or passive repeater, extending network distance. QTA can create a mesh network between two or more QTAs. QTA can transceive energy from living organisms, and can harvest ambient RF signals, and use it as electricity, to power LED's, and for the propagation of the signal, or multiple signals.

A system for wireless communication, comprising: an electronic device; and a Quantum Transceiver Antenna (QTA) integrated into the electronic device, the QTA comprising a scalable, thin-film, bi-synchronous, multifrequency resonance antenna structure, the structure including a layered matrix of antenna pixels of uniform size and shape with voids and nulls in a predetermined pattern; wherein the QTA enhances coherence of electromagnetic signals using toroidal geometries functioning as tunable electromagnetic lenses, enabling simultaneous resolution and concentration of gain across a full spectrum of radio frequency signals; and wherein the QTA operates using quantum principles to enable non-line-of-sight communication, immunity to multipath interference, and independence from ground planes, with low impedance and high gain.

The system according to any preceding clause, wherein the electronic device is selected from the group consisting of Internet of Things (IoT) devices, smart home devices, wearable devices, vehicular communication systems, unmanned aerial vehicles (UAVs), and spacecraft communication systems.

The system according to any preceding clause, wherein the QTA supports a plurality of communication protocols, including Wi-Fi, Bluetooth, GPS, NFC, satellite communication, and wireless power transfer.

The system according to any preceding clause, wherein the QTA is configured for use in a plurality of specialized applications, including medical implant communication service (MICS) antennas, wireless body area network (WBAN) antennas, ground penetrating radar (GPR), and radio frequency identification (RFID) systems.

The system according to any preceding clause, wherein the QTA is configured to operate in extreme environments, including underwater communication, deep space communication, and high-altitude platform station (HAPS) communication.

The system according to any preceding clause, wherein the QTA is fabricated as a microstrip antenna, dielectric resonator antenna, or fractal antenna, and is scalable for integration into a plurality of device form factors.

The QTA according to any preceding clause, wherein the QTA is configured to replace a plurality of disparate antennas in an electronic device, providing plug-and-play wireless connectivity with space-based platforms and terrestrial networks.

The QTA according to any preceding clause, wherein the QTA is frequency-dynamic and supports a plurality of communication protocols, including cellular communication, Wi-Fi, Bluetooth, Global Positioning System (GPS), Near Field Communication (NFC), and satellite communication.

The QTA according to any preceding clause, wherein the QTA is adapted for use in Internet of Things (IoT) devices, Edge computing systems, Artificial Intelligence (AI) connectivity, and emergency response interoperability solutions.

The QTA according to any preceding clause, wherein the layered matrix of antenna pixels is fabricated using thin-film deposition techniques, and wherein the toroidal geometries are tunable to dynamically adjust signal gain and frequency response.

The QTA according to any preceding clause, wherein the QTA is configured to operate in a plurality of antenna markets, including radar systems, television broadcasting, radio broadcasting, two-way radio communication, wireless local area networks (WLAN), and wireless personal area networks (WPAN).

The QTA according to any preceding clause, wherein the QTA is configured to operate across a plurality of frequency bands, including ultra-wideband (UWB), millimeter-wave, terahertz, infrared, and optical frequency bands.

The QTA according to any preceding clause, wherein the QTA is integrated into a device selected from the group consisting of smartphones, tablets, laptops, smartwatches, fitness trackers, smart glasses, virtual reality (VR) headsets, augmented reality (AR) devices, gaming consoles, and wireless charging systems.

The QTA according to any preceding clause, wherein the QTA is configured to be used for: transport automation, navigation, telemetry and communication systems in; automotive, trucking, drones, robots, aircraft, railway systems, maritime, satellite, spacecraft and deep space.

The system according to any preceding clause, wherein the QTA supports communication in a plurality of markets, including cellular communication systems, satellite communication, radar systems, wireless sensor networks, and emergency response communication systems.

The system according to any preceding clause, wherein the electronic device is selected from the group consisting of Internet of Things (IoT) devices, smart home devices, wearable devices, vehicular communication systems, unmanned aerial vehicles (UAVs), and spacecraft communication systems.

The communication antenna system according to any preceding clause, further comprising an adaptive signal processing module, wherein the antenna dynamically adjusts its resonance properties to optimize transmission efficiency based on environmental conditions, including atmospheric disturbances, signal congestion, and material obstructions.

The system according to any preceding clause, wherein the antenna passively harvests ambient radio frequency energy to supplement power requirements, thereby reducing reliance on battery power for portable communication devices.

The system according to any preceding clause, wherein the quantum resonance structure enables concurrent multichannel communication, supporting multiple independent data streams simultaneously within the same physical antenna unit.

The system according to any preceding clause, wherein the transceiver is configured to communicate directly with terrestrial, aerial, and orbital communication networks without reliance on intermediary ground-based infrastructure.

A method for using a quantum transceiver antenna, comprising: generating an electromagnetic Torus Field using electromagnetic (EM) and radio frequency (RF) signals, by a plurality of antenna pixel elements arranged in one or more antenna pixel matrix arrays disposed on at least one dielectric substrate, wherein the Torus Field produces field effects comprising one or more of independent, overlapping electromagnetic lensing structures formed by interference and resonance patterns within the one or more antenna pixel matrix arrays, and wherein resonance of the antenna pixel elements organizes the EM and RF signals into coherent patterns for both transmission and reception, thereby enabling operation as a transceiving antenna.

The method according to any preceding clause, further comprising: generating multiple electromagnetic Torus Fields comprising a plurality of near limitless, independent overlapping electromagnetic lenses, that through resonance are configured to order, or organize either by dual nature, particle or wave EM and RF Signals as the transceiving antenna.

The method according to any preceding clause, further comprising generating multiple electromagnetic Torus Fields using electromagnetic and radio frequency signals, wherein the multiple Torus Fields produce field effects comprising one or more independent, overlapping electromagnetic lensing structures, wherein, through resonance, the electromagnetic lensing structures order or organize the electromagnetic and radio frequency signals for transceiving, and wherein the one or more antenna pixel matrix arrays are further configured to simultaneously perform one or more functions including at least one of: acting as a transceiving rectenna, telemeter, sensor, hearing aid, thermocouple, touch-screen, display, or wireless power transceiver.

The method according to any preceding clause, further comprising generating multiple electromagnetic Torus Fields using electromagnetic and radio frequency signals, wherein the multiple Torus Fields produce field effects comprising one or more independent, overlapping electromagnetic lensing structures, and wherein the electromagnetic lensing structures order or organize the electromagnetic and radio frequency signals both as particles and as waves, independently and simultaneously.

The method according to any preceding clause, further comprising simultaneously resolving electromagnetic and radio frequency signals across a frequency range extending from below 20 Hz to beyond 1 THz, wherein the transceiver is operable in line-of-sight and non-line-of-sight conditions, through solid materials including rock, soil, walls, bricks, and metals, in the presence of ground planes and harsh electromagnetic environments, within water, Faraday cages, engines, motors, transformers, or generators, and is further configured to overcome multipath and other signal interferences, and wherein the transceiver is frequency agile, frequency dynamic, multifunctional, and operable in asynchronous, bisynchronous, serial, parallel, analog, digital, or combinations thereof.

The method according to any preceding clause, wherein the quantum transceiver antenna is collocated, to create wireless connectivity, with at least one of: cell phones, routers, modems, edge networks, wireless systems, AI systems, sensors, Internet of Things (IoT) devices, batteries, radios, TVs, motors, transmitters, receivers, game-controllers, computer interface(s), displays, generators, photovoltaics, or any other kind of electronic devices or equipment.

The method according to any preceding clause, further comprising ordering the interference patterns so that existing signals can gain resonance in unified coherence, with a reduction in resistance and the multiple signals co-exist without disruption to any of the individual frequencies.

The method according to any preceding clause, wherein the antenna pixel elements comprise one or more materials including: cobalt, graphene, diamond, silicon, copper, silver, gold, and neodymium, and wherein said materials are selected to optimize performance characteristics including signal gain, electromagnetic and radio frequency signal resolution, quality factor, power efficiency, operating range, component integration, device size, and weight.

The method according to any preceding clause, further comprising generating one or more electromagnetic Torus Fields such that field effects are produced comprising one or more independent, overlapping electromagnetic lensing structures arranged as a Hopf fibration, wherein the quantum transceiver antenna maintains quantum entanglement and is configured to order or organize electromagnetic and radio frequency signals and electromagnetic hybrid (EmH) signals for near-instantaneous connectivity with reduced latency in both near-field and far-field conditions, functioning as a quantum entanglement transceiver.

The method according to any preceding clause, wherein one of the antenna pixel matrix arrays includes a first antenna pixel element and a plurality of additional antenna pixel elements configured to generate electromagnetic Torus Fields, wherein a second component is configured to generate field effects comprising one or more, overlapping electromagnetic lensing structures, and wherein resonance of the antenna pixel elements is configured to order or organize electromagnetic and radio frequency signals as a transceiving antenna.

The method according to any preceding clause, wherein a plurality of quantum transceiver antennas includes a quantum entanglement component configured to maintain an intermediary state of quantum entanglement in equilibrium, wherein the plurality of antennas, regardless of near-field or far-field separation, achieve sympathetic resonance and are configured to wirelessly transceive or exchange information, intelligence, energy, or electromagnetic holographic signals, wherein the antennas function as repeaters propagating radio frequency and electromagnetic signals within a wireless mesh network, and wherein the addition of each antenna in the network increases the coherence and resolution of the transmitted signals.

An electronic device having at least one QTA as described and claimed in any of the preceding clauses.

The above description is given by way of example, and not limitation. In the foregoing specification, the present disclosure QTA has been described with reference to specific preferred embodiments, including but not limited to various methods, processes and concepts. Further, the various features of the embodiments disclosed herein can be used alone, or in varying combinations with each other and are not intended to be limited to the specific combination described herein. It will, however, be evident to those of skill in the art that various modifications and changes may be made without departing from the broader spirit and scope of the invention as set forth in the appended claims. The specification and drawings are, accordingly, to be regarded in an illustrative, rather than restrictive, sense. Thus, the scope of the claims is not to be limited by the illustrated embodiments.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An Electromagnetic Materials Identification Tool (EMIT), comprising:

a Quantum Transceiver Antenna (QTA) including a layered matrix of antenna pixels and toroidal geometries, configured to detect and synthesize electromagnetic (EM) signatures of materials, including: naturally occurring elements, gemstones, minerals, and synthetics, across multiple frequency bands from below 20 Hz to beyond 1 THz;

a Transceiver Discriminator (TD) comprising one or more of: a processor, an artificial intelligence (AI) engine, a Field Programmable Gate Array (FPGA), a Field Programmable Photonic Gate Array (FPPGA), a Neural Processing Unit (NPU), or an Application Specific Integrated Circuit (ASIC), the TD operatively coupled to the QTA and configured to capture resonant frequencies and EM signatures comprising multidimensional wave-states, including dynamic states, standing waves, and radiant fields, to store and compare signatures in a database for real-time identification of materials including by volume, concentration, or purity;

wherein the EMIT is deployable as a tool for use in the laboratory, industrial, or field settings via portable devices or integrated systems.

2. The EMIT of claim 1, wherein the QTA pairs with at least one of optical or radio telescopes, microscopes, Magnetic Resonance Imaging (MRI), X-ray imaging (X-RAY) or CAT Scan to enhance resolution and sensitivity for material characterization.

3. The EMIT of claim 1, wherein the TD employs an artificial intelligence (AI) engine to classify material EM signatures and detect anomalies in bonding states or purity levels for real-time material characterization, and Nuclear Magnetic Resonance (NMR).

4. The EMIT of claim 1, wherein the QTA is fabricated using polymeric films, such as copper-clad Kapton, enabling flexible, lightweight deployment as a decal or woven into fabric or clothing for identification, tracking and communications.

5. The EMIT of claim 1, wherein the QTA replicates material EM signatures by transmitting matched resonant frequencies, enabling synthesis and transformation of material properties for industrial applications.

6. The EMIT of claim 1, wherein the QTA includes a Q-Tricity Flash Capacitor layer (Q-Tricity Cap), and wherein the QTA is doped with a superconductive layer of cobalt, graphene or diamond, configured to harvest Q-Tricity, defined as quantum digital electricity, collected from ambient EM radiation from living organisms, and from ambient and broadcast information signals, without interfering with information transfer, storing the energy for power-on-demand in material identification operations and to maintain and manage all connectivity.

7. The EMIT of claim 1, further configured as a tool for element identification by EM signature, the tool configured to:

establish a new EM wave-state category within the periodic table of elements, wherein the dual particle and wave properties of the QTA enable operation of the QTA for imaging material EM signatures as structured spatial wave-state expressions;

preserve the spin, position, superposition and spatial relationship of the particles within the EM wave-state; and store the wave-state as an Electromagnetic Hologram (EmH) on a doped layer of superconductive material, as a Resonant Encoded Memory (REM), with the TD subtracting background radiation, cataloguing and processing real-time identification of the material.

8. The EMIT of claim 7, wherein the QTA operates in non-line-of-sight conditions, penetrating solid materials including water, rock, or metals, for material identification in complex environments, and wherein operation of the QTA within a spherical chamber at ambient temperature, with boundary-layer magnets, or a spherical surface EM containment wave, enables isolating and concentrating the subject field for hyper-sensitive-imaging material EM signatures as structured spatial wave-state expressions reducing background radiation anomalies.

* * * * *